US012632785B2

(12) United States Patent
Ozay et al.

(10) Patent No.: US 12,632,785 B2
(45) Date of Patent: May 19, 2026

(54) METHOD AND APPARATUS FOR CLASS INCREMENTAL LEARNING

(71) Applicant: SAMSUNG ELECTRONICS CO., LTD., Suwon-si (KR)

(72) Inventors: Mete Ozay, Staines (GB); Marco Toldo, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 753 days.

(21) Appl. No.: 17/984,010

(22) Filed: Nov. 9, 2022

(65) Prior Publication Data

US 2023/0145919 A1    May 11, 2023

(30) Foreign Application Priority Data

Nov. 9, 2021    (GB) ...................................... 2116074
Apr. 25, 2022    (GB) ...................................... 2205999

(51) Int. Cl.
*G06N 20/00*    (2019.01)

(52) U.S. Cl.
CPC .................................... *G06N 20/00* (2019.01)

(58) Field of Classification Search
CPC ...... G06N 20/00; G06N 3/0455; G06N 3/084; G06N 3/08; G06N 5/02
See application file for complete search history.

(56) References Cited

U.S. PATENT DOCUMENTS

2018/0189615 A1    7/2018  Kang et al.
2018/0307899 A1    10/2018  Das et al.

2020/0151619 A1    5/2020  Mopur et al.
2020/0342260 A1    10/2020  Farchi et al.
2021/0073627 A1    3/2021  Sarferaz
2021/0157704 A1    5/2021  Parthasarathy et al.
2021/0224696 A1    7/2021  Nasr-Azadani et al.
2021/0334695 A1    10/2021  Raj et al.
2022/0207410 A1 *   6/2022  Harary ................... G06N 20/00

FOREIGN PATENT DOCUMENTS

WO        2021/044192 A1    3/2021

OTHER PUBLICATIONS

Caccia et al., "Reducing Representation Drift in Online Continual Learning," arXiv:2104.05025v2 [cs.LG], Jun. 29, 2021, Total 17 pages.
Castro et al., "End-to-End Incremental Learning," Proceedings of the European Conference on Computer Vision (ECCV), 2018, Total 16 pages.

(Continued)

*Primary Examiner* — Jay A Morrison
(74) *Attorney, Agent, or Firm* — Sughrue Mion, PLLC

(57)    ABSTRACT

The present application generally relates to a method for training a machine learning, ML, model using class incremental learning, and to a computer-implemented method and apparatus for using the trained machine learning, ML, model. The method may learn how to update semantic representations of old concepts (classes) by modelling drift of semantic representations. The method may also learn how to update feature representations of old concepts (classes) by modelling drift of feature representations

17 Claims, 80 Drawing Sheets
(62 of 80 Drawing Sheet(s) Filed in Color)

(56)        References Cited

OTHER PUBLICATIONS

Dhar et al., "Learning without Memorizing," Proceedings of the IEEE Conference on Computer Vision and Pattern Recognition (CVPR), 2019, Total 9 pages.
Douillard et al., "PODNet: Pooled Outputs Distillation for Small-Tasks Incremental Learning," Proceedings of the European Conference on Computer Vision (ECCV), 2020, Total 17 pages.
He et al., "Deep Residual Learning for Image Recognition," Proceedings of the IEEE Conference on Computer Vision and Pattern Recognition (CVPR), 2016, Total p pages.
Hou et al., "Learning a Unified Classifier Incrementally via Rebalancing," Proceedings of the IEEE Conference on Computer Vision and Pattern Recognition (CVPR), 2019, Total 9 pages.
Kirkpatrick et al., "Overcoming catastrophic forgetting in neural networks," PNAS, vol. 114, No. 13, pp. 3521-3526, Mar. 28, 2017.
Li et al., "Learning Without Forgetting," Proceedings of the European Conference on Computer Vision (ECCV), 2016, Total 16 pages.
Pouransari et al., "Tiny ImageNet Visual Recognition Challenge," CS231N course, Stanford Univ., Stanford, CA, USA, 2014, Total 9 pages.
Rebuffi et al., "iCaRL: Incremental Classifier and Representation Learning," Proceedings of the IEEE Conference on Computer Vision and Pattern Recognition (CVPR), 2017, Total 10 pages.
Sohn et al., "Learning Structured Output Representation using Deep Conditional Generative Models," Advances in Neural Information Processing Systems (NeurIPS), 2015, Total 9 pages.
Wah et al., "The Caltech-UCSD Birds-200-2011 Dataset," Technical Report CNS-TR-2011-001, California Institute of Technology, 2011, Total 8 pages.
Wu et al., "Striking a Balance between Stability and Plasticity for Class-Incremental Learning," Proceedings of the International Conference on Computer Vision (ICCV), 2021, Total 10 pages.
Yan et al., "DER: Dynamically Expandable Representation for Class Incremental Learning," Proceedings of the IEEE Conference on Computer Vision and Pattern Recognition (CVPR), 2021, Total 10 pages.
Lecun et al., "Deep learning," Nature vol. 521, pp. 436-444, May 28, 2015, Total 10 pages.
Zhao et al., "InfoVAE: Information Maximizing Variational Autoencoders," CoRR, abs/1706.02262, 2017, Total 11 pages.
Wang et al., "Development of convolutional neural network and its application in image classification: a survey," Optical Engineering 58(4), 040901, Apr. 2019, Total 20 pages.
Ahn et al., "SS-IL: Separated Softmax for Incremental Learning," ICCV, 2021, Total 10 pages.
Aljundi et al., "Memory Aware Synapses: Learning what (not) to forget," ECCV, 2018, Total 16 pages.
He et al., "Feature Kernel Distillation," Submitted to The Tenth International Conference on Learning Representations, under review, 2022, Total 38 pages.
Cha et al., "Co2L: Contrastive Continual Learning," ICCV, 2021, Total 10 pages.
Chaudhry. "RiemannianWalk for Incremental Learning: Understanding Forgetting and Intransigence," ECCV, 2018, Total 16 pages.
De Lange et al., "A continual learning survey: Defying forgetting in classification tasks, " TRAMI, 2021, Total 29 pages.

Hinton et al., "Distilling the Knowledge in a Neural Network," CoRR, abs/1503.02531, 2015, Total 9 pages.
Hu et al., "Distilling Causal Effect of Data in Class-Incremental Learning," CVPR, 2021, Total 10 pages.
Jazbec et al., "Scalable Gaussian Process Variational Autoencoders," AISTATS, 2021, Total 11 pages.
Kemker et al., "Fearnet: Brain-Inspired Model for Incremental Learning," ICLR, 2018, Total 16 pages.
Krizhevsky, "Learning Multiple Layers of Features from Tiny Images," Technical report, Apr. 8, 2009, Total 60 pages.
De Lange et al., "Continual Prototype Evolution: Learning Online from Non-Stationary Data Streams," ICCV, 2021, Total 10 pages.
Liu et al., "Adaptive Aggregation Networks for Class-Incremental Learning," CVPR, 2021, Total 10 pages.
Lucas et al., "Don't Blame the ELBO! A Linear VAE Perspective on Posterior Collapse," NeurIPS, 2019, Total 11 pages.
Mai et al., "Online Continual Learning in Image Classification: An Empirical Survey," Neurocomputing, 469:28-51, Oct. 2021, Total 27 pages.
Parisi et al., "Continual lifelong learning with neural networks: A review," Neural Networks, vol. 113, pp. 54-71, 2019, Total 18 pages.
Shin et al., "Continual Learning with Deep Generative Replay," NeurIPS, 2017, Total 10 pages.
Simon et al., "On Learning the Geodesic Path for Incremental Learning," CVPR, 2021, Total 10 pages.
Smith et al., "Always Be Dreaming: A New Approach for Data-Free Class-Incremental Learning," ICCV, 2021, Total 11 pages.
Snell et al., "Prototypical Networks for Few-shot Learning," NeurIPS, 2017, Total 11 pages.
Tenenbaum et al., "A Global Geometric Framework for Nonlinear Dimensionality Reduction," Science, vol. 290, Dec. 2000, Total 8 pages.
Verwimp et al., "Rehearsal revealed: The limits and merits of revisiting samples in continual learning," ICCV, 2021, Total 10 pages.
Wu et al. "Memory Replay GANs: learning to generate images from new categories without forgetting," NeurIPS, 2018, Total 11 pages.
Wu et al. "Large Scale Incremental Learning," CVPR, 2019, Total 9 pages.
Xiang et al., "Incremental Learning Using Conditional Adversarial Networks," ICCV, 2019, Total 10 pages.
Yacoby et al., "Failure Modes of Variational Autoencoders and Their Effects on Downstream Tasks," arXiv:2007.07124v3 [stat. ML], Feb. 25, 2021, Total 45 pages.
Zenke et al., "Continual Learning Through Synaptic Intelligence," ICML, 2017, Total 9 pages.
Bengio et al., "Deep Learning," published by MIT, 2016, Total 706 pages.
Communication dated Oct. 13, 2022, issued by the Great Britain Intellectual Property Office in Great Britain Patent Application No. 2205999.2.
Zhu et al., "Prototype Augmentation and Self-Supervision for Incremental Learning," CVPR, 2021, Total 10 pages.
Yu et al., "Semantic Drift Compensation for Class-Incremental Learning," CVPR, 2020, Total 10 pages.
Toldo et al., "Bring Evanescent Representations to Life in Lifelong Class Incremental Learning," CVPR, 2022, Total 10 pages.
Communication dated Apr. 4, 2024, issued by the United Kingdom Intellectual Property Office in United Kingdom Application No. 2205999.2.

* cited by examiner

FIG. 1C

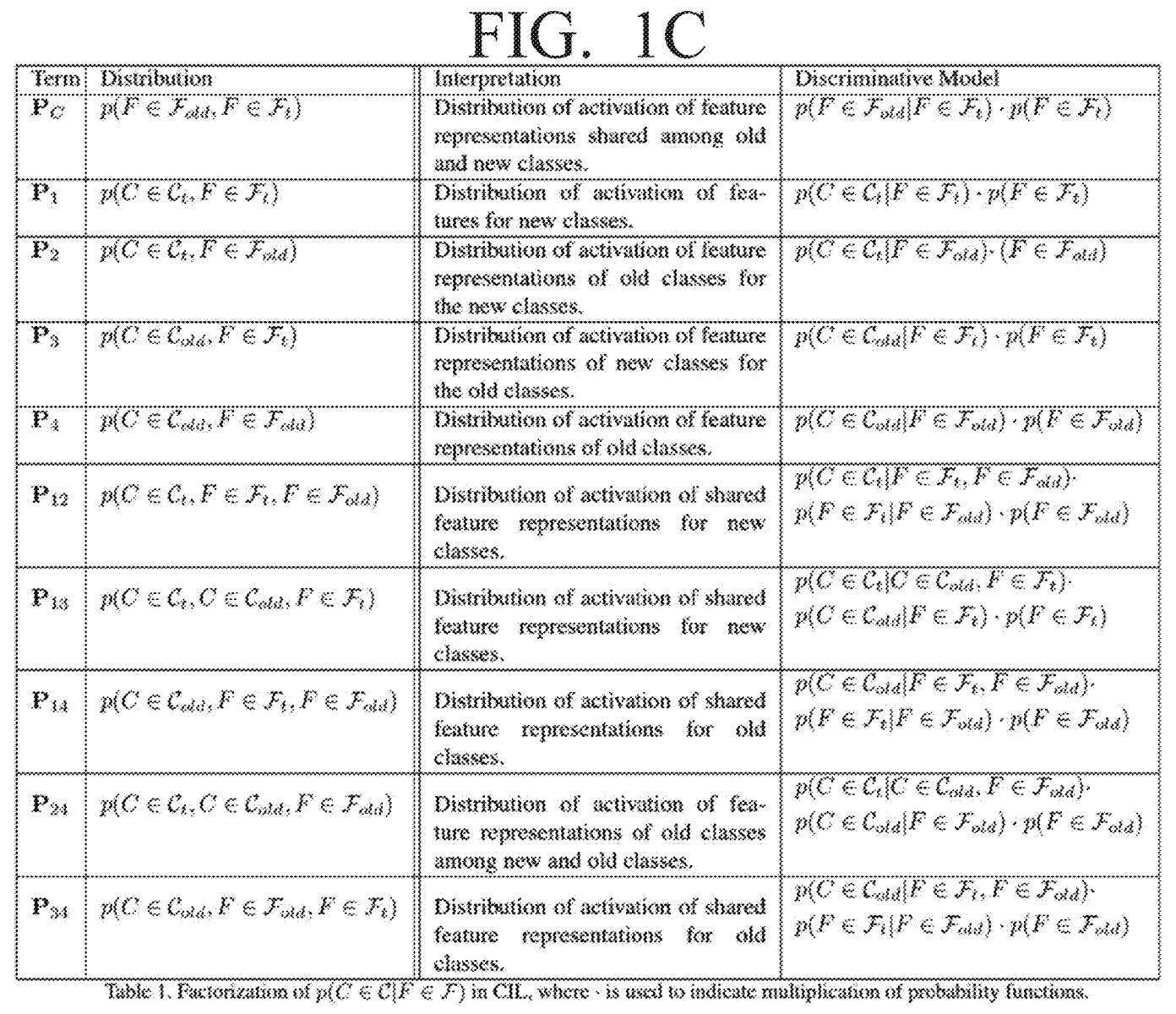

| Term | Distribution | Interpretation | Discriminative Model |
|---|---|---|---|
| $P_C$ | $p(F \in \mathcal{F}_{old}, F \in \mathcal{F}_t)$ | Distribution of activation of feature representations shared among old and new classes. | $p(F \in \mathcal{F}_{old}\vert F \in \mathcal{F}_t) \cdot p(F \in \mathcal{F}_t)$ |
| $P_1$ | $p(C \in C_t, F \in \mathcal{F}_t)$ | Distribution of activation of features for new classes. | $p(C \in C_t\vert F \in \mathcal{F}_t) \cdot p(F \in \mathcal{F}_t)$ |
| $P_2$ | $p(C \in C_t, F \in \mathcal{F}_{old})$ | Distribution of activation of feature representations of old classes for the new classes. | $p(C \in C_t\vert F \in \mathcal{F}_{old}) \cdot p(F \in \mathcal{F}_{old})$ |
| $P_3$ | $p(C \in C_{old}, F \in \mathcal{F}_t)$ | Distribution of activation of feature representations of new classes for the old classes. | $p(C \in C_{old}\vert F \in \mathcal{F}_t) \cdot p(F \in \mathcal{F}_t)$ |
| $P_4$ | $p(C \in C_{old}, F \in \mathcal{F}_{old})$ | Distribution of activation of feature representations of old classes. | $p(C \in C_{old}\vert F \in \mathcal{F}_{old}) \cdot p(F \in \mathcal{F}_{old})$ |
| $P_{12}$ | $p(C \in C_t, F \in \mathcal{F}_t, F \in \mathcal{F}_{old})$ | Distribution of activation of shared feature representations for new classes. | $p(C \in C_t\vert F \in \mathcal{F}_t, F \in \mathcal{F}_{old}) \cdot p(F \in \mathcal{F}_t\vert F \in \mathcal{F}_{old}) \cdot p(F \in \mathcal{F}_{old})$ |
| $P_{13}$ | $p(C \in C_t, C \in C_{old}, F \in \mathcal{F}_t)$ | Distribution of activation of shared feature representations for new classes. | $p(C \in C_t\vert C \in C_{old}, F \in \mathcal{F}_t) \cdot p(C \in C_{old}\vert F \in \mathcal{F}_t) \cdot p(F \in \mathcal{F}_t)$ |
| $P_{14}$ | $p(C \in C_{old}, F \in \mathcal{F}_t, F \in \mathcal{F}_{old})$ | Distribution of activation of shared feature representations for old classes. | $p(C \in C_{old}\vert F \in \mathcal{F}_t, F \in \mathcal{F}_{old}) \cdot p(F \in \mathcal{F}_t\vert F \in \mathcal{F}_{old}) \cdot p(F \in \mathcal{F}_{old})$ |
| $P_{24}$ | $p(C \in C_t, C \in C_{old}, F \in \mathcal{F}_{old})$ | Distribution of activation of feature representations of old classes among new and old classes. | $p(C \in C_t\vert C \in C_{old}, F \in \mathcal{F}_{old}) \cdot p(C \in C_{old}\vert F \in \mathcal{F}_{old}) \cdot p(F \in \mathcal{F}_{old})$ |
| $P_{34}$ | $p(C \in C_{old}, F \in \mathcal{F}_{old}, F \in \mathcal{F}_t)$ | Distribution of activation of shared feature representations for old classes. | $p(C \in C_{old}\vert F \in \mathcal{F}_t, F \in \mathcal{F}_{old}) \cdot p(F \in \mathcal{F}_t\vert F \in \mathcal{F}_{old}) \cdot p(F \in \mathcal{F}_{old})$ |

Table 1. Factorization of $p(C \in C\vert F \in F)$ in CIL, where · is used to indicate multiplication of probability functions.

Figure 2B:
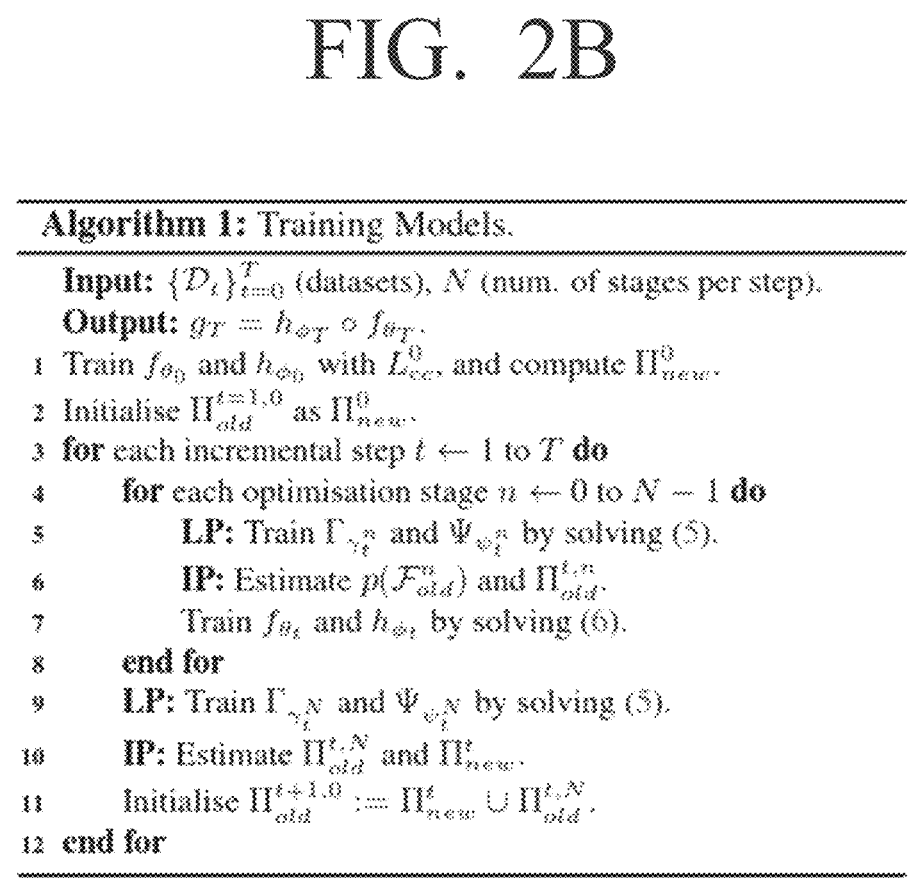

Algorithm 1: Training Models.

---

Input: $\{D_t\}_{t=0}^{T}$ (datasets), $N$ (num. of stages per step).

Output: $g_T = h_{\phi_T} \circ f_{\theta_T}$.

1   Train $f_{\theta_0}$ and $h_{\phi_0}$ with $L_{cc}^0$, and compute $\Pi_{new}^0$.

2   Initialise $\Pi_{old}^{t=1,0}$ as $\Pi_{new}^0$.

3   for each incremental step $t \leftarrow 1$ to $T$ do

4      for each optimisation stage $n \leftarrow 0$ to $N-1$ do

5         LP: Train $\Gamma_{\gamma_t^n}$ and $\Psi_{\psi_t^n}$ by solving (5).

6         IP: Estimate $p(\mathcal{F}_{old}^n)$ and $\Pi_{old}^{t,n}$.

7         Train $f_{\theta_t}$ and $h_{\phi_t}$ by solving (6).

8      end for

9      LP: Train $\Gamma_{\gamma_t^N}$ and $\Psi_{\psi_t^N}$ by solving (5).

10      IP: Estimate $\Pi_{old}^{t,N}$ and $\Pi_{new}^t$.

11      Initialise $\Pi_{old}^{t+1,0} := \Pi_{new}^t \cup \Pi_{old}^{t,N}$.

12 end for

---

120

130
New classes 118
114′

Old Classes

MLP

Trainable

Conditional VAE

MLP

Trainable

Conditional VAE

Trainable

Conditional VAE

FIG. 5B

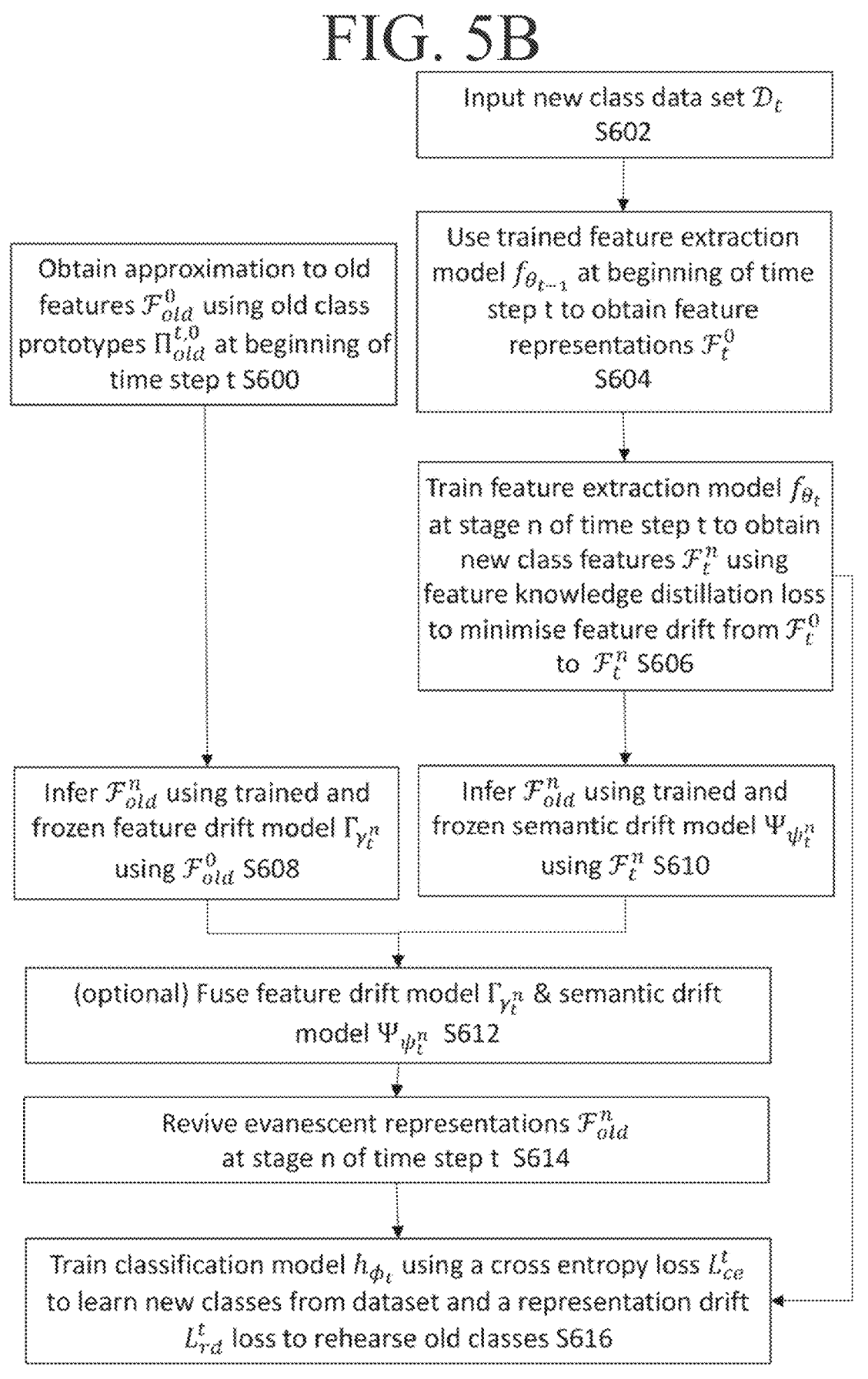

Input new class data set $\mathcal{D}_t$
S602

Use trained feature extraction model $f_{\theta_{t-1}}$ at beginning of time step t to obtain feature representations $\mathcal{F}_t^0$
S604

Obtain approximation to old features $\mathcal{F}_{old}^0$ using old class prototypes $\Pi_{old}^{t,0}$ at beginning of time step t S600

Train feature extraction model $f_{\theta_t}$ at stage n of time step t to obtain new class features $\mathcal{F}_t^n$ using feature knowledge distillation loss to minimise feature drift from $\mathcal{F}_t^0$ to $\mathcal{F}_t^n$ S606

Infer $\mathcal{F}_{old}^n$ using trained and frozen feature drift model $\Gamma_{\gamma_t^n}$ using $\mathcal{F}_{old}^0$ S608

Infer $\mathcal{F}_{old}^n$ using trained and frozen semantic drift model $\Psi_{\psi_t^n}$ using $\mathcal{F}_t^n$ S610

(optional) Fuse feature drift model $\Gamma_{\gamma_t^n}$ & semantic drift model $\Psi_{\psi_t^n}$ S612

Revive evanescent representations $\mathcal{F}_{old}^n$ at stage n of time step t S614

Train classification model $h_{\phi_t}$ using a cross entropy loss $L_{ce}^t$ to learn new classes from dataset and a representation drift $L_{rd}^t$ loss to rehearse old classes S616

FIG. 5C

Apparatus 100

Processor(s) 102

Memory 104

ML Model 106

Image Capture Device 108

Interface(s) 110

FIG. 6G

Table 2. Per-class average top-1 accuracy (%).

| Method | CIFAR100 | | | TinyImageNet | | |
|---|---|---|---|---|---|---|
| | 5 Steps | 10 Steps | 20 Steps | 5 Steps | 10 Steps | 20 Steps |
| Fine-tuning | 9.09 | 4.49 | 2.76 | 8.12 | 4.34 | 2.33 |
| Joint | 72.24 | 72.24 | 72.24 | 58.19 | 58.19 | 58.19 |
| EWC [16] | 26.26 | 19.92 | 3.82 | 14.63 | 6.73 | 3.62 |
| LwF [19] | 39.51 | 18.00 | 12.58 | 40.62 | 24.43 | 22.62 |
| LwM [8] | 40.49 | 38.39 | 33.65 | 28.39 | 27.18 | 23.55 |
| EEIL [4] | 45.26 | 41.36 | 34.84 | 32.03 | 28.93 | 27.25 |
| iCarl [25] | 54.06 | 51.11 | 41.20 | 41.81 | 41.39 | 38.68 |
| UCIR [12] | 51.13 | 46.00 | 38.31 | 35.73 | 32.95 | 29.23 |
| PASS [43] | 56.53 | 47.54 | 47.30 | 47.00 | 41.50 | 29.04 |
| SDC [40] | 57.62 | 52.26 | 48.84 | 47.89 | 45.41 | 41.46 |
| Feat. Drift (GM-MLP) | 57.91 | 54.45 | 50.63 | 47.48 | 45.19 | 40.56 |
| Sem. Drift (GM-MLP) | 58.33 | 54.15 | 50.85 | 47.92 | 46.21 | 42.43 |
| Fusion† (GM-MLP) | 58.89 | 55.95 | 51.61 | 47.95 | 46.36 | 42.43 |
| Fusion (GM-MLP) | 59.37 | 55.99 | 51.91 | 48.56 | 46.50 | 42.81 |
| Feat. Drift (VM-VAE) | 56.99 | 53.69 | 51.09 | 47.88 | 44.67 | 41.05 |
| Sem. Drift (VM-VAE) | 58.17 | 55.38 | 51.65 | 48.60 | 46.24 | 43.44 |
| Fusion† (VM-VAE) | 58.76 | 55.50 | 51.72 | 48.74 | 46.46 | 42.72 |
| Fusion (VM-VAE) | 58.72 | 56.86 | 51.75 | 48.57 | 46.92 | 44.61 |

† Without using the correlation objective [3] in fusion loss.

FIG. 7D

Table 3. Per-class average top-1 accuracy (%).

| Method | CUB200 | | |
| --- | --- | --- | --- |
| | 5 Steps | 10 Steps | 20 Steps |
| Fine-tuning | 10.93 | 7.10 | 4.63 |
| Joint | 74.67 | 74.67 | 74.67 |
| EWC [16] | 10.63 | 6.43 | 4.65 |
| LwF [19] | 26.40 | 13.65 | 7.89 |
| PASS [43] | 52.14 | 37.97 | 18.29 |
| SDC [40] | 52.30 | 38.30 | 18.17 |
| Feat. Drift (GM-MLP) | 55.87 | 50.67 | 31.36 |
| Sem. Drift (GM-MLP) | 56.51 | 47.89 | 32.50 |
| Fusion† (GM-MLP) | 56.20 | 52.07 | 36.67 |
| Fusion (GM-MLP) | 56.28 | 51.82 | 37.99 |
| Feat. Drift (VM-VAE) | 57.39 | 51.29 | 32.72 |
| Sem. Drift (VM-VAE) | 57.34 | 51.88 | 33.34 |
| Fusion† (VM-VAE) | 56.59 | 52.00 | 36.80 |
| Fusion (VM-VAE) | 56.97 | 52.58 | 38.26 |

† Without using the correlation objective [3] in fusion loss.

METHOD AND APPARATUS FOR CLASS INCREMENTAL LEARNING

CROSS-REFERENCE TO RELATED APPLICATION(S)

This application is based on and claims priority to Great Britain Patent Application No. GB2116074.2, filed on Nov. 9, 2021, and Great Britain Patent Application No. GB2205999.2, filed on Apr. 25, 2022 in the Great Britain Intellectual Property, the disclosures of which are incorporated by reference herein in their entireties.

BACKGROUND

1. Field

The present application generally relates to a method for training a machine learning, ML, model using class incremental learning, and to a computer-implemented method and apparatus for using the trained machine learning, ML, model.

2. Description of the Related Art

Continual learning (also called lifelong learning) refers to the ability to continuously learn and adapt to new environments, exploiting knowledge gained from the past when solving novel tasks. Though being a common human trait, the lifelong learning paradigm hardly applies to artificial intelligence systems. Nevertheless, a classification model can be progressively trained on a constantly changing set of new classes, and this may be termed Class-Incremental Learning (CIL). Continual learning has been extensively studied in a class incremental fashion [7, 22, 23]. CIL may be used in several technical fields, for example image classification.

FIG. 1A is a schematic illustration of a typical image classifier which receives an input image and which may be trained using CIL. Merely as an example, the image classifier may use a general convolution neural network (CNN) architecture, for example as described in "Deep Learning" by LeCun et al. published in Nature Vol. 521, May 2015. As shown in FIG. 1A, a set of features are extracted from within the image using a feature extractor 100. The features may be extracted using any suitable technique, including convolution kernels. The use of convolution kernels is described for example in "Development of convolutional neural network and its application in image classification: a survey" by Wang et al. published in Optical Engineering 2019. As set out above, the feature extractor may have a CNN architecture and may thus comprise a plurality of blocks 102 each of which comprises a plurality of convolutional layers and a reLU layer. There is pooling from the first block 102 to the second block 102 and so on until the final block. In a final stage, there is flattening to generate an output feature representation 104. The feature representation is then passed to a classifier 106 which also comprises a plurality of layers. The output is a probability that the extracted kernel(s) matches one of the classes which is known by the model. In this example, the input image is a zebra and the output is a probability of 0.2 that the image is a horse, 0.7 that the image is a zebra and 0.1 that the image is a dog. Assuming that the threshold for a correct classification is below 0.7, the classifier has correctly classified the image as a zebra.

When training a model such as the one shown in FIG. 1A with CIL, the model may be initially trained with images classified as dogs and at the next time step images classified as zebras or horses may be added. CIL is schematically illustrated in FIG. 1B, and initially at time step t–1, several items or images which are schematically indicated by triangles have the same classification, e.g. an image of a dog. The images form a cluster 112 which is centred on a class prototype 114. Such a class prototype 114 may be considered to be a template of features which represents an average dog. A decision boundary 110 of the feature space within which all images would be classified as a dog is indicated by a solid line. The decision boundary is extracted using the classifier of FIG. 1A.

In the next time step t, several new classified images (i.e. several images belonging to new classes) are introduced and are indicated by squares and circles respectively. For example, the squares may be images of zebras and the circles images of horses. As indicated, some of the horse and zebra images are within the decision boundary 110 of the feature space for dogs and potentially would be mis-classified as dogs. The original classified images are shown as ghost triangles because they are not included when training the model at time step t. In other words, for each incremental training task and step t, the training set is composed of images belonging to the current class sets (e.g. horses and zebras) $C_t$, whereas past semantic categories $$(\text{e.g. dogs}) C_{old} \triangleq \{C_{t'}\}_{t'=1}^{t-1}$$

lack any training sample. The final objective for the model is to maximize the generalization (classification) accuracy on all the categories observed up to the end of the stream.

As shown in the final section of FIG. 1B, the training of the model with the new images leads to an adjustment to the original decision boundary 110, and new decision boundaries 120,130 for the new zebra and horse classifications respectively are learnt. New images of dogs, horses and zebras can then be classified by the newly trained classifier. As shown, the new images of horses and zebras indicated by the solid squares and circles are correctly located within the relevant portion of the feature space. However, the lack of images classified as dogs means that the feature representation for the class prototype for dogs has drifted towards the decision boundary between the dog and horse feature spaces. Accordingly, some of the original images which were centred around the class prototype would now be incorrectly classified as horses. These images are circled by the group 140. In other words, the change of distribution of training data $D_t$ in the form of semantic drift (i.e. change of the experienced class set $C_t$) naturally leads to catastrophic forgetting. It will be appreciated that FIG. 1B illustrates catastrophic forgetting as occurring after a single step but it is likely that the bias towards new data which causes past learned information will be more gradually erased.

The catastrophic forgetting phenomenon has also been described as the stability-plasticity dilemma, since there exists a trade-off between the search for preservation of old-task knowledge (i.e., stability) and the necessity to accommodate for the information obtained from the experience of new tasks (i.e., plasticity). To preserve past knowledge, many state-of-the-art methods store and rehearse training exemplars of previously seen classes, which might be source of privacy or storage issues. Alternatively, some recent approaches resort to prototypical feature representations to inject information of former classes in later incremental steps. However, if not updated, those representations progressively become staler and more outdated as the incremental learning progresses and new classes are learned.

Most of the successful known CIL methods use exemplars of old classes $C_{old}$ to rehearse past knowledge [1, 4, 5, 8, 9, 12, 18, 20, 25, 27, 32, 36]. However, storing samples belonging to all classes might be impractical due to limited resource availability or privacy requirements. To address CIL without storing exemplars, regularisation methods have been proposed [2, 6, 16, 39, 41]; the common goal is to identify key model parameters to solve old tasks, and prevent their change when learning a new task. Alternatively, knowledge distillation has been proposed [11, 19], where representations of new classes are forced to only slightly deviate from their original version computed at the beginning of the incremental step for learning the current task. Yet, those methods usually underperform when compared to the state-of-the-art (SotA) solutions.

In a more recent work [43], class prototypes were used to inject past knowledge. Although showing promising results, this method fails to capture the representation drift that is present while incrementally training the model and that is illustrated in FIG. 1B. That is because feature representations (e.g. texture, shape and colour and their composition representing parts of objects, scenes etc.) of old classes (e.g. different animals) are getting constantly staler and more outdated as the learning progresses and the model is updated. The estimated feature representation may be represented by $$F_{old} \triangleq \{F_{tr}\}_{tr=1}^{t}$$

and the old classes by $C_{old}$. The old classes may have been computed when the corresponding data is available and then kept fixed for the rest of the training.

A different work [40] proposes to estimate the change of prototypes (e.g. templates of average dogs) of old classes (e.g. dogs) when learning new classes (e.g. horses and zebra). The old templates may be represented by $$\prod_{old} \triangleq \left\{\prod_{tr}\right\}_{tr=1}^{t}$$

and the old classes by $C_{old}$ and the new classes by $C_r$. However, this method is limited in scope to embedding learning and devises a deterministic non-learnable module to estimate prototype shift.

There are also examples from the patent literature. For example, US2020151619 describes a system and method for accounting for the impact of concept drift in selecting machine learning training methods to address the identified impact. US2021224696 describes a computer system for detecting a concept drift of a machine learning model in a production environment for adaptive optimization of the concept drift detection. US2021157704 describes a system which can monitor applications and analyze the metrics to determine if one or more of the applications are regressing or performing as expected. US2021073627 describes a method for detecting degradation of the machine learning model based on key performance indicators.

The present applicant has recognised the need for an improved system and method that addresses these drawbacks.

SUMMARY

In a first approach of the present techniques, there is provided a computer-implemented method for training a classifier using class incremental learning, CIL, wherein the classifier is a machine learning, ML, model comprising a feature extraction model and a classification model and wherein at each incremental time step in the CIL a new training dataset having a set of samples with class labels is obtained and an optimisation over a plurality of stages is applied. The training method may comprise for each incremental step: extracting, using the feature extraction model, a first set of features representing the samples within the new training set at the beginning of the incremental step and a second set of features representing the samples within the training set at a subsequent stage within the optimisation; learning a feature drift model using the extracted first and second sets of features, wherein the feature drift model estimates the drift between the features representing each sample as the classification model is updated; obtaining a first set of old class prototypes for the beginning of the incremental step, wherein each class prototype is a semantic representation of the sets of features of the samples which have the same class label and wherein each old class prototype represents old samples which are samples that are not present in the new training set; learning a semantic drift model using the set of old class prototypes and first set of features, wherein the semantic drift model estimates the drift between the class prototypes for each class as the classification model is updated; inferring at least one of a second set of old class prototypes and a set of old features using the feature drift model and the semantic drift model, wherein the second set of prototypes are semantic representations of the old samples at a subsequent stage within the optimisation and the set of old features are the feature representations of revived old samples at the subsequent stage within the optimisation; and using at least one of the inferred second set of old class prototypes and set of old features to update the ML model. When the final incremental step is completed, the method may further comprise outputting the trained classification model.

In other words, there is provided a computer-implemented method for training a machine learning, ML, model. More specifically, there may be provided a computer-implemented method for performing class incremental learning of at least one or both of feature and semantic representation using a machine learning, ML, model. More specifically, there may be provided a computer-implemented method for performing class incremental learning using a machine learning, ML, model, the method comprising: inferring a set of prototypes of old classes using at least one of a feature drift model which is used to represent feature drift and a semantic drift model which is used to represent semantic drift; and using the inferred set of prototypes to update the ML model.

The method may learn how to update semantic representations (also termed class prototypes or templates) of old concepts (classes) by modelling drift of semantic representations. The method may include modelling the relationship with the new classes currently being learned for which data samples are available. The method may also learn how to update feature representations of old concepts (classes) by modelling drift of feature representations. The method may include modelling the trajectory of samples in the feature space spanned by parameters of the task network. These two models may be used separately or in combination to re-estimate continually evolving feature distributions of old concepts.

By implementing the modelling described above, this avoids the need to store samples of old classes to access evolving data distributions of old classes. The modelling also avoids using fixed representations of old classes which typically become staler at each new incremental phase. In other words, the techniques described provide a ML framework capable of modelling inter-class relationships and estimating the evolution of semantic and feature representations. The techniques described also provide a framework to achieve high performance on class-incremental learning, without requiring data samples to be stored.

When compared to prior art techniques, e.g. US2020151619, it is noted that our proposed method focuses on representation drift instead of concept drift, that is, we consider change of learned representations of ML models instead of only change of data. Our method may thus be considered as aiming to model change of representation drifts instead of determining their impact on model performance. There is an aim of improving the new representations together with old representations by updating a model, instead of selecting a model from multiple models. For example, considering US2021224696 as a contrast, our proposed method may be described as using a single ML model which is continually updated using novel data and is never retrained on past data. Thus, there is no need to store and/or access past data. For example, considering US2021157704, our method by contrast aims to directly address a continual learning problem where the training data is continually changing and data from the past cannot be accessed. We assume that the training data is accessible for a limited period of time and cannot be stored and reused. When compared to US2021073627, our method aims at directly addressing the performance degradation of an ML model caused by catastrophic forgetting by modelling semantic and/or feature representation drifts. Only new data which is currently available is leveraged.

Each new training dataset may be represented by $\mathcal{D}_t$ and thus the complete dataset for the CIL may be represented as $$\{D_t\}_{t=0}^{T} = (X_t, \mathcal{Y}_t), t = 0, \ldots, T, \text{where } X_t = \{x_{t,j}\}_{j=1}^{N_t}$$

is the set of samples, $$\mathcal{Y}_t = \{y_{t,j} \in C_t\}_{j=1}^{N_t}$$

is the set of their labels. $C_t$ is the set of class labels observed at this step and $N_t$ is the number of samples per step. Each sample may be an image, text data or audio data. When images are used as data and the ML task is image classification, the ML model may be an image classifier.

The feature drift model may be represented by $\Gamma_{\gamma_t^n}$ at each optimisation stage n and each incremental step t and may be parameterized by a set of parameters $\gamma$ of the feature drift model. The feature drift model estimates the drift between the features representing each sample in each class as the classification model is updated (i.e. at each incremental step and at each optimisation stage within each step). In other words, the feature drift model may learn the drift experienced by the features of the set of class labels $C_t$ observed at each incremental step. The second semantic drift model may be represented by $$\Psi_{\psi_t^n}$$

at each optimisation stage n and each incremental step t and may be parameterized by a semantic drift set of parameters $\psi$. The semantic drift model estimates the drift between the class prototypes for each class as the classification model is updated (i.e. at each incremental step and at each optimisation stage within each step). In other words, the semantic drift model may learn the drift experienced by while moving from the set of old class labels $C_{old}$ to the set of class labels $C_t$ observed at each incremental step.

The first set of features representing each sample within the new training set at the beginning of the incremental step may be represented by $$\mathcal{F}_t^0.$$

The second set of features representing each sample within the training set at a subsequent stage within the optimisation (i.e. the nth optimisation stage) may be represented by $$\mathcal{F}_t^n.$$

The first set of old class prototypes for the beginning of the incremental step may be represented by $$\prod_{old}^{t,0}.$$

The second set of old class prototypes for the subsequent stage within the optimisation may be represented by $$\prod_{old}^{t,n}.$$

From the old class prototypes at the subsequent stage, we can estimate the set of features for the old samples $$\mathcal{F}_{old}^n$$

which are not part of the training dataset $\mathcal{D}_t$. These old samples which are estimated may be termed revived old samples or revived evanescent representations because the representations were no longer appearing in the dataset.

The extracting, learning, obtaining, inferring and using steps may be repeated for each optimisation stage within each incremental step. When learning the feature drift and semantic drift models, the feature extraction and classification models are kept fixed. These learning steps may be termed a learning phase. When using the inferred information to update the ML model (i.e. to update the feature extraction and classification models), the feature drift and semantic drift models are kept fixed. This updating step and preceding inferring step may be termed an inference phase. At each learning and using step, the models may be trained until convergence where the convergence criterion for a model is early stopping the optimisation of model parameters if the training loss does not change for a fixed/set number of steps. There may be an initialisation stage for the first optimisation stage n=0. In the initialisation stage, both the feature extraction model $f_{\Theta_0}$ and the classification model $h_{\Phi_0}$ for the incremental time step 0 may be trained using a loss function $$L_{cc}^0$$

on the initial dataset $\mathcal{D}_0$. The set of class prototype(s) $\Pi_{new}^0$ can be computed and then we initialise the first set of old class prototypes $$\prod_{old}^{t=1,0} \text{ as } \prod_{new}^{0}.$$

Inferring a set of prototypes of old classes using the feature drift model may comprise training the feature drift model using the available set of features; and using the trained feature drift model to estimate the feature drift on past data whereby the set of prototypes of old classes is inferred. Training may be done using any suitable technique and depends on the architecture of the machine learning model.

The feature drift model may use a linear deep neural network (DNN), e.g. a multilayer perceptron (MLP). The feature drift model may be learned by using a feature drift loss function which minimises the error between the extracted second set of features and a third set of features which are the estimate of these features from the first set of features using the feature drift model. Merely as an example, the loss function $L_f^t$ may be expressed using the mean squared error function:

$$L_f^t\left(F_t^0, F_t^n; \gamma_t^n\right) = L_{mse,f}^t \triangleq \left\|\Gamma_{\gamma_t^n}\left(F_t^0\right) - F_t^n\right\|_2^2$$

where $$F_t^0$$

is the extracted first set of features, $$F_t^n$$

is the extracted second set of features and $$\Gamma_{\gamma_t^n}$$

is the feature drift model.

The feature drift model may use a variational model such as a variational auto-encoder (VAE). Training the feature drift model may comprise updating the weights $\gamma$ of the model to maximize the likelihood $$p\left(F \in \mathcal{F}_t^n \middle| F \in \mathcal{F}_t^0; \gamma\right) \text{ where } \mathcal{F}_t^0$$

denotes the set of features extracted at the optimization step 0 (i.e. the extracted first set of features), $$\mathcal{F}_t^n$$

denotes the set of features extracted using the feature extractor $f_{\Theta_t}$ updated with n optimization epochs at the incremental step t (i.e. the extracted second set of features) and F is the up-to-date feature representations from both the set of features of new classes and old classes. Using the expression, $$p\left(F \in \mathcal{F}_t^n \middle| F \in \mathcal{F}_t^0; \gamma_t^n\right)$$

we can estimate drifts more accurately at each incremental step and the optimisation stage. In this arrangement, the loss function $$L_f^t$$

for feature drift may be expressed as:

$$L_f^t\left(F_t^0, F_t^n; \gamma_t^n\right) = \beta L_{rec,f}^t + (1 - \alpha)L_{kl,f}^t + (\alpha - \lambda_{info} - 1)L_{info,f}^t$$

where $$L_{rec,f}^t$$

is the reconstruction loss, $$L_{kl,f}^t$$

is the KL divergence loss and $$L_{info,f}^t$$

is the loss of the InfoVAE and $\alpha$, $\beta$ and $\lambda_{info}$ are constants.

Inferring a set of prototypes of old classes using the semantic drift model may comprise training the semantic drift model using the available set of features; and using the trained semantic drift model to estimate the semantic drift on past data whereby the set of prototypes of old classes is inferred. Training may be done using any suitable technique and depends on the architecture of the machine learning model.

The semantic drift model may use a linear deep neural network (DNN), e.g. a multilayer perceptron (MLP). The semantic drift model may be learned by using a semantic drift loss function which minimises the error between the first set of old class prototypes and a third set of old class prototypes which are the estimate of these old class prototypes from the extracted first set of features using the semantic drift model. Merely as an example, the loss function $L_s^t$ for semantic drift may be expressed as:

$$L_s^t\left(F_t^0, \prod_{old}^{t,0}; \psi_t^n\right) = L_{mse,s}^t \triangleq \left\|\Psi_{\psi_t^n}\left(F_t^0\right) - \prod_{old}^{t,0}\right\|_2^2$$

where $$F_t^0$$

is the extracted first set of features, $$\prod_{old}^{t,0}$$

is the obtained first set of old class prototypes and $$\Psi_{\psi_t^n}$$

is the semantic drift model.

The semantic drift model may use a variational model such as a variational auto-encoder (VAE). Training the semantic drift model may comprise updating the weights $\psi$ of the model to maximize the likelihood $$p\left(\pi \in \prod_{old}^{t,n=0} \middle| F \in \mathcal{F}_t^0; \psi\right) \text{ where } \mathcal{F}_t^0$$

denotes the set of features extracted at the optimization step 0 (i.e. the extracted first set of features), $$\prod_{old}^{t,0}$$

is the set of prototypes of old classes at the optimization step 0 (i.e. the first set of old class prototypes), F is the up-to-date feature representation and $\pi$ is the up-to-date semantic representation. Using the expression, $$p\left(\pi \in \prod_{old}^{t,n=0} \middle| F \in \mathcal{F}_t^0; \psi_t^n\right)$$

we can more accurately capture the drift at incremental steps and optimisation stages. In this arrangement, the loss function $$L_s^t$$

for semantic drift may be expressed as:

$$L_s\left(F_t^0, \prod_{old}^{t,0}; \psi_t^n\right) = L_{rec,s} + \lambda_{kld} L_{kld,s}$$

where $$L_{rec,s}^t$$

is the reconstruction loss, $$L_{kl,s}^t$$

is the KL divergence loss and $\lambda_{kld,s}$ is a constant set to 1.

The feature drift and semantic drift model may be jointly trained, for example by fusing them to estimate the distribution of revived evanescent representations $$p(F \in F_{old}^n)$$

using either architecture. For this purpose, we optimise model parameters by minimising a fusion loss which measures discrepancy between the estimated distributions from either model $$p(F \in F_{old}^n; \gamma_t^n) \text{ and } p(F \in F_{old}^n; \psi_t^n)$$

employing a suitable training objective also termed a fusion loss may be expressed as $$L_{fus}^t = \left\|\prod_{old,s}^{t,n} - \prod_{old,f}^{t,n}\right\|_2^2 + \lambda_{corr}\left\|\rho\left(\prod_{old,s}^{t,n}\right) - \rho\left(\prod_{old,f}^{t,n}\right)\right\|_2^2$$

where the subscript s and f denotes the updated prototypes of old classes estimated by the semantic and feature drift models, respectively, $$\|\cdot\|_2^2$$

is the squared $\ell_2$ norm, $\lambda_{corr} > 0$ is the regularisation parameter and $\rho(\Pi)$ is the normalised correlation matrix of $\Pi$[3].

Inferring at least one of a second set of old class prototypes and a set of old features using the feature drift model and the semantic drift model may comprise using the feature drift model and the semantic drift model jointly or individually. The feature drift model $$\Gamma_{\gamma_t^n}$$

may be used to infer feature drift representations of old class prototypes $$\prod_{old,f}^{t,n}$$

at stage n>0 (i.e. feature drift versions of the second set of old class prototypes) using representations of old class prototypes at the beginning of the time step $$\prod_{old}^{t,0}$$

(i.e. the first set of old class prototypes) as the input. The subscript f denotes that the class prototypes are inferred from the feature drift model. These second set of old class prototypes may be used to revive the evanescent representations, i.e. to generate the set of old class features $$F_{old}^n$$

at the subsequent stage n of the optimisation. Alternatively, the set of old class features $$F_{old}^n$$

at the subsequent stage n of the optimisation may be inferred direct from the feature drift model and/or the semantic drift model. The nature of the inferring may depend on the architecture of the machine learning model. In either architecture, the feature drift model is kept fixed when inferring.

As set out above, the feature drift model may use a linear deep neural network (DNN). In this example, the feature drift model enables directly tracking of the trajectory of the old class prototypes $$\prod_{old}^{t,n}$$

as the optimisation proceeds. Thus, the second set of old class prototypes can be mapped from the first set of old class prototypes $$\prod_{old}^{t,0}$$

at the start of the incremental step. The distribution of the features of the revived evanescent representations may then be approximated by a Gaussian distribution from the second set of old class prototypes.

As set out above, the feature drift model may use a variational model and inferring the second set of old class prototypes may comprise using the trained feature drift model to compute the posterior probability $$p\left(\pi \in \prod_{old}^{t,n>0} \middle| \pi \in \prod_{old}^{t,n=0}; \gamma\right) \text{ where } \prod_{old}^{t,0}$$

is the first set of prototypes of old classes, $$\prod_{old}^{t,n}$$

is the second set of prototypes of old classes at the step t, and γ are the weights of the feature drift model. In other words, the trained feature drift model may be used to approximate the probability that the set of features is a member of the set of features for the revived evanescent representations at the nth optimisation stage given the set of features is a member of the set of features for the revived evanescent representations at the start of the time step.

$$p\left(F \in \mathcal{F}_{old}^n \middle| F \in \mathcal{F}_{old}^0\right).$$

This distribution of the features of the revived evanescent representations may also be approximated by a Gaussian distribution from the second set of old class prototypes.

The semantic drift model $$\Psi_{\psi_t}^n$$

may be used to infer semantic drift representations of old class prototypes $$\prod_{old,s}^{t,n}$$

at stage n>0 (i.e. semantic drift versions of the second set of old class prototypes) using representations of old class prototypes at the beginning of the time step $$\prod_{old}^{t,0}$$

(i.e. the first set of old class prototypes) as the input. The subscript s denotes that the class prototypes are inferred from the semantic drift model. The nature of the inferring may depend on the architecture of the machine learning model. In either architecture, the semantic drift model is kept fixed when inferring.

As set out above, the semantic drift model may use a linear deep neural network (DNN). In this example, the semantic drift model enables directly tracking of the trajectory of the old class prototypes $$\prod_{old}^{t,n}$$

as the optimisation proceeds. Thus, the second set of old class prototypes can be mapped from the extracted second set of features $$\mathcal{F}_t^n.$$

The distribution of the features of the revived evanescent representations may then be approximated by a Gaussian distribution from the second set of old class prototypes.

As set out above, the semantic drift model may use a variational model and inferring the second set of old class prototypes may comprise using the trained feature drift model to compute the posterior probability $$p\left(\pi \in \prod_{old}^{t,n>0} \middle| F \in \mathcal{F}_t^n; \psi\right) \text{ where } \prod_{old}^{t,n}$$

is the set of prototypes updated at the $n^{th}$ epoch at the step t, $$\mathcal{F}_t^n$$

denotes the set of features extracted using the feature extractor $f_{\Theta_t}$ updated with n optimization epochs at the incremental step t and $\psi$ are the weights of the semantic drift model. In other words, the trained semantic drift model may be used to approximate the probability that the set of features is a member of the set of features for the revived evanescent representations at the nth optimisation stage given the set of features is a member of the set of features for the set of features at the subsequent stage of the optimisation process.

$$p(F \in \mathcal{F}_{old}^n \mid F \in \mathcal{F}_t^n).$$

This distribution of the features of the revived evanescent representations may also be approximated by a Gaussian distribution from the second set of old class prototypes.

In other words, a linear model may be used for at least one of the feature drift model and the semantic drift model. Similarly, a non-linear model may be used for at least one of the feature drift model and the semantic drift model.

Using the inferred second set of old class prototypes to update the ML model may comprise training the feature extraction model and the classification model based on at least one of the inferred second set of old class prototypes and the inferred set of old features. The inferred second set of old class prototypes and the inferred set of old features may be used to generate the revived evanescent representation, i.e. the revived old samples. The training dataset for the updating step may include the data in the new dataset so that the feature extraction model and the classification model are trained on the new dataset with the revived evanescent representations. The training may be done by any suitable means but when training the feature extraction model and the classification model, the feature drift and semantic drift models are kept fixed.

The feature extraction model may be trained using a distillation loss which approximates the difference between the overall classification objective $$L_{cc}^t$$

and the loss $$L_{pc}^t$$

of the previous model $f_{\theta_{t-1}}$ (i.e. the model at the previous incremental time step) on the new dataset $\mathcal{D}_t$. The distillation loss may be expressed as the $\ell_2$ distance between representations (i.e. set of features) extracted from $\mathcal{D}_t$ using the current feature extraction model $f_{\theta_t}$ and the feature extraction model from the previous step $f_{\theta_{t-1}}$.

The classification model may be trained using a cross-entropy loss. The classification model may also be trained using a representation drift loss, for example a representation drift loss function $$L_{rd}^t$$

may be calculated using $$L_{rd}^t \overset{\Delta}{=} L_{rd}\left(\mathcal{F}_{old}^{n,t}\right) = \sum_{F \in \mathcal{F}_{old}^{n,t}} y_F \log h_{\phi t}(F)$$

where $y_F$ is the one-hot label vector of the class $c_F \in \mathcal{C}_{old}$ and $$\mathcal{F}_{old}^{n,t}$$

is the set of revived evanescent representations sampled from the estimated distribution using the updated prototypes of $\mathcal{C}_{old}$.

The feature extraction and classification models may be trained together. For example, the overall classification objective $$L_{cc}^t$$

computed at each step t may be calculated from:

$$L_{cc}^t(D_t, F_{old}^n; \theta_t, \phi_t) = L_{ce}^t + \lambda_{rd} L_{rd}^t + \lambda_{fkd} L_{fkd}^t,$$

where $$L_{ce}^t$$

is the cross-entropy loss, $$L_{rd}^t \text{ and } L_{fkd}^t$$

are the representation drift and distillation loss are used only for t>0 with loss balancing parameters $\lambda_{rd}>0$ and $\lambda_{fkd}>0$.

In another approach of the present techniques, there is provided a method of classifying a sample, the method comprising inputting a sample, e.g. an image; extracting a plurality of features from the sample using a feature extraction model of a classifier which has been trained according to the method described above; classifying the sample based on the extracted plurality of features using a classification model of a classifier which has been trained according to the method described above; and outputting the result of the classifying step to give a classification of the sample.

In another approach of the present techniques, there is provided an apparatus for performing or modelling drift of learned representations for class-incremental learning using a machine learning, ML, model. The apparatus may further comprise at least one image capture device for capturing images or videos to be processed or classified by the trained ML model. The apparatus may further comprise at least one interface for providing a result of the processing by the ML model to a user of the apparatus.

The apparatus may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), transformers and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

The application file contains at least one drawing executed in color. Copies of this patent application publication with color drawing(s) will be provided by the Office upon request and payment of the necessary fee.

Implementations of the present techniques will now be described, by way of example only, with reference to the accompanying drawings, in which:

FIG. 1C is a table showing the definitions of various probability terms used in the methods;

FIG. 2B is an example algorithm for implementing the method of FIG. 2A;

FIG. 5B is a flowchart showing more detail of the training of the classification model in the method;

FIG. 5C shows a block diagram of an apparatus for training the models and implementing the trained model;

FIG. 6G is a table of the results from FIGS. 6A to 6F;

FIG. 7D is a table of the results from FIGS. 7A to 7C;

Figure 16A:
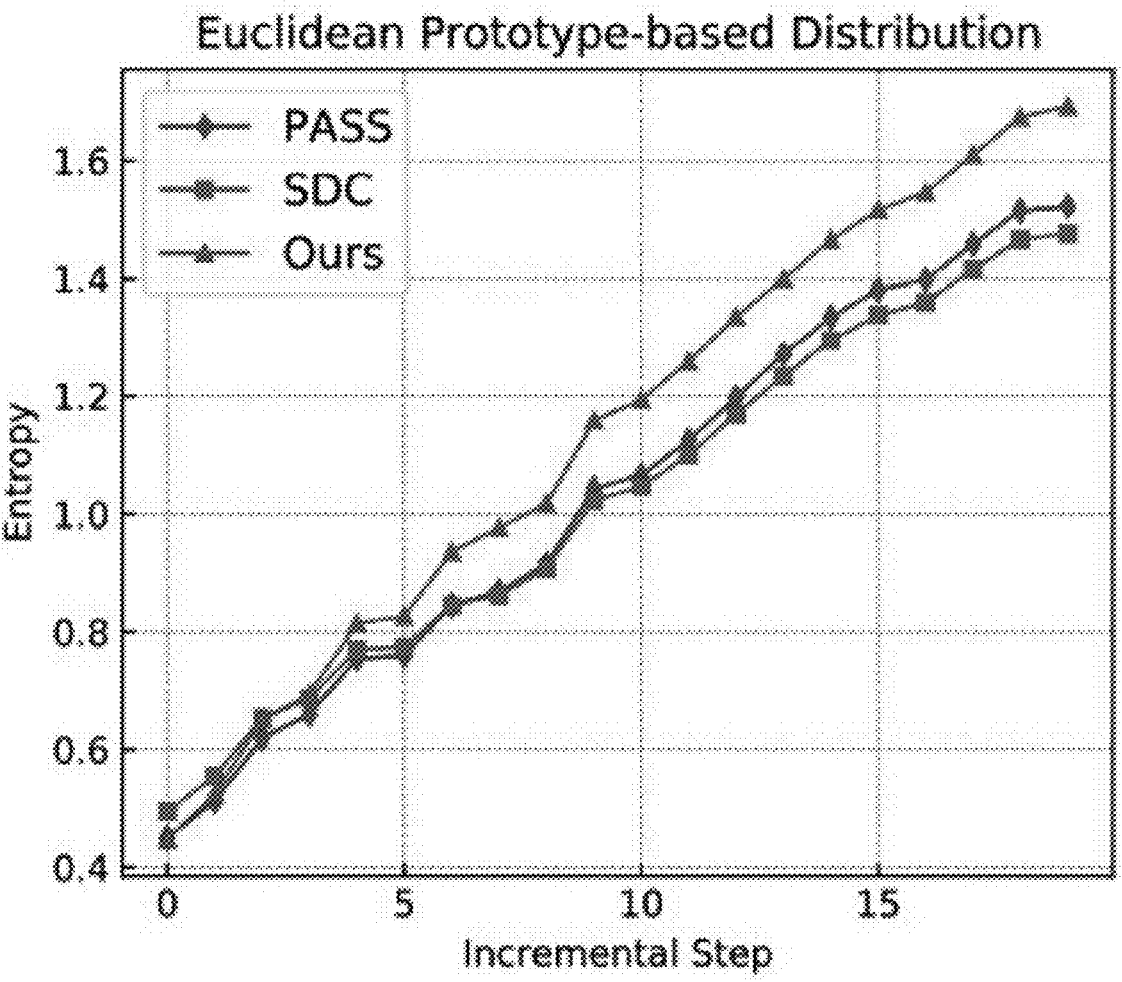
Figure 16B:
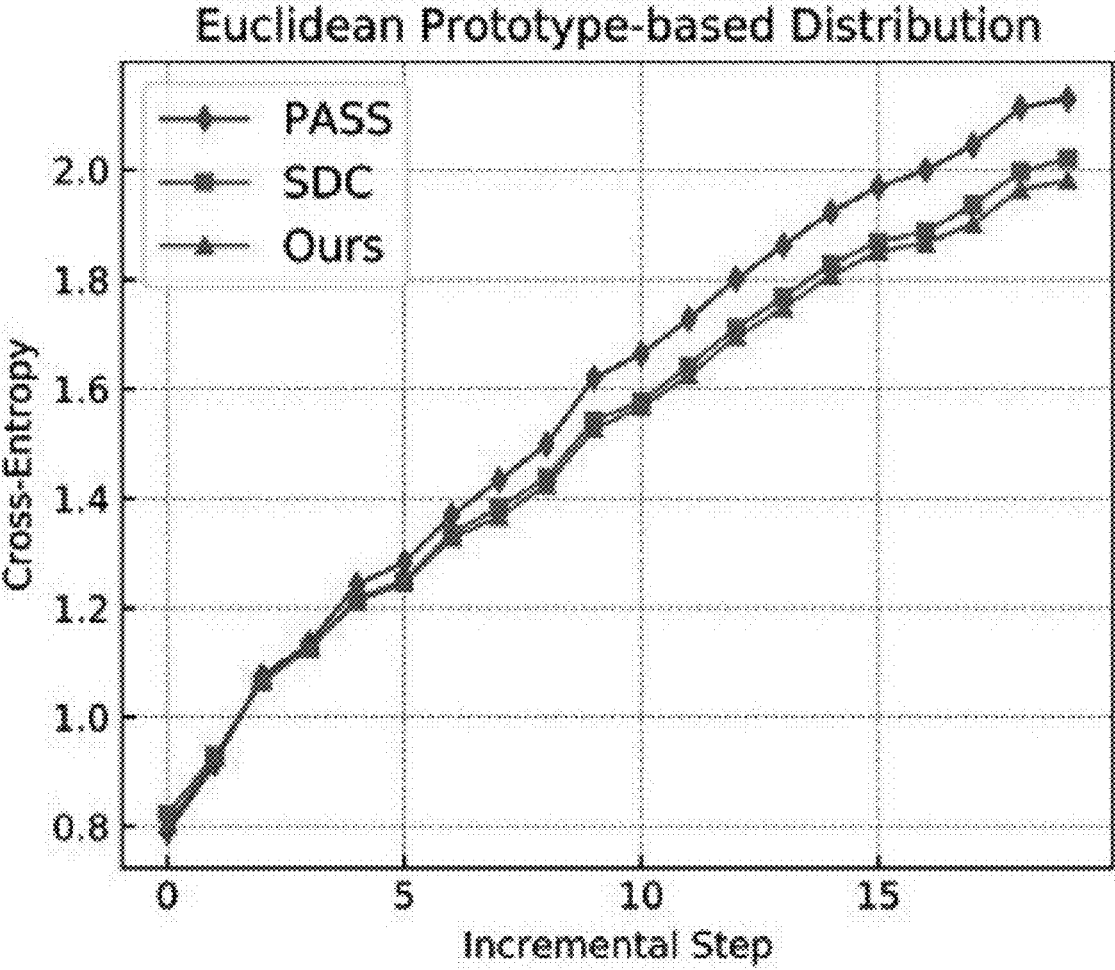
Figure 17A:
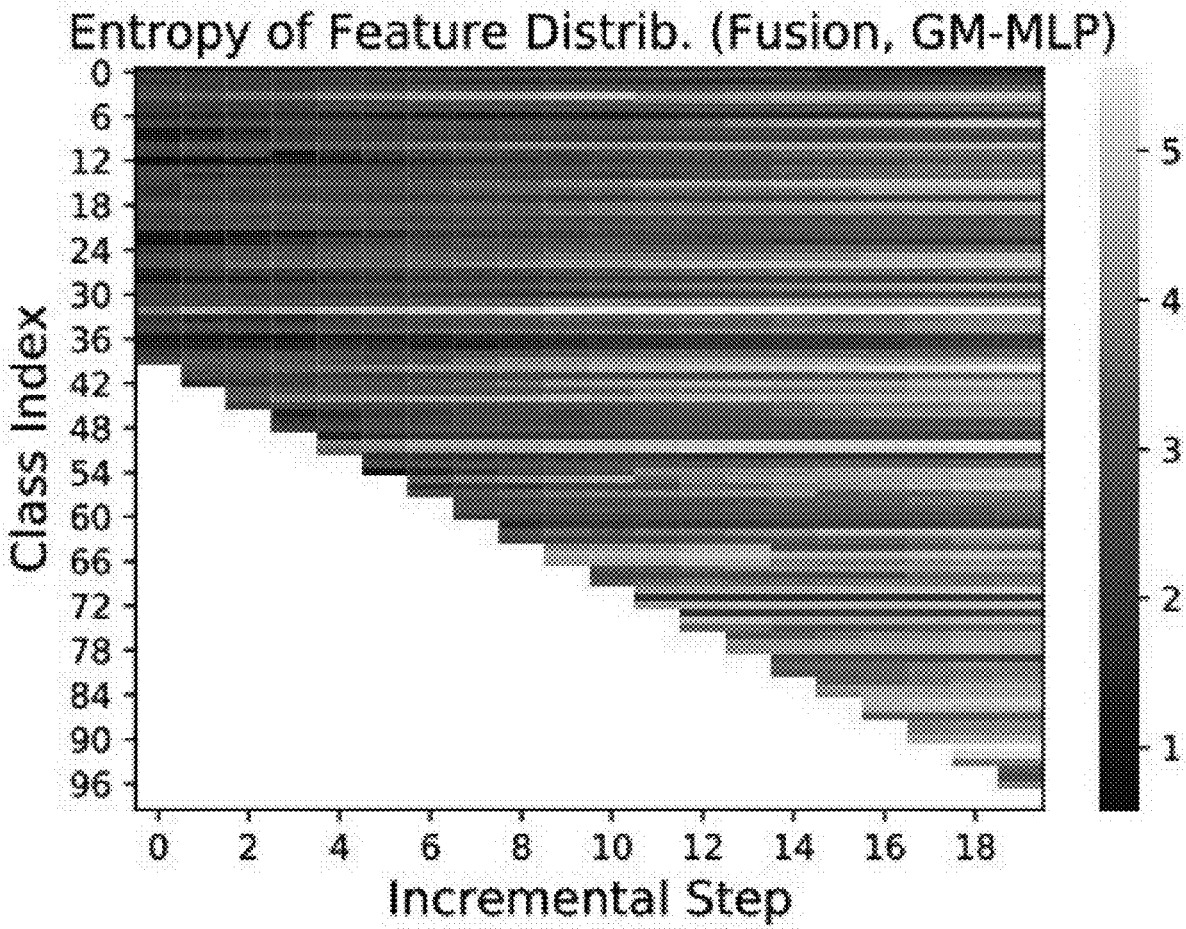
Figure 17B:
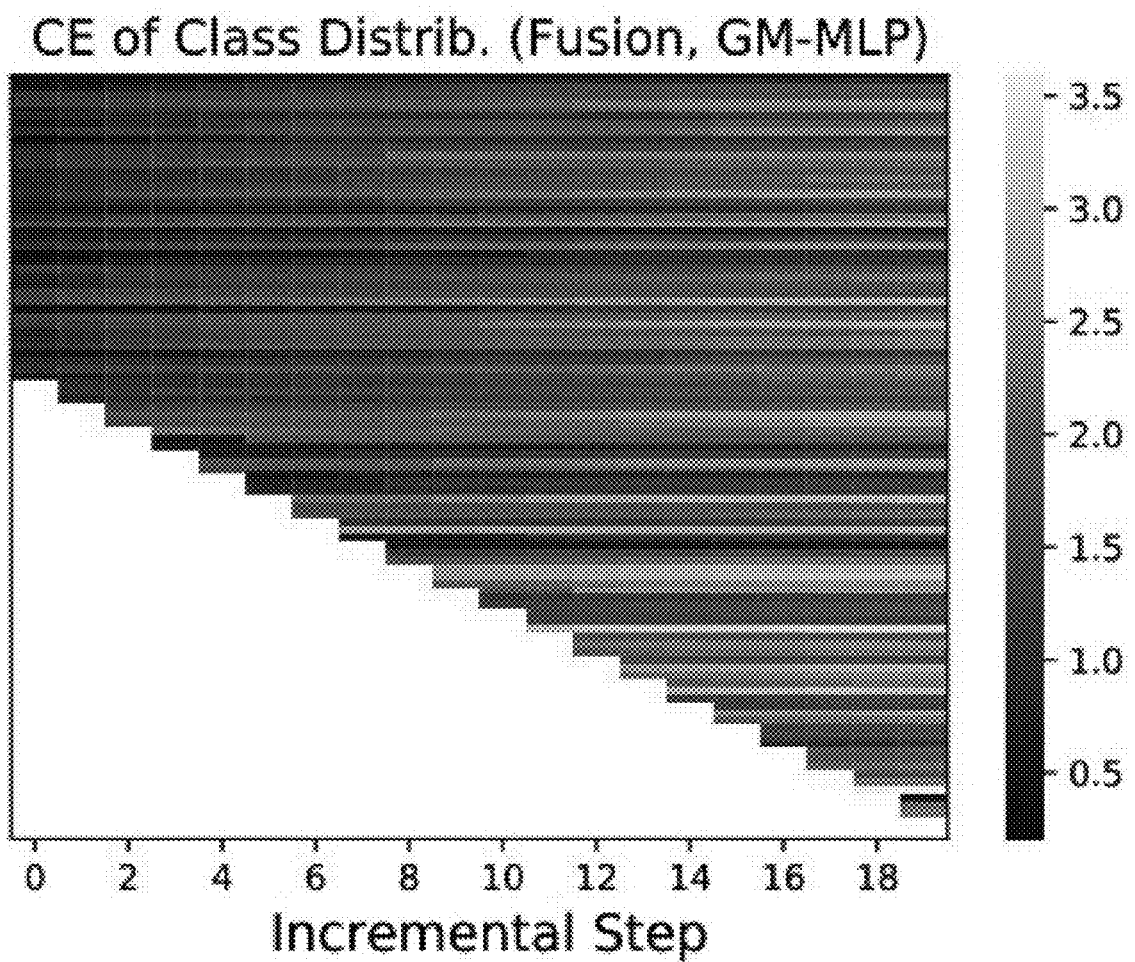
Figure 17C:
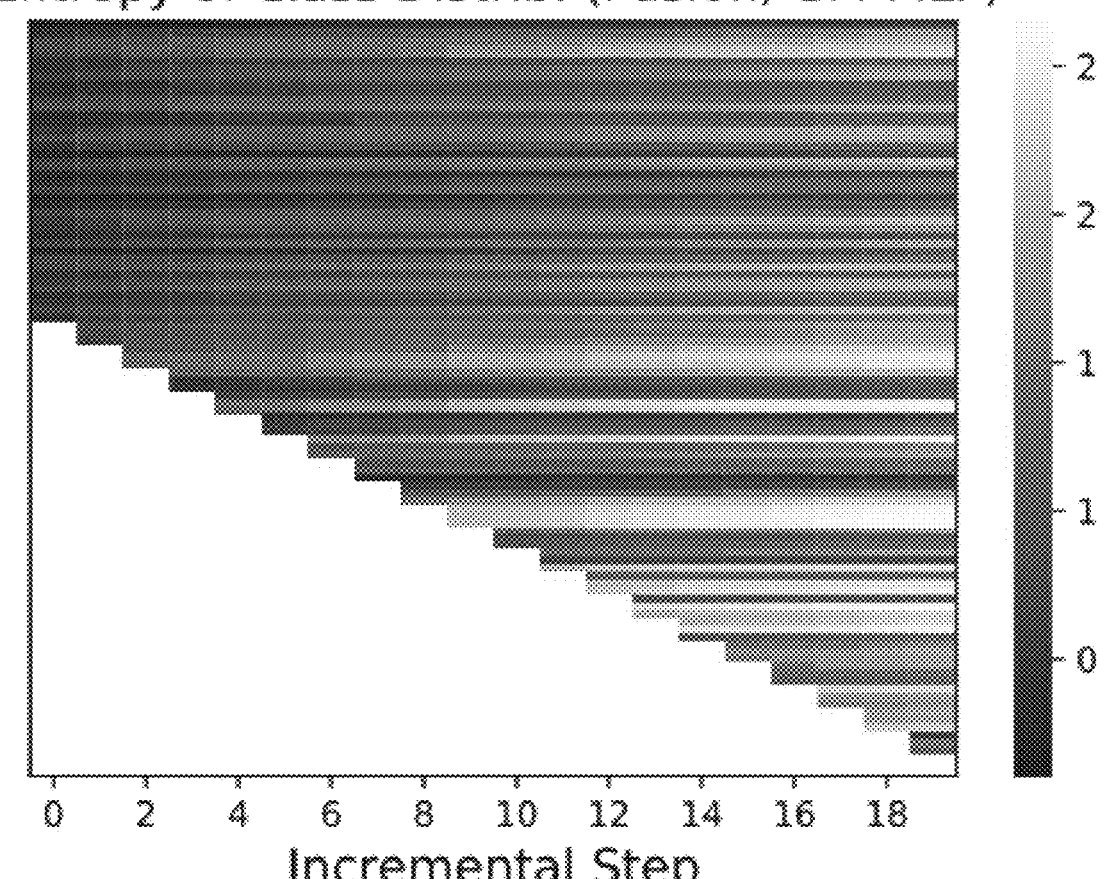
Figure 17D:
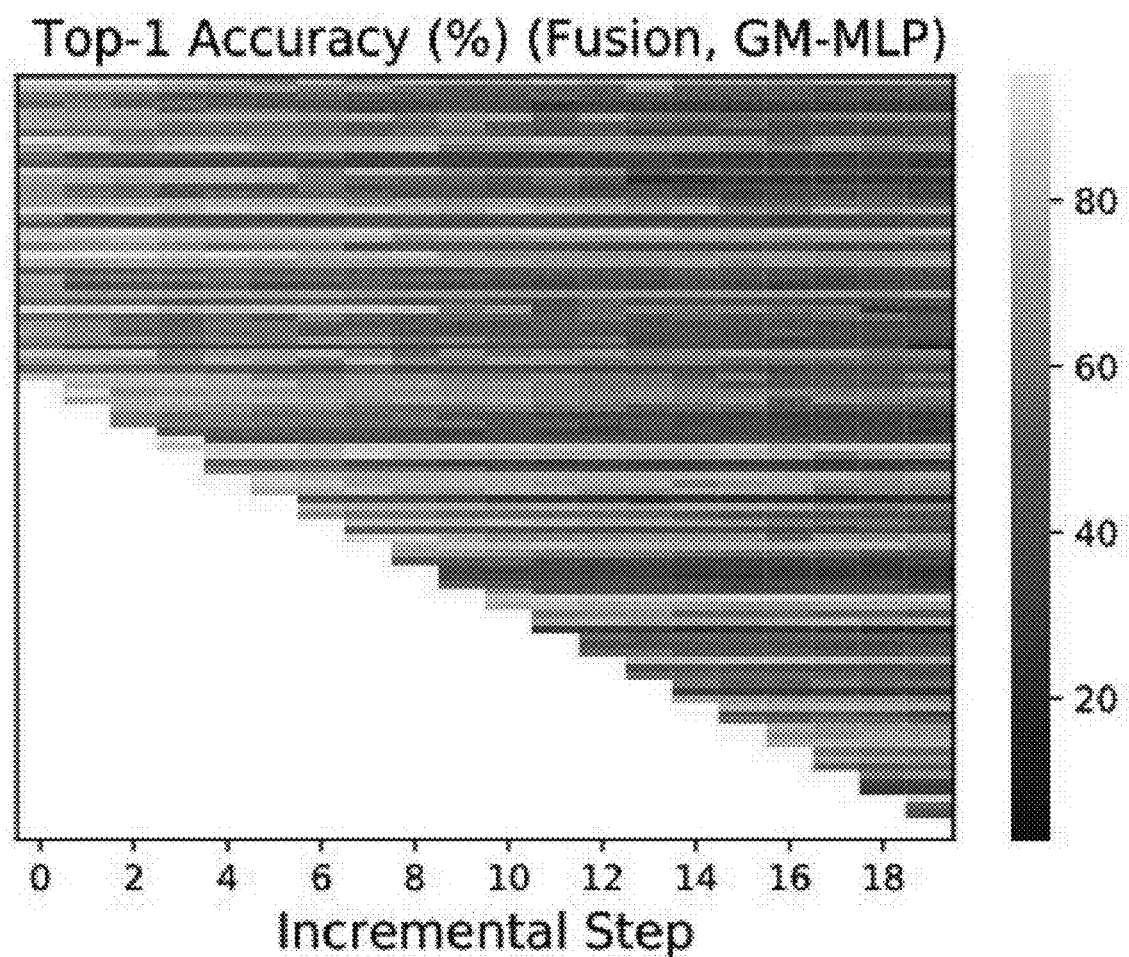
Figure 17E:
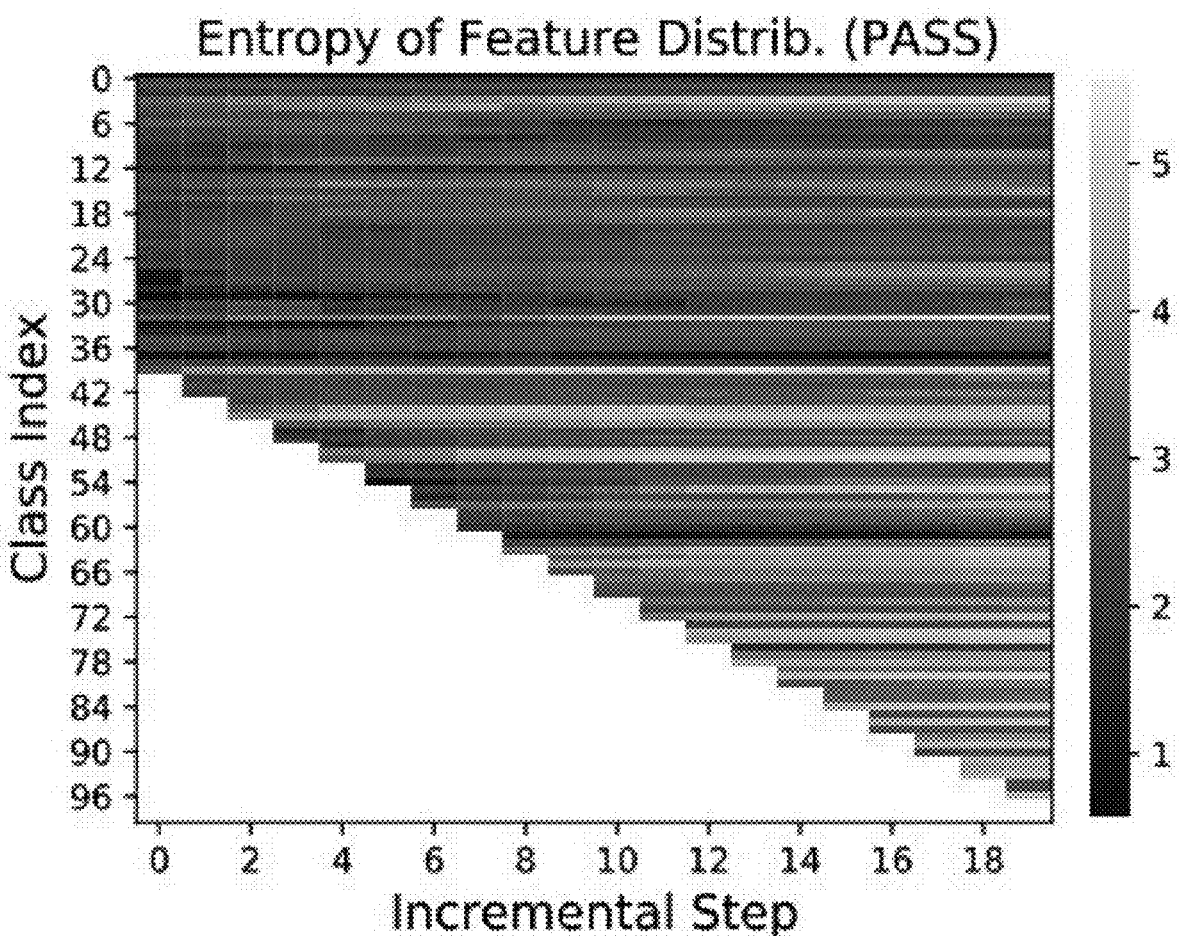
Figure 17F:
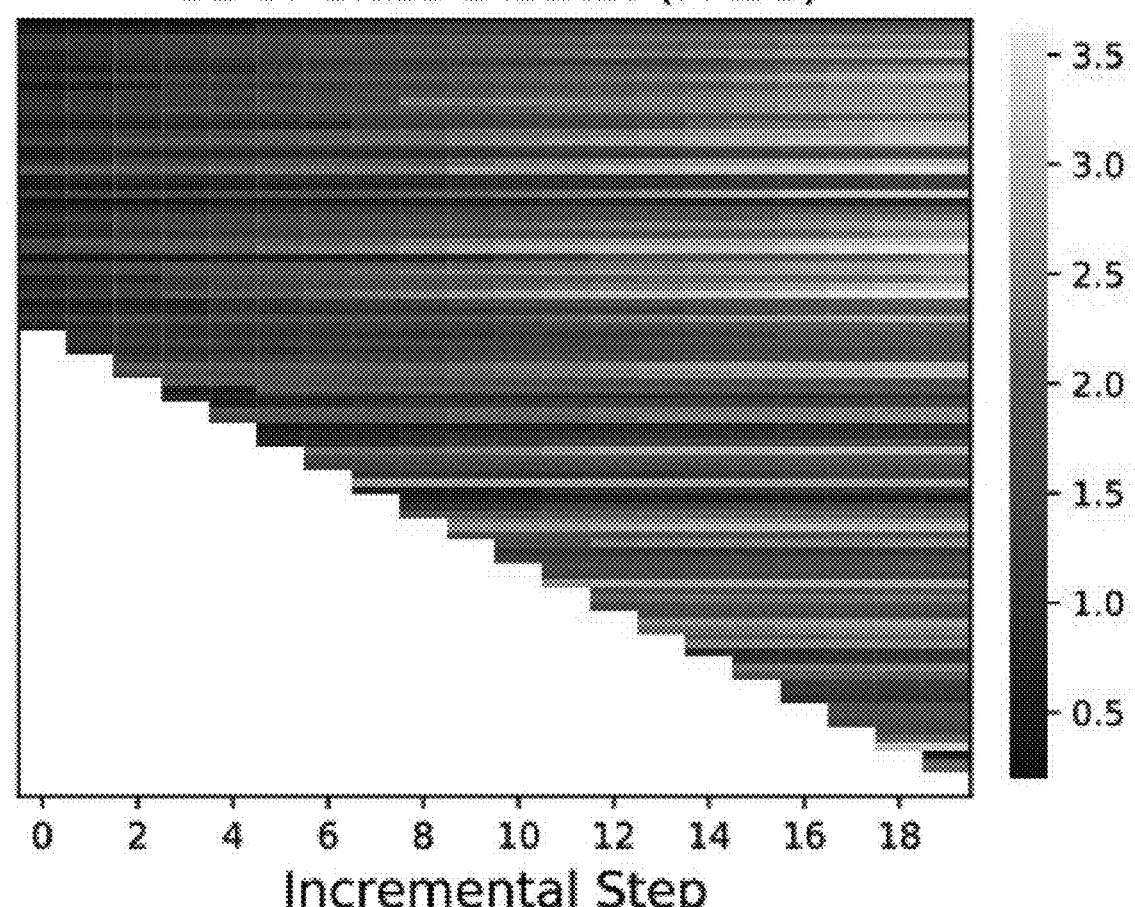
Figure 17G:
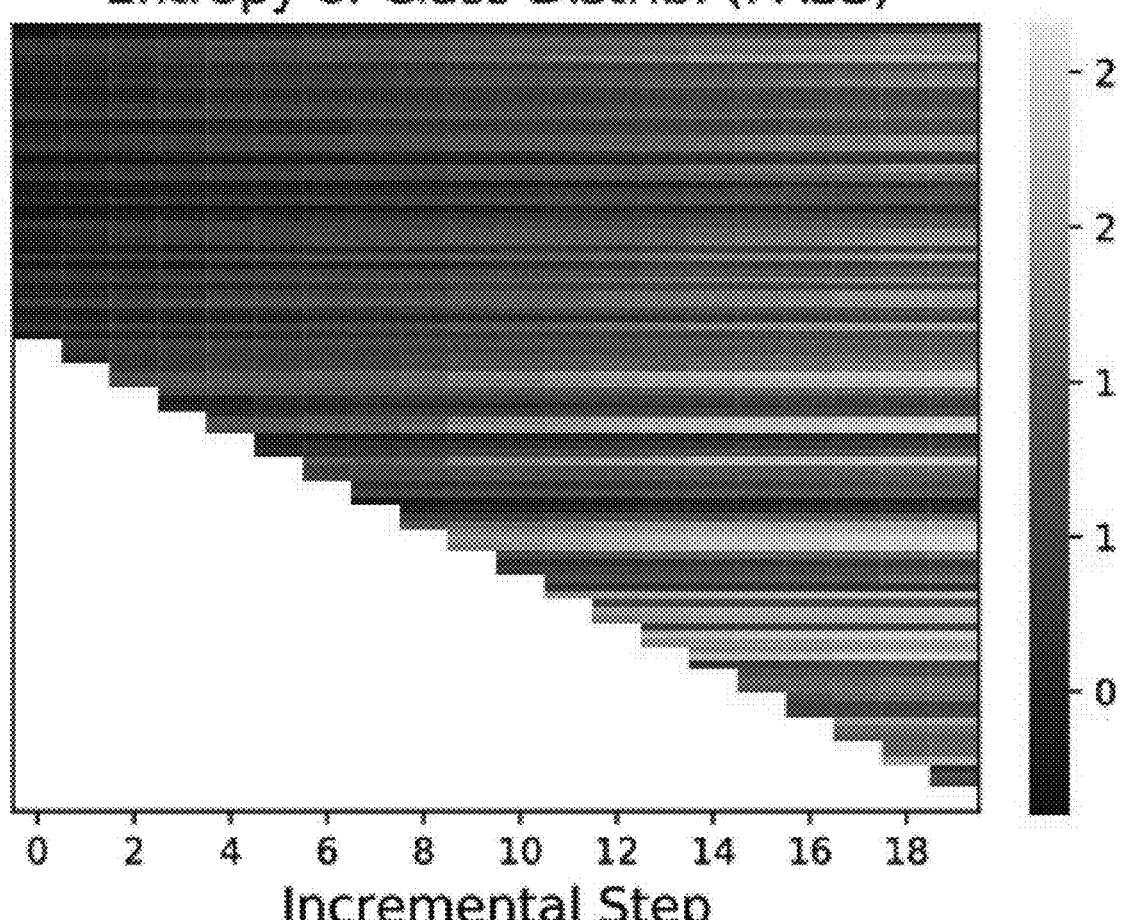
Figure 17H:
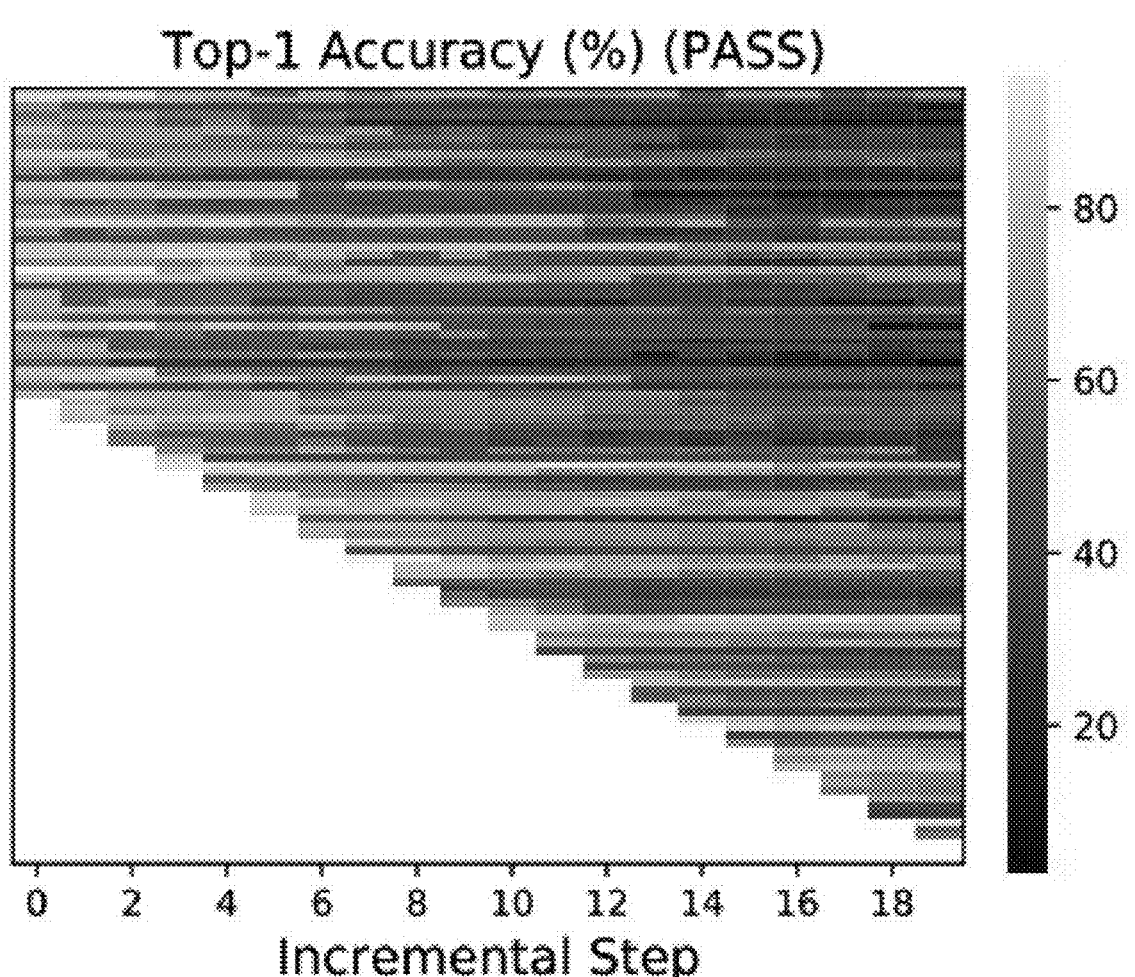
Figure 18A:
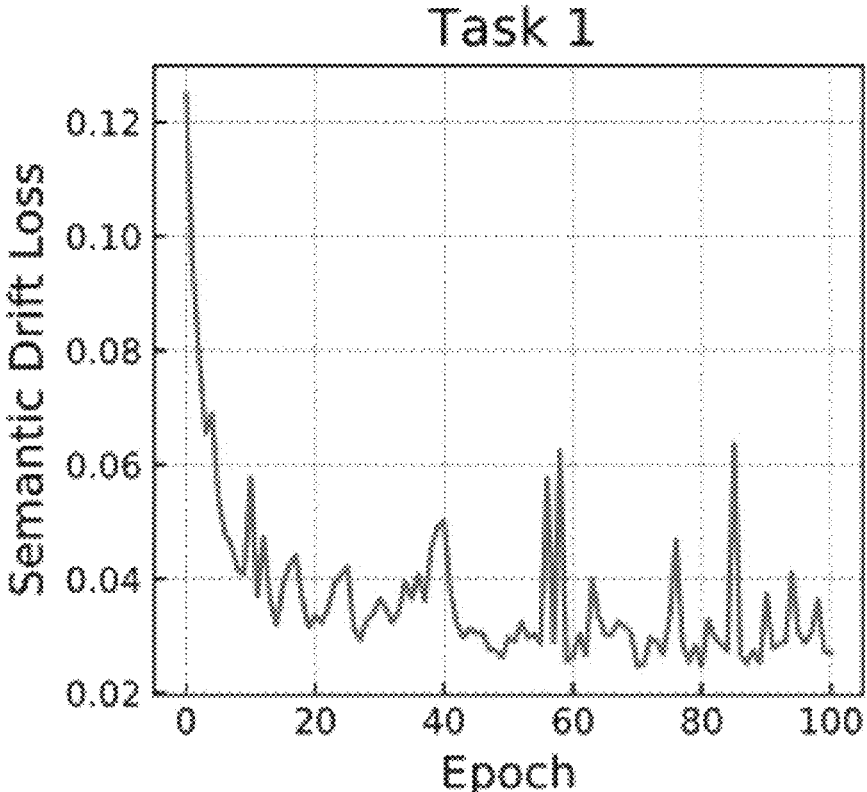
Figure 18B:
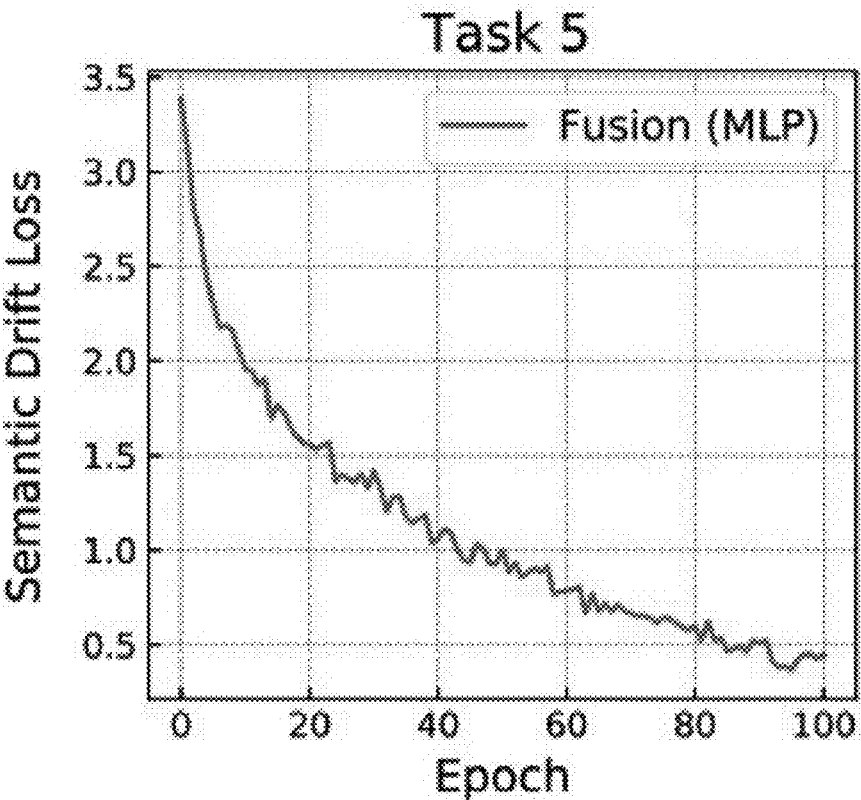
Figure 18C:
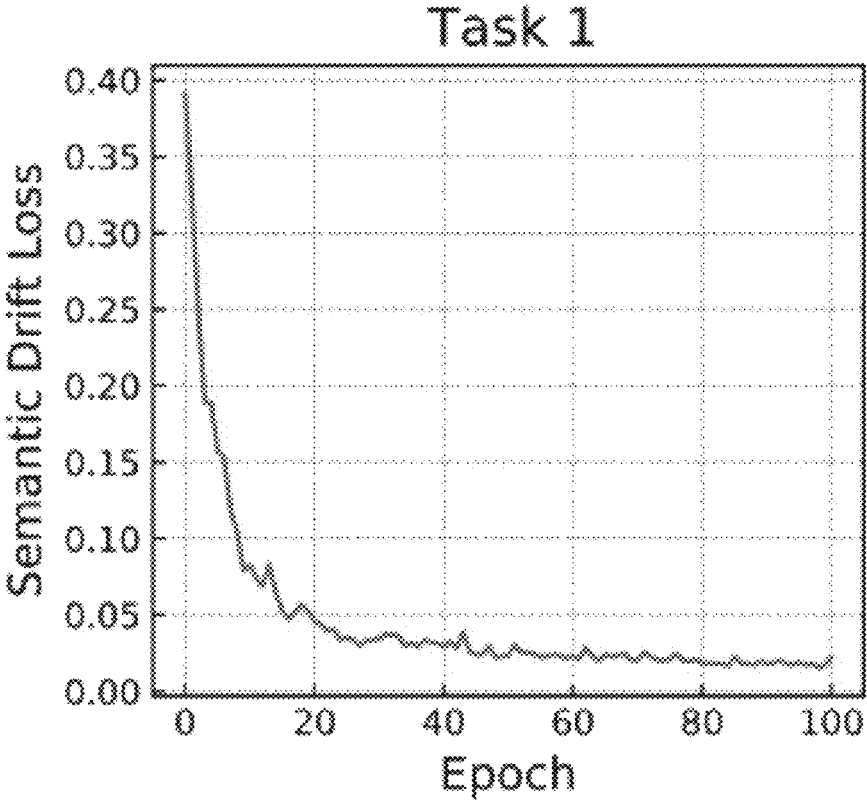
Figure 18D:
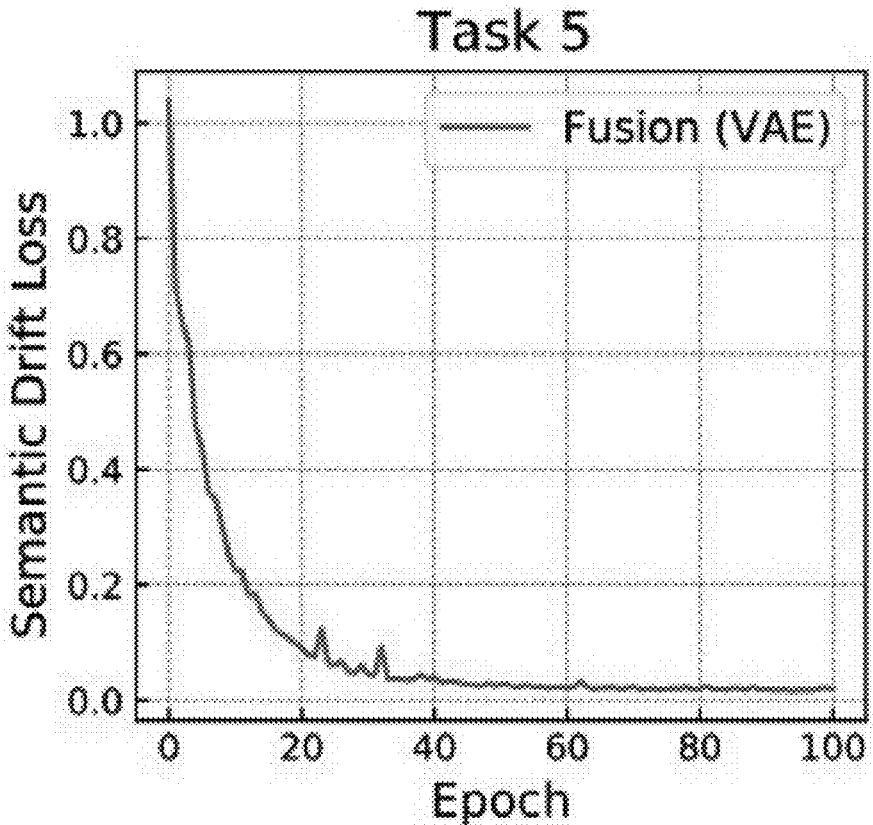
Figure 18E:
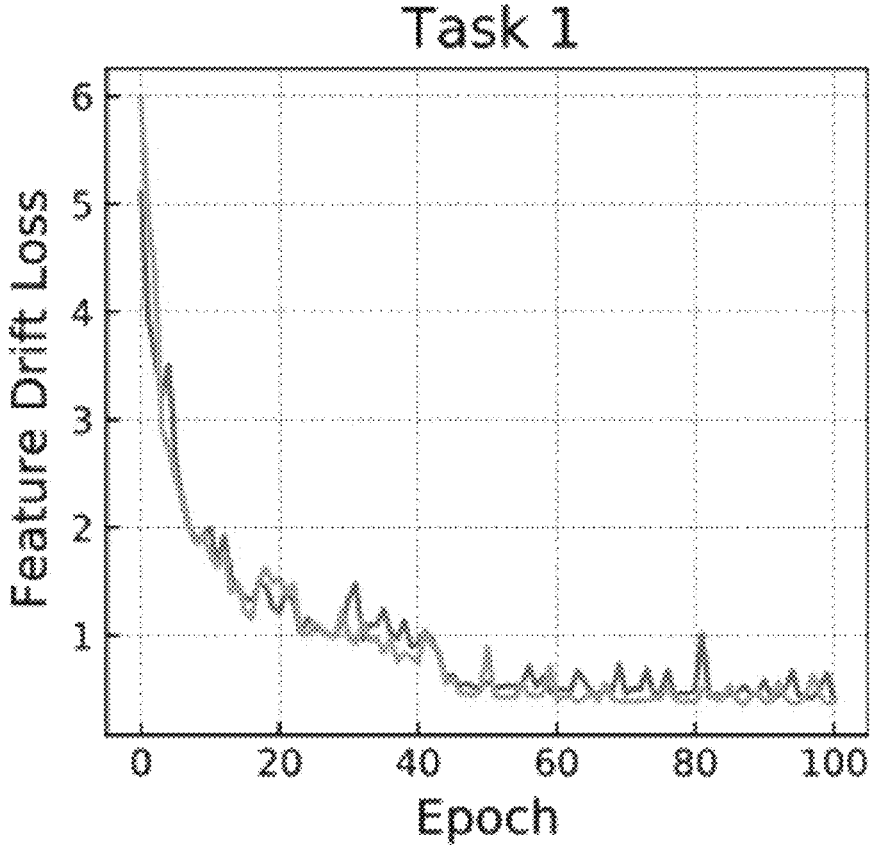
Figure 18F:
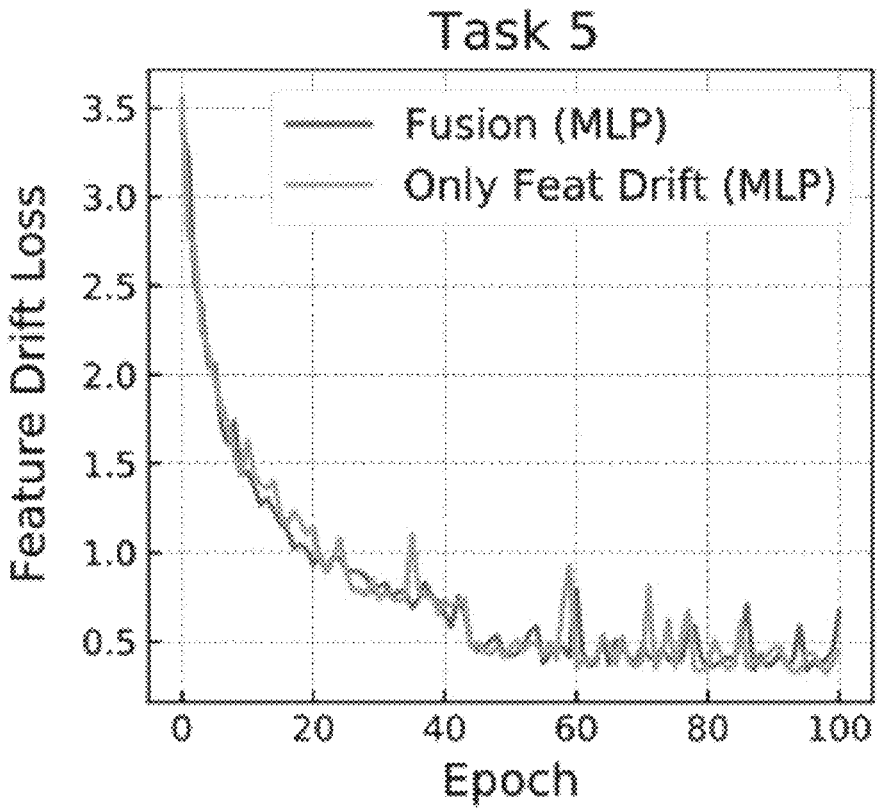
Figure 18G:
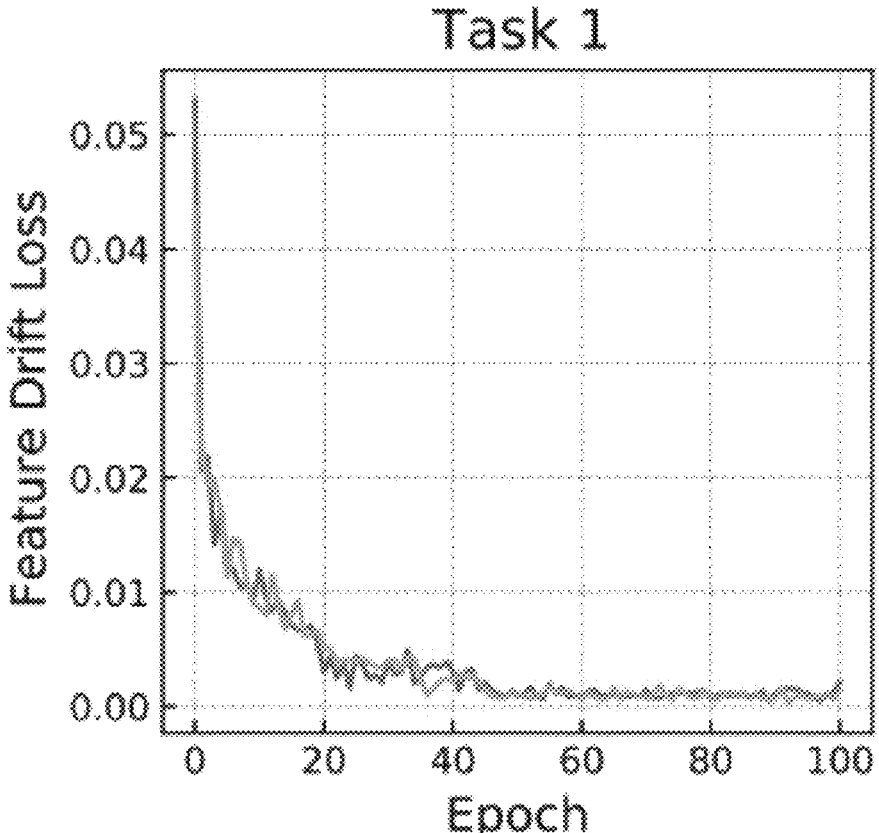
Figure 18H:
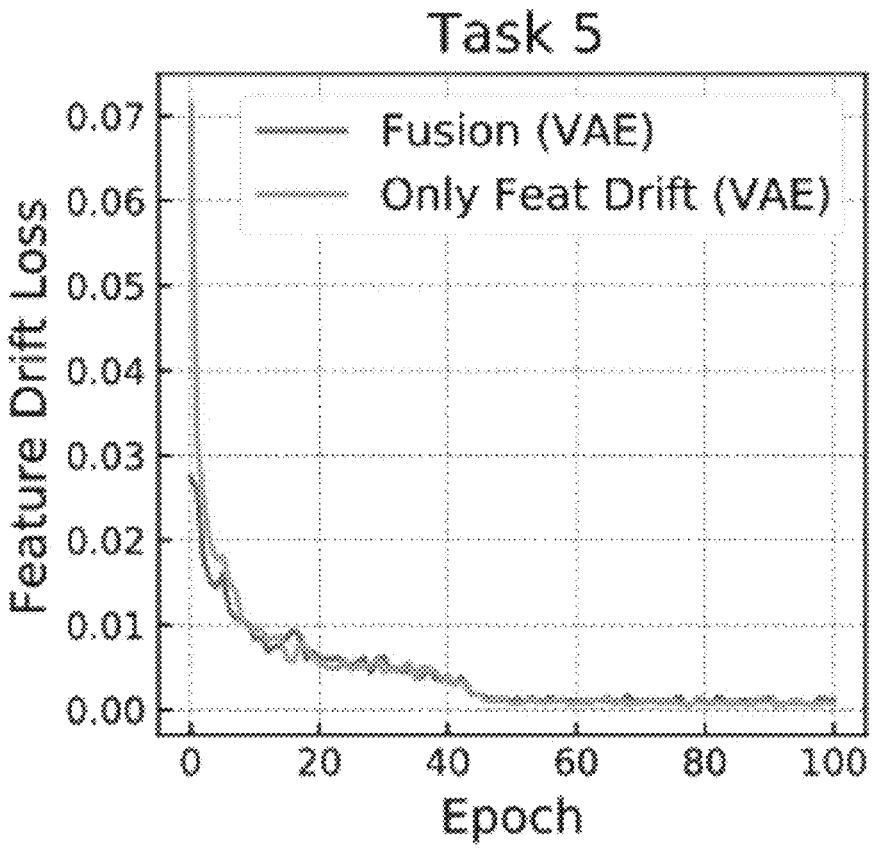

19 and SDC methods applied to the CIFAR100, TinyImageNet and CUB 200-2011 benchmark datasets respectively;

FIG. 16A plots the average entropy of the distribution against incremental step for each of PASS, SDC and our method;

FIG. 16B plots the cross-entropy of the distribution against incremental step for each of PASS, SDC and our method;

FIGS. 17A and 17E plot the class-wise entropy of the feature distribution against incremental step for our method and PASS applied to the CIFAR100 dataset, respectively;

FIGS. 17B and 17F plot the class-wise entropy of the class distribution against incremental step for our method and PASS applied to the CIFAR100 dataset, respectively FIGS. 17C and 17G plot the cross-entropy of the class distribution against incremental step for our method and PASS applied to the CIFAR100 dataset, respectively;

FIGS. 17D and 17H plot the class-wise top-1 accuracy against incremental step for our method and PASS, respectively applied to the CIFAR100 dataset;

FIGS. 18A and 18B plot the semantic drift loss against optimisation stage for the first task and the fifth task when using the MLP adaptation on the CUB 200-2011 dataset;

FIGS. 18C and 18D plot the semantic drift loss against optimisation stage for the first task and the fifth task when using the VAE adaptation on the CUB 200-2011 dataset;

FIGS. 18E and 18F plot the feature drift loss against optimisation stage for the first task and the fifth task when using the MLP adaptation on the CUB 200-2011 dataset; and FIGS. 18G and 18H plot the feature drift against optimisation stage for the first task and the fifth task when using the VAE adaptation on the CUB 200-2011 dataset.

DETAILED DESCRIPTION

As background, it is useful to understand the terms concept drift and representation drift.

Concept drift refers to the change of the input-output relationship (statistics) undergone by data seen by a ML framework. When the ML model is trained on a dataset, it might suffer from performance degradation if applied to data with distribution evolving over time. Concept drift does not necessarily involve a change in model parameters but focuses on how data distribution has drifted from each training phase of the ML model.

Figure 1A:
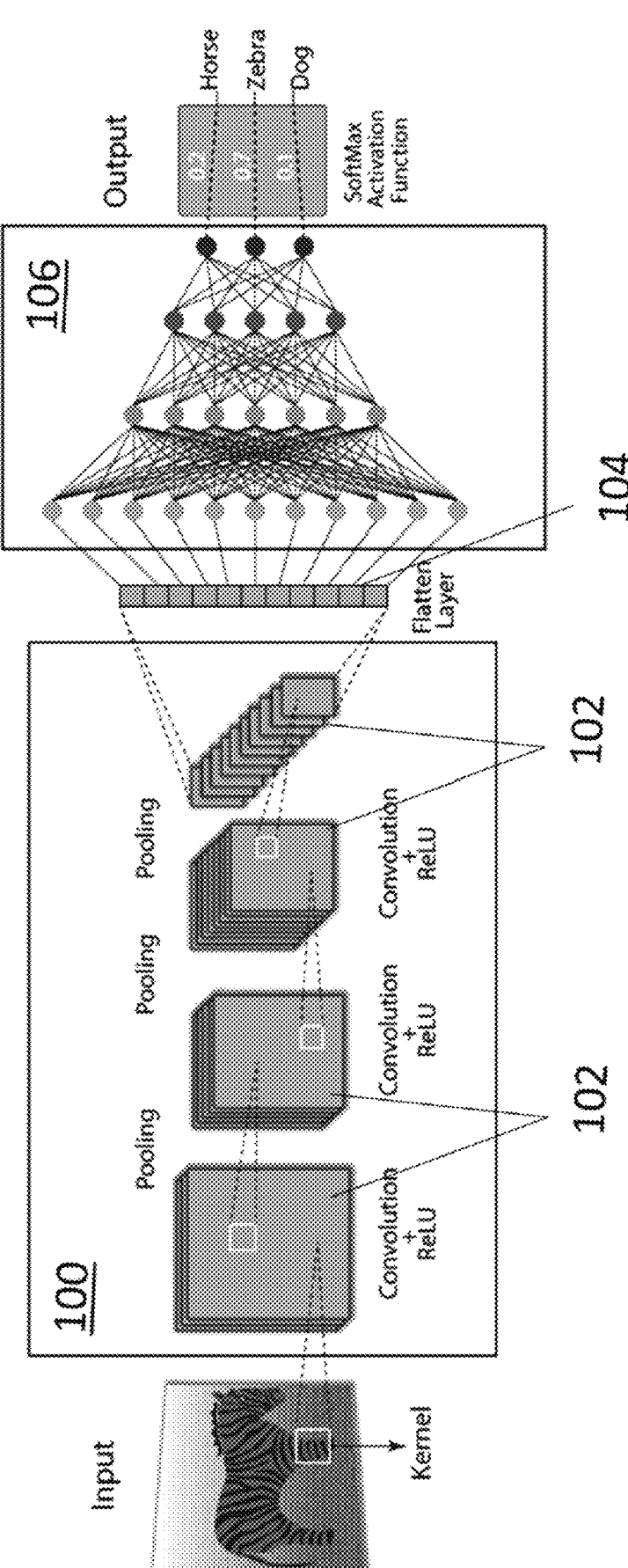
FIG. 1A is a schematic representation of a machine learning model which may be used for image classification.
Figure 1B:
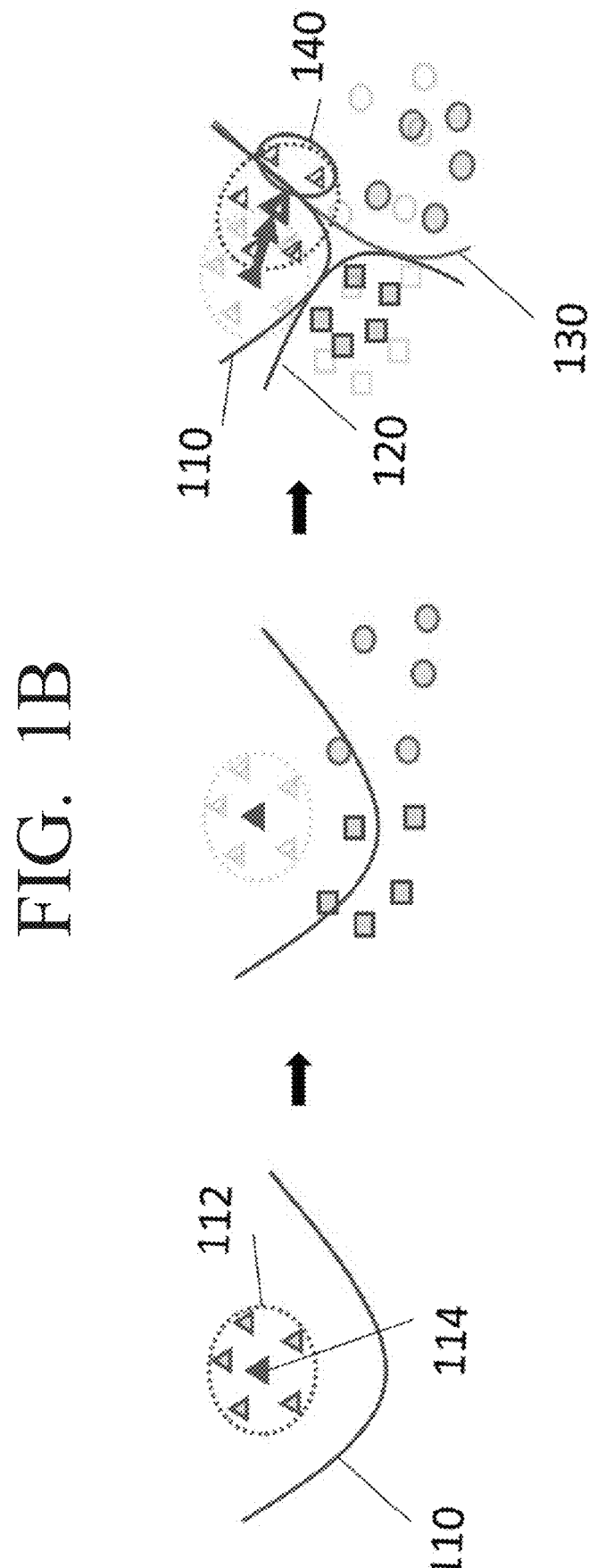
FIG. 1B is a schematic representation of class incremental learning (CIL) applied to the model of FIG. 1A.

Representation drift indicates how feature representations learned by a ML model are constantly evolving throughout its training procedure. When optimizing a ML model with training samples, model parameters are updated to provide feature representations that better help to solve the target task on the available samples. In a continual learning framework, the constantly changing feature representations used to better model current training data distribution leads to catastrophic forgetting as illustrated in FIG. 1B. This means that representations extracted from past data are becoming staler and progressively less useful to solve the target task. When modeling the drift in feature representations, we can prevent forgetting by employing updated knowledge of no longer accessible feature representations from former training phases.

As explained in more detail below, the proposed new framework may be considered to learn the relationship and drift between old and new classes in order to re-estimate the semantic representations (e.g. prototypes) of old classes using the continually evolving feature representations. We show that our learnable framework modeling representation drift provides models with higher capacity, and leads to overall improved classification performance. For example, experiments on multiple benchmarks show that the proposed approach achieves SotA results for the CIL problem. The proposed new framework uses CIL and more background on the learning representations for CIL is set out below.

Learning Representations in CIL

At each step $t \in [T] = \{0, 1, \ldots, T\}$ of CIL, we are given a dataset $\mathcal{D}_t = (\mathcal{X}_t, \mathcal{Y}_t)$, t=0, . . . , T, where $$\mathcal{X}_t = \{x_{t,j}\}_{j=1}^{N_t}$$

is the set of samples, $$\mathcal{Y}_t = \{y_{t,j} \in C_t\}_{j=1}^{N_t}$$

is the set of their labels. $\mathcal{C}_t$ is the set of class labels observed at this step, and $\mathcal{C}_t \cap \mathcal{C}_{t'} = \emptyset$, $\forall t \neq t'$.

As in other popularly employed CIL models [43], the proposed framework is composed of a feature extraction model $f_\theta \in \mathcal{F}$ and a classification model $h_\phi \in \mathcal{H}$ with parameters $\theta \in \Theta$ and $\phi \in \Phi$. An example of such a CIL model is shown in FIG. 1A. At each $t^{th}$ step, the models are trained by any suitable technique for example using a loss function such as:

$$\operatorname*{argmin}_{\theta_t, \phi_t, \epsilon} L_{cc}^t + \sum_{t'=0}^{t-1} \epsilon_{t'}, \tag{1}$$

where $$L_{cc}^t \triangleq L_{\mu_t}(\mathcal{D}_t; \theta_t, \phi_t)$$

is the expected loss of the model $g_t \triangleq h_{\phi_t} \circ f_{\theta_t}$ on the data $\mathcal{D}_t$ sampled from a distribution $\mu_t$ at step t. The slack variable $\epsilon_t \geq L_{cp,t} - L_{pp,t'}$ measures the difference between the loss of the current model on the previous datasets $$\{\mathcal{D}_{t'}\}_{t'=0}^{t-1}$$

denoted by $L_{cp,t'} \triangleq l(g_t(\mathcal{D}_{t'}))$, and the loss of the previous models $$\{g_{t'}\}_{t'=0}^{t-1}$$

on the previous datasets $$\{\mathcal{D}_{t'}\}_{t'=0}^{t-1}$$

denoted by $L_{pp,t'} \triangleq l(g_{t'}(_{t'}))$. The variable $\epsilon_t$ controls forgetting of representations of old classes.

Generative classifiers, such as Bayesian networks or supervised variational autoencoders (VAEs), implementing $h_\phi \in \mathcal{H}$ optimize equation (1) to model joint distribution of classes and features $p(C, F; \mathcal{P})$ where $\mathcal{P} = \Theta \cup \Phi$ is the set of parameters of the model. Discriminative classifiers, such as a softmax classifier, optimize equation (1) to model $p(C|F; \mathcal{P})$.

In CIL, we do not have access to samples $$\{\mathcal{D}_{t'}\}_{t'=0}^{t-1}$$

at time t. CIL methods aim to model $p(C, F|\mathcal{P}_t)$ without using $$\{\mathcal{D}_{t'}\}_{t'=0}^{t-1},$$

where $$\mathcal{P}_t = \Theta_t \cup \Phi_t, \Theta_t = \{\theta_{t'}\}_{t'=0}^{t} \text{ and } \Phi_t = \{\phi_{t'}\}_{t'=0}^{t},$$

$F \in \mathcal{F} = \mathcal{F}_t \cup \mathcal{F}_{old}$ is the random variable taking values from the set of feature representations $\mathcal{F}_t$ learned at step t on $\mathcal{D}_t$ and from $$\mathcal{F}_{old} = \{\mathcal{F}_{t'}\}_{t'=0}^{t-1},$$

and $C \in \mathcal{C} = \mathcal{C}_t \cup \mathcal{C}_{old}$ is a random variable of semantic (class) representations, where $$C_{old} = \{C_{t'}\}_{t'=0}^{t-1}.$$

It is noted that in some CIL models, models trained at earlier steps t'<t are frozen and reused at consecutive steps, while the other methods incrementally update the models at each step. In the latter case, $$\mathcal{P}_t = \{\theta_t\} \cup \{\phi_t\}$$

In order to elucidate the dynamics of models used for CIL in this setting, we factorize the class posterior probability $p(C \in \mathcal{C} | F \in \mathcal{F})$ by $$p(C \in C | F \in \mathcal{F}) \propto \frac{P_A - P_B}{P_C}, \tag{2}$$

where $P_C$, $P_A$: $=P_1 + P_2 + P_3 + P_4$, and $P_B$: $=P_{12} + P_{13} + P_{14} + P_{24} + P_{34}$ are expressed in Table 1 shown in FIG. 1C. It is noted that, for the sake of simplicity, $\mathcal{P}_t$ is dropped from the statements when dependency on $\mathcal{P}_t$ is trivial.

Deep learning models have been employed to estimate and model these probabilities implicitly at different parts of the models by learning feature representations of old and new classes, and make predictions for the new classes as follows:

Class posterior probabilities for old ($p(C \in \mathcal{C}_{old}|\bullet)$) and new classes ($p(C \in \mathcal{C}_t|\bullet)$) are computed using classifiers $h_{\Phi_t} \forall t' \in [t]$.

Feature representations $\mathcal{F}_t$ of new classes $\mathcal{C}_t$ are learned by updating $f_{\Theta_{t'}}, \forall t' \in [t]$.

Evanescent Representations: At the $t^{th}$ step, we do not have access to old samples $\mathcal{D}_{old} = \{\mathcal{D}_{t'}\}_{t'=0}^{t-1}$. Thus, features $\mathcal{F}_{old}$ cannot be extracted from $\mathcal{D}_{old}$. Therefore, state-of-the-art methods aiming to learn representations considering equation (2) treat the term $P_C$, which denotes distribution of features learned using old classes, as a normalizing partition function, and ignore it to compute $$p(C \in C | F \in \mathcal{F}) \propto P_A - P_B. \tag{3}$$

As explained in more detail below, to address this problem and bring the evanescent representations to life, we employ class prototypes (templates or prototypical representations, the terms can be used interchangeably) $\pi \in \Pi_{old}$. These class prototypes can be obtained using any standard technique, for example as taught in [43] and may be regarded as semantic representations of $C_{old}$. We leverage prototypes at the beginning of an incremental step to model their distribution $p(F \in \mathcal{F}_{old}|\pi_c \in \Pi_{old})$ where $\pi_c$ which is the class prototype for the class c. We estimate the distribution as described in more detail below, then we update $p(F \in \mathcal{F}_{old})$ throughout the incremental step by modeling the representation drift to revive evanescent representations.

Figure 2A:
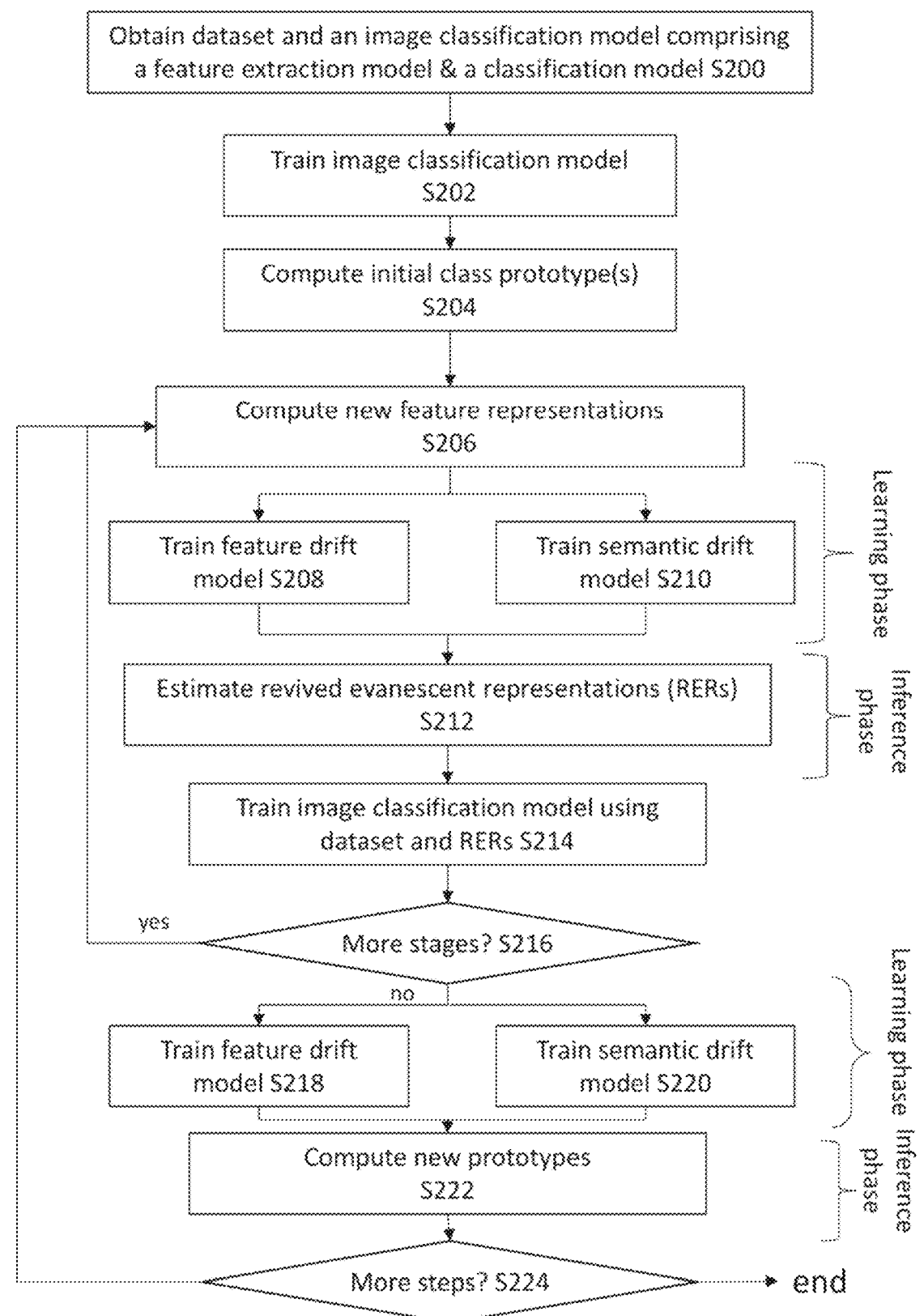
FIG. 2A is a flowchart of the method of the present techniques.

FIG. 2A is a schematic flowchart of the method which is used to overcome the problems outlined above and which is described in more detail below. In general terms this new framework models the drift undergone by data representations by (i) learning the semantic drift between past and novel classes and (ii) estimating the evolution of features extracted by the classification model. Semantic and feature drifts may be jointly exploited to access up-to-date representations of data of past classes. Merely as an example, in addition to the improvements noted over [43] in the background section, [43] also does not directly capture the relationship between semantic representations of old ($\Pi_{old}$) and new classes ($\Pi_t$), rather focusing on estimating the connection between across-task drifts of the representations, and neglects what we call feature representation drift, that is the joint evolution of model features during single task training (i.e., they treat feature representation drift independently for each feature channel).

FIG. 2B shows an example of an algorithm which can be used to implement the training of the classifier as shown in the flowchart of FIG. 2A. The first step of the algorithm is to input a dataset $$\{\mathcal{D}_t = (\mathcal{X}_t, \mathcal{Y}_t)\}_{t=0}^{T} \text{ where } \mathcal{X}_t = \{x_{t,j}\}_{j=1}^{N_t}$$

is the set of samples, $$\mathcal{Y}_t = \{y_{t,j} \in C_t\}_{j=1}^{N_t}$$

is the set of their labels. $\mathcal{C}_t$ is the set of class labels observed at this step, $N_t$ is the number of samples per step and $\mathcal{C}_t \cap \mathcal{C}_{t'} = \emptyset, \forall t \neq t'$. This first step is shown as S200 in FIG. 2A and at this first step, in addition to the dataset, the classifier which is to be trained is also obtained. The proposed framework is composed of a feature extraction model $f_\theta \in \mathcal{F}$ and a classification model $h_\phi \in \mathcal{H}$.

As shown in the algorithm and also in step S202, the next step is to train both the feature extraction model $f_{\theta_o}$ and the classification model $h_{\phi_0}$ for the incremental time step 0 using a loss function $$L_{cc}^0$$

on the initial dataset $\mathcal{D}_0$. Once the model has been trained for time step 0, the class prototype(s)

$$\prod_{new}^0$$

can be computed and then we initialise $$\prod_{old}^{t=1,0} \text{ as } \prod_{new}^0.$$

The loss function and the computation of the class prototypes are described in more detail below. Steps S202 and S204 may thus be considered an initialisation phase.

The following processes are then repeated for each step t>0. As shown at step S206, the set of features at the beginning of the step $$\mathcal{F}_t^0$$

and at the nth optimisation stage of the step $$\mathcal{F}_t^n$$

are extracted or computed using the trained feature extractor model and the new class data $\mathcal{D}_t$ for that time step. As shown in steps S208 and S210, the relationship between old and new semantic and feature representations are modeled using two models. A feature drift model $\Gamma_\gamma$ is parameterized by $\gamma$, and is used to represent feature drift. A semantic drift model $\Psi_\psi$ is parameterized by $\psi$ and is used to represent semantic drift. The parameters $\gamma$ and $\psi$ may be optimized in n epochs (or stages) using an optimization algorithm, while training models at each incremental step to estimate the relationship among representations. This first phase may be termed a learning phase, and the models $$\Gamma_{\gamma_t^n} \text{ and } \Psi_{\psi_t^n}$$

at each stage n and each step t are trained by any suitable method either jointly or separately as described in more detail below.

Once the models $\Gamma_\gamma$ and $\Psi_\psi$ have optimized parameters, they are used to estimate the revived evanescent representations (RERs) as shown at step S212. The method of estimating the revived evanescent representations depends on the architecture as explained in more detail below. For example, the revived evanescent representations may be estimated by first estimating $$\mathcal{F}_{old}^n$$

which are the set of features for the revived evanescent representations at the nth optimisation stage. As explained in more detail below, $$\mathcal{F}_{old}^n$$

may be estimated by using the semantic drift model and feature drift model individually or fused. Then, the old class prototypes $$\prod_{old}^{t,n}$$

may be computed by class-wise averaging features sampled from $$p(F \in \mathcal{F}_{old}^n).$$

This phase may be termed the inference phase.

The next step S214 is then to train the feature extraction model $f_{\theta_t}$ and the classification model $h_{\phi_t}$ on the updated dataset which is the original dataset for the time step together with the revived evanescent representation, i.e.

$$\widetilde{\mathcal{D}_t} = D_t \cup \mathcal{F}_{old}^n.$$

As for the semantic and feature drift models, the parameters of the feature extraction and classification models may be optimized in n epochs (or stages) using an optimization algorithm. The training may be done using any suitable technique as described in more detail below.

As shown in steps S208, S210 and S214, there is alternating training of the semantic drift and feature drift models, and the feature extraction and classification models for each optimisation stage. As shown in step S216, there is an inner loop within the algorithm to include an optional optimisation at each incremental time step t. The optimisation may be over N stages (also termed epochs). If n<N, there is an iteration through steps S206 to S214 to train the semantic drift and feature drift models $$\Gamma_{\gamma_t^n} \text{ and } \Psi_{\psi_t^n}$$

in the first phase (learning phase) and then in the second phase (inference phase) to infer the revived evanescent representations which are used to train the feature extraction model $f_{\theta_t}$ and the classification model $h_{\phi_t}$.

In other words, at the end of each optimization stage n, the feature extraction model $f_{\theta_t}$ and the classification model $h_{\phi_t}$ are updated (step 7 of Algorithm 1). It is noted that at n=0, the feature extraction model $f_{\theta_t}$ and the classification model $h_{\phi_t}$ are not updated either in the learning phase or the inference phase because they are already known either from the previous time incremental step or from the initialisation.

After the inference phase for n=0, we update the feature extraction model $f_{\theta_t}$ and the classification model $h_{\phi_t}$. These updated models are used in the learning and inference phases for n=1. This procedure is then implemented at each stage.

Once there are no more stages, i.e. for n=N, as shown at step S216, there is a final learning phase for the incremental step in which the semantic drift and feature drift models $$\Gamma_{\gamma_t^N}$$

and $$\Psi_{\psi_t^N}$$

are trained at steps S218 and S220. Once all the optimisation stages have been completed, at step S222, we compute the new prototypes $$\prod\nolimits_{new}^{t} = \{\pi_c,\, c \in C_t\}$$

by class-wise average of feature representations $f_{\theta_t}(\mathcal{D}_t)$ of input samples and re-initialise the complete set of class prototypes for the next time step as $$\prod\nolimits_{old}^{t+1,0} = \prod\nolimits_{old}^{t,n} \cup \prod\nolimits_{new}^{t}, \text{ where } \prod\nolimits_{old}^{t,n} = \emptyset \text{ for } t = 0.$$

In other words, there is another inference phase to obtain the set of class prototypes which contains the newly obtained class prototypes and the previously obtained set of old class prototypes. As shown at step S224, if there are more time steps there is an iteration through steps S206 to S220 to train the semantic drift and feature drift models $$\Psi_{\psi_t^N} \text{ and } \Gamma_{\gamma_t^N}$$

in the first phase (learning phase) and then in the second phase to infer the revived evanescent representations which are used to train the feature extraction model $f_{\theta_t}$ and the classification model $h_{\phi_t}$. Optimisation stages can also be employed at the time step as described above.

Figure 2C:
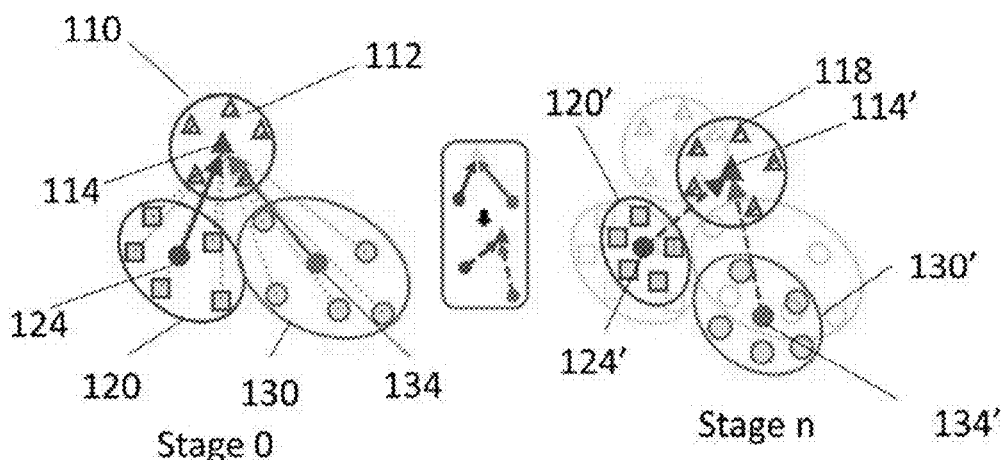
FIG. 2C schematically illustrates modelling semantic drift.

FIG. 2C schematically illustrates the semantic drift which is modelled using the semantic drift model. Merely as an example, three classes are shown in FIG. 2C and these may be same as the three classes described in relation to FIG. 1B. At optimisation stage 0, several items or images which are schematically indicated by triangles have the same classification, e.g. an image of a dog. The images form a cluster 112 which is centred on a prototype image 114 and there is a decision boundary 110 of the feature space within which all images would be classified as a dog. There are also several images which are schematically indicated by the squares and which may be images of zebras and several images which are schematically indicated by the circles and which may be images of horses The decision boundaries 120, 130 and prototypes 124, 134 for these classes are also illustrated.

As shown in FIG. 2C after n optimisation stages, the decision boundaries 120', 130' and prototypes 124', 134' for these second and third classes (e.g. zebras and the horses) have been optimised. Thus, they are in a different location within the feature space. FIG. 2C also shows the revived evanescent representations of the images of the dogs which are not included in the dataset which was used in this time step. The revived evanescent representations 118 are indicated by partially filled triangles. A revived class prototype 114' is also determined for the revived evanescent representations 118. The semantic drift models the relationship between the prototypes of each class and in particular how this changes over the optimisation stages. This is indicated by the arrows connecting the three different prototypes.

Figure 2D:
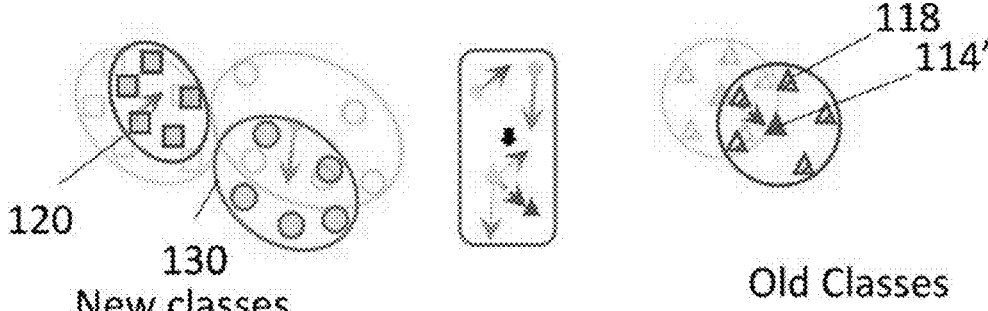
FIG. 2D schematically illustrates modelling feature drift.

FIG. 2D schematically illustrates the feature drift which is modelled using the feature drift model. As with FIG. 2C, three classes are shown and the same numbering is used. The new classes are shown on the left part of FIG. 2D and here the evolution of the features for each class is modelled separately. Thus, the arrows in this instance connect the original prototype for each class with the new prototype at the end of the optimisation stages. Similarly, the old class is shown on the right of the image and the arrows connect the original prototype for this class with the estimated prototype generated from the revived evanescent representations.

In other words, the feature learning model may be represented by $$F_{new,t}^{i}$$

which is an evolving feature representation on a sample $$X_{new}^{i}$$

from a new class. Although the example given above is in the field of image classification, the sample may be an image, text data or audio data. As shown in FIGS. 2C and 2D, there is modelling of both feature drift and semantic drift for semantic representations (e.g. prototypes) of old classes. The feature drift may be learnt from the available data as denoted by:

$$\{F_{new,0}^{i}\}_i \hookleftarrow \{F_{new,t}^{i}\}$$

An updated prototype (also termed semantic representation) for the revived evanescent representations which is learnt from this modelling may be expressed as:

$$\{\pi_{old,t}^{j}\}_{j}^{tr\,j}$$

The semantic drift is learnt from the available prototypes as denoted by:

$$\{F_{new,0}^{i}\}_i \hookleftarrow \{\pi_{old,0}^{j}\}_j$$

The updated prototype for the revived evanescent representations which is learnt from this modelling may be expressed as:

$$\left\{\pi_{old,t}^{j}\right\}_{j}^{cls}$$

The updated prototype for the revived evanescent representations which is learnt from both types of modelling may converge to a unique representation which is expressed as:

$$\left\{\pi_{old,0}^{j}\right\}_{j}$$

The following subsections present the method proposed for modelling drifts. To identify and train the feature drift and semantic drift models $\Gamma_\gamma$ and $\Psi_\psi$, two different core architectures are proposed. A first core architecture which may be used is a Gaussian model (GM) in which the class conditional feature distribution is modelled as a parametric Gaussian curve. The second core architecture which may be used is a variational model (VM) which comprises a conditional variational encoder (VAE) having an encoder and a decoder separated by a latent space. Such GM and VM models are parametrized by deep neural networks (DNNs). Although Gaussian processes can be used for VMs [14], we consider GMs and VMs individually to explicate the variational structure of VMs.

Modelling Feature Drift

FIGS. 3A to 3D show two types of architecture which may be used to model feature drift. In a first variation shown in FIGS. 3A and 3C, we use a deep neural network (DNN) in the form of a simple, linear and lightweight multilayer perceptron (MLP) to implement the model which maps the set of features extracted at the beginning of the incremental step t to the set of features at the nth optimisation stage of step t, i.e.

$$\Gamma_{\gamma_t^n} : \mathcal{F}_t^0 \to \mathcal{F}_t^n.$$

Figure 3A:
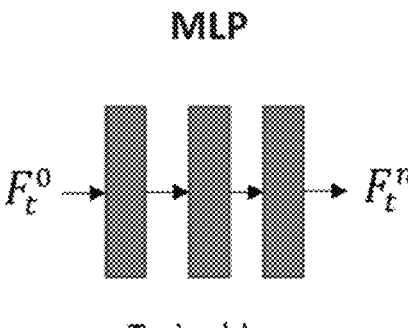
FIGS. 3A and 3C schematically illustrate one ML model which may be used to learn and then infer feature drift, respectively.
Figure 3B:
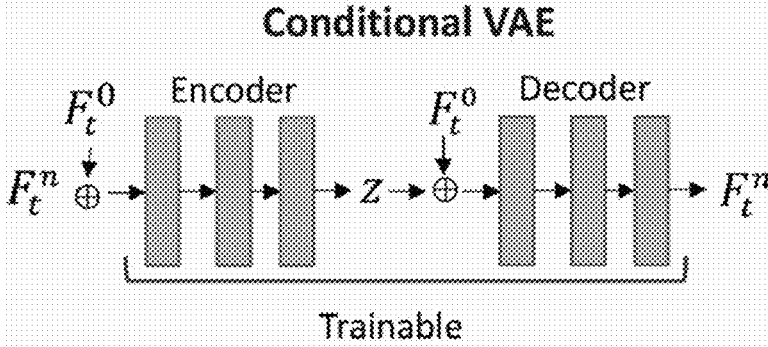
FIGS. 3B and 3D schematically illustrate an alternative ML model which may be used to learn and then infer feature drift, respectively.
Figure 3C:
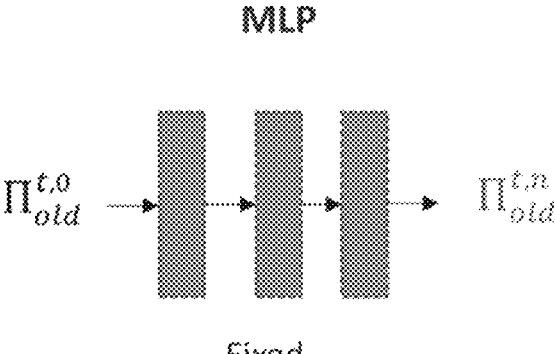

As shown in FIGS. 3A and 3C, the MLP is composed of two fully-connected (FC) layers and a ReLU activation between them. The input and output variables of $$\Gamma_{\gamma_t^n}$$

correspond to sets of B feature vectors of dimension D (number of feature channels at the output of the feature extractor, which is set to 512 in all experiments), both arranged in a B×D matrix. In addition, the number of output channels of the first FC layer is set to 2*D and B is set equal to the cardinality of $\mathcal{D}_t$ (i.e., the available training set at step t). The architecture may be summarised in the table below.

| Feature drift | | |
|---|---|---|
| Input | Operator | Output |
| B × D | FC layer | B × 2D |
| B × 2D | FC layer | B × D |

Figure 3D:
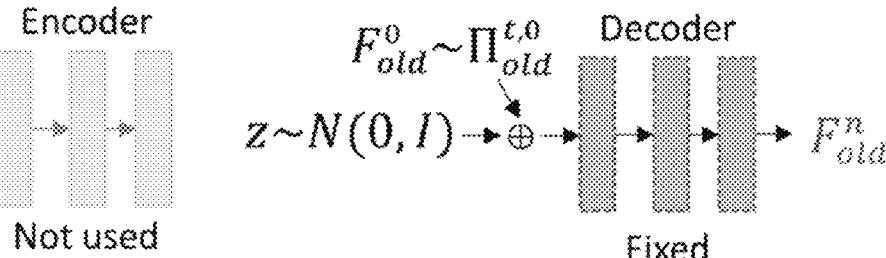

In a second variation shown in FIGS. 3B and 3D, we use a nonlinear lightweight conditional variational auto-encoder [for example as described in 11] to implement $$\Gamma_{\gamma_t^n}.$$

The task of the cVAE is to learn a generative function of feature representations of training samples at stage $$n(\mathcal{F}_t^n),$$

conditioned on the representations of the same samples at the beginning of the current incremental step $$(\mathcal{F}_t^0).$$

The encoder and decoders are composed of two FC layers each. We perform conditioning in input and latent spaces by concatenation along the channel dimension. The input, output and conditioning variables of $$\Gamma_{\gamma_t^n}$$

correspond to sets of B feature vectors of dimension D, all arranged in B×D matrices. We set B equal to the cardinality of $\mathcal{D}_t$ and C to the cardinality of $$C_{old}^t.$$

The architecture may be summarised in the table below.

| Feature drift | | | | | |
|---|---|---|---|---|---|
| Encoder | | | Decoder | | |
| Input | Operator | Output | Input | Operator | Output |
| B × 2D | FC layer | B × 4D | B × 2D | FC layer | B × 4D |
| B × 4D | FC layer | B × 2D | B × 4D | FC layer | B × 2D |

FIGS. 3A and 3B are used in the learning phase which is described above in the flowchart. In this learning phase, we aim at modelling the feature drift (FD) on the dataset $\mathcal{D}_t$ as representations revive and evolve throughout the step t>0. At stage n>0, we extract the set of features at the beginning of the time step $$\mathcal{F}_t^0$$

and the set of features extracted after n>0 optimisation stages to train the model $$\Gamma_{\gamma_t^n}$$

to learn the relationship between $$\mathcal{F}_t^0 \text{ and } \mathcal{F}_t^n.$$

Both $\mathcal{F}_t^0$ and $\mathcal{F}_t^n$ are thus part of the available information on the new class features. The model weights (also known as parameters $\gamma$) for the first model $\Gamma_\gamma$ are updated in this first phase.

When using a GM as shown in FIG. 3A, we first identify $$\Gamma_{\gamma_t^n} : \mathcal{F}_t^0 \rightarrow \mathcal{F}_t^n$$

by the MLP. Then, $$\Gamma_{\gamma_t^n}$$

is trained to track and model the evolution of revived evanescent representations (RERs) from stage 0 to n. The model is learned using any suitable technique as described in more detail below.

When using a VM as shown in FIG. 3B, we consider $$\Gamma_{\gamma_t^n}$$

as a stochastic map and identify it by a variational model such as a variational auto-encoder (VAE). The VM is trained by maximising the likelihood $$p\left(F \in \mathcal{F}_t^n \middle| F \in \mathcal{F}_t^0; \gamma_t^n\right).$$

Thereby, we can statistically model the FD across different stages [n] at a given step t.

FIGS. 3C and 3D are used in the interference phase (or second phase) which is described above in the flowchart. In the first phase, the model $\Gamma_\gamma$ is trained to learn the drift experienced by the classes available at the current step $\mathcal{C}_t$. In this second phase, we exploit the trained model to infer the feature drift undergone by features of $\mathcal{C}_{old}$ and distribution $$p(F \in \mathcal{F}_{old}^n)$$

of revived evanescent representations.

As shown in FIG. 3C, the DNN is fixed with the model $$\Gamma_{\gamma_t^n}.$$

The model is then used to infer representations of old class prototypes $$\prod_{old}^{t,n}$$

at stage n>0 using representations of old class prototypes at the beginning of the time step $$\prod_{old}^{t,0}$$

as the input. In other words, the model enables to directly track the trajectory of the representations of old class prototypes from stage 0 to n and thus map $$\prod_{old}^{t,0} \text{ to } \prod_{old,f}^{t,n}.$$

Figure 3E:
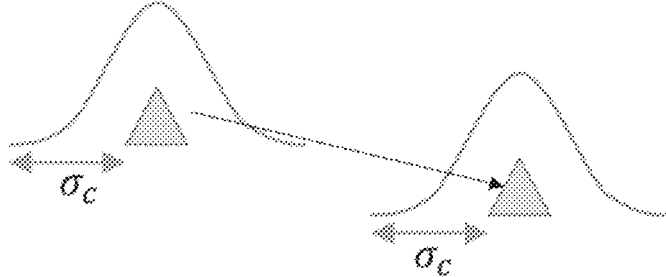
FIG. 3E is a schematic illustration of a Gaussian model which may be used.

If n=0, in other words, if no optimisation is used, then $$\Gamma_{\gamma_t^0}$$

is an identity map. Finally, we approximate the distribution $$p(F \in \mathcal{F}_{old}^n)$$

of revived evanescent representations at stage n by a Gaussian distribution which is schematically illustrated in FIG. 3E. The Gaussian distribution may be expressed as $$p\left(F \in \mathcal{F}_{old}^n : \pi_c \in \prod_{old,f}^{t,n}\right) \sim N(\pi_c, \sigma_c),$$

where N is the normal distribution and $\sigma_c$ is the standard deviation estimated at step t' when $c \in C_{t'}$. As illustrated in FIG. 3E, the standard deviation is kept fixed at every step t">t'.

As shown in FIG. 3D, the encoder is not used and the decoder is kept fixed in the inference phase. The trained model $$\Gamma_{\gamma_t^n}$$

is used to provide an approximation of the probability that the set of features is a member of the set of features for the revived evanescent representations at the nth optimisation stage given the set of features is a member of the set of features for the revived evanescent representations at the start of the time step.

$$p\left(F \in \mathcal{F}_{old}^n \middle| F \in \mathcal{F}_{old}^0\right).$$

At stage n=0, we resort to $$p(F \in \mathcal{F}_{old}^0)$$

because no feature drift has to be estimated, and we model the distribution of revived evanescent representations by $$p\left(F \in \mathcal{F}_{old}^0\right) \propto p\left(F \in \mathcal{F}_{old}^n : \pi_c \in \prod_{old}^{t,0}\right) \sim N(\pi_c, \sigma_c),$$

that is, the distribution $$p\big(F \in F_{old}^0)\big)$$

is approximated by the empirical model $$p\Big(F \in \mathcal{F}_{old}^n \colon \pi_c \in \textstyle\prod_{old}^{t,0}\Big)$$

identified by prototypes $$\pi_c \in \textstyle\prod_{old}^{t,0}$$

which is estimated by a Gaussian model $N(\pi_c, \sigma_c)$ with mean set to the prototype $\pi_c$ and with the standard deviation $\sigma_c$. At $n>0$, the training features are sampled from the posterior probability $$p\big(F \in \mathcal{F}_{old}^n \mid F \in \mathcal{F}_{old}^0; \gamma_t^n\big) \cdot p\big(F \in \mathcal{F}_{old}^0\big).$$

The standard deviation is kept fixed at every step t">t'. The input of the model is the prototype set $$\textstyle\prod_{old}^{t,0}$$

and noise z~N(0, I) is drawn from the Normal distribution with zero mean and unit variance. The output of the model is the set of features for the revived evanescent representations, i.e.

$$\mathcal{F}_{old}^n.$$

In other words, in the second phase the prototypes of the old classes are modelled using the model learnt in the first phase. The model $\Gamma_\gamma$ is thus implemented in the second phrase which uses a probabilistic framework to estimate feature drift on the unavailable past data. The model weights for the first model $\Gamma_\gamma$ are kept fixed in phase 2. In this example, in the first phase, the inputs of the model are the feature set $$\mathcal{F}_t^0$$

and the feature set $$\mathcal{F}_t^n$$

and both of these inputs are available. The output of the model is the set of reconstructed features for the nth stage $$\mathcal{F}_t^n.$$

In the second phase, the input of the model is the prototype set $$\textstyle\prod_{old}^{t,n=0}$$

which is available data and the output of the model is the feature set for the revived evanescent representations and/or the old prototypes. Both of these outputs are inferred by the model.

Modelling Semantic Drift

FIGS. 4A to 4D show two types of architectures which may be used to model semantic drift. In a first variation shown in FIGS. 4A and 4C, we use a DNN in the form of a simple and lightweight multilayer perceptron (MLP) to implement the model which maps the set of features extracted at the beginning of the incremental step t to the set of features at the nth optimisation stage of step t, i.e $$\Psi_{\psi_t^n} : \mathcal{F}_n^0 \to \textstyle\prod_{old}^{t,0}.$$

Figure 4A:
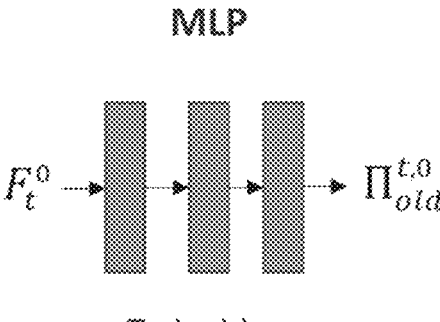
FIGS. 4A and 4C schematically illustrate one ML model which may be used to learn and then infer semantic drift, respectively.
Figure 4B:
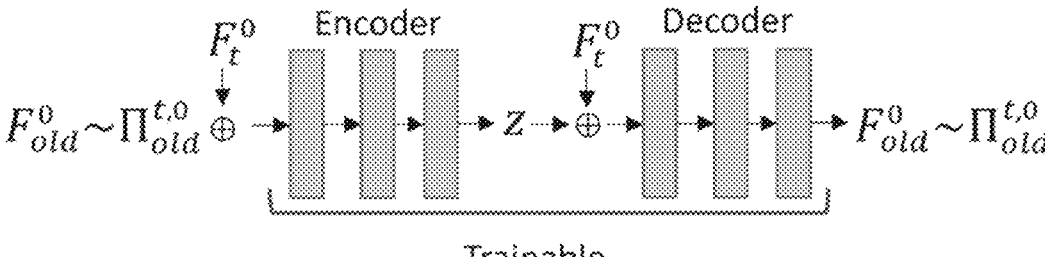
FIGS. 4B and 4D schematically illustrate an alternative ML model which may be used to learn and then infer semantic drift, respectively.
Figure 4C:
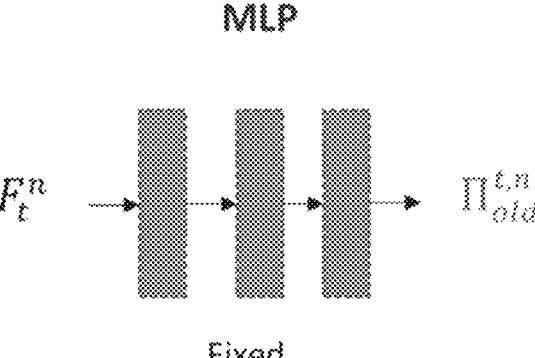

As shown in FIGS. 4A and 4C, the MLP is composed of two fully-connected (FC) layers and a ReLU activation between them. The input and output variables of $$\Psi_{\psi_t^n}$$

correspond to sets of B and $$C_{old}^t$$

feature vectors of dimension D both arranged in a D×B and a $$D \times C_{old}^t$$

matrix, respectively.

$$C_{old}^t$$

denotes the number of past classes present at the current incremental step t>0 and C is set equal to the cardinality of $$C_{old}^t.$$

D is the number of feature channels at the output of the feature extractor (which is set to 512). In addition, the number of output channels of the first FC layer is set to 2*B and B is set equal to the cardinality of $\mathcal{D}_t$ (i.e., the available training set at step t). The architecture may be summarised in the table below.

| Semantic drift | | |
|---|---|---|
| Input | Operator | Output |
| $D \times B$ | FC layer | $D \times 2B$ |
| $D \times 2B$ | FC layer | $D \times C$ |

Figure 4D:
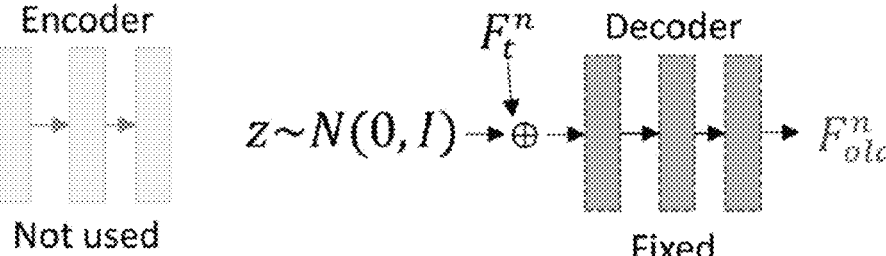

In a second variation shown in FIGS. 4B and 4D, we use a lightweight conditional variational auto-encoder (cVAE) to implement $$\Psi_{\psi_t^n}.$$

The task of the cVAE is to learn a generative function of feature representations of old classes $$\left(\mathcal{F}_{old}^0\right)$$

whose distribution is approximated as $$p\left(\mathcal{F}_{old}^0; \prod_{old}^{t,0}\right) \sim N(\pi_c, \sigma_c).$$

The function is conditioned on the new classes $$\mathcal{F}_t^0$$

which can be extracted from the dataset. The encoder and decoder are composed of two FC layers each. We perform conditioning in input and latent spaces by concatenation along the channel dimension. The input, output and conditioning variables of $$\Psi_{\psi_t^n}$$

correspond to sets of $C_{old}^t$ feature vectors of dimension D, all arranged in $$D \times C_{old}^t$$

matrices. The conditioning variable is a set of B feature vectors of dimension arranged in a D×B matrix. We set B equal to the cardinality of $\mathcal{D}_t$ and C to the cardinality of $$C_{old}^t.$$

The architecture may be summarised in the table below.

| Semantic drift | | | | | |
|---|---|---|---|---|---|
| Encoder | | | Decoder | | |
| Input | Operator | Output | Input | Operator | Output |
| $D \times (C + B)$ | FC layer | $D \times 2(C + B)$ | $D \times (1 + B)$ | FC layer | $D \times 2(1 + B)$ |
| $D \times (2C + B)$ | FC layer | $D \times 2$ | $D \times 2(1 + B)$ | FC layer | $D \times C$ |

FIGS. 4A to 4D shows more detail of the two phases which are used when modelling semantic drift using the second model $\Psi_\psi$ (also termed a semantic drift model). FIGS. 4A and 4B are used in the learning phase which is also known as the first phase. In this phase, we aim at capturing the semantic drift (SD) experienced by representations at each incremental step. To this end, at the beginning of each step, we extract the set of features at the beginning of the incremental step $$\mathcal{F}_t^0$$

and train a network or semantic drift model $$\Psi_{\psi_0^t}$$

with parameters $$\psi_0^t$$

to model the relationship between the set of features at the beginning of the incremental step $$\mathcal{F}_t^0$$

and the set of features of the evanescent representations at the beginning of the time step $$\mathcal{F}_{old}^0.$$

We employ the prototypes $$\pi \in \prod_{old}^{t,0}$$

to model $$p\left(F \in \mathcal{F}_{old}^0\right)\right) \propto p\left(F \in \mathcal{F}_{old}^n : \pi_c \in \prod_{old}^{t,0}\right) \sim N(\pi_c, \sigma_c).$$

The old class prototypes $$\prod_{old}^{t,0}$$

at stage 0 are known. As opposed to the feature drift model, the semantic drift model captures the semantic drift observed at each new step and thus an individual model $\Psi_\psi$ is optimised at the start, and fixed for the rest of the step $$\text{(i.e. } \psi_0^n = \psi_0^t).$$

As explained in more detail below, when model fusion is adopted, instead the semantic drift model $\Psi_\psi$ is re-trained once per stage, to account for the feature drift estimated by the feature drift model.

When using a GM as shown in FIG. 4A, we first identify the semantic drift model using a DNN which maps the set of features at the beginning of the incremental step $$\mathcal{F}_t^0$$

to the old prototypes at the beginning of the incremental step. In other words, we identify $$\Psi_{\psi_t^n}: \mathcal{F}_t^0 \to \prod_{old}^{t,0}.$$

Then the semantic drift model is trained to model the semantic drift between representations for classes available at the current step $\mathcal{C}_t$ and those experienced in the past $\mathcal{C}_{old}$. The model is learned using any suitable technique as explained in more detail below.

In the non-linear implementation shown in FIG. 4B, we first approximate the distribution $$p(F \in \mathcal{F}_{old}^n)$$

of evanescent representations revived at stage n=0 by $$p\left(F \in \mathcal{F}_{old}^n: \pi_c \in \prod_{old}^{t,0}\right) \sim N(\pi_c, \sigma_c).$$

Then a conditional VM (e.g. a VAE) is trained by adjusting the weights to maximise the probability that a set of features are within the features of evanescent representations revived at stage n>0 given that the set of features are within the features of the new class features at stage 0, i.e. maximising the likelihood $$p\left(F \in \mathcal{F}_{old}^n \middle| F \in \mathcal{F}_t^0; \gamma\right).$$

The training can be done using any suitable technique.

FIGS. 4C and 4D are used in the interference phase (or second phase). In the learning phase, the semantic drift model $$\Psi_{\psi_t^n}$$

is trained to learn the SD experienced while moving from the representations for old classes $\mathcal{C}_{old}$ to the representations for the current classes $\mathcal{C}_t$. The drift is captured at the beginning of the current step t, when up-to-date representations of both sets are available. We now exploit the trained semantic drift model $$\Psi_{\psi_t^n}$$

to infer the semantic drift undergone at every stage n>0, and estimate the distribution of the probability that the set of features for each revived evanescent representation is the old class features, i.e.

$$p(F \in \mathcal{F}_{old}^n).$$

FIG. 4C shows the linear implementation and shows that the trained model $$\Psi_{\psi_t^n}$$

used to infer the representations of old class prototypes $$\prod_{old}^{t,n} \forall n \geq 0$$

under semantic drift. That is, the model $$\Psi_{\psi_t^n}: \mathcal{F}_t^n \to \prod_{old}^{t,n}$$

is trained to estimate the relationship between feature and prototypical representations at stage n. In a similar manner to that described for FIG. 3C, we then approximate the distribution $$p(F \in \mathcal{F}_{old}^n)$$

of revived evanescent representations at stage n by a Gaussian distribution $$p\left(F \in \mathcal{F}_{old}^n: \pi_c \in \prod_{old,s}^{t,0}\right) \sim N(\pi_c, \sigma_c)$$

where N is the normal distribution and $\sigma_c$ is the standard deviation estimated at step t' when $c \in C_{t'}$.

As shown in FIG. 4D, the encoder is not used and the decoder is kept fixed in the inference phase. The trained model $$\Psi_{\psi_t^n}$$

is used to provide an approximation of the probability that the set of features is a member of the set of features for the revived evanescent representations at the nth optimisation stage given the set of features is a member of the set of features for the revived evanescent representations at the nth optimisation stage.

$$p(F \in \mathcal{F}_{old}^n | F \in \mathcal{F}_t^n) \forall\, n \geq 0.$$

To generate training feature samples, we perform inference using $$p\left(F \in \mathcal{F}_{old}^n \middle| F \in \mathcal{F}_{old}^0; \psi_t^n\right) \cdot p(F \in \mathcal{F}_t^n),$$

where the feature set $$\mathcal{F}_t^n$$

is provided by the feature extraction model $f_{\theta_t}$ trained for n optimisation stages and applied on samples from the dataset $\mathcal{D}_{t'}$.

Thus, as shown in FIGS. 4A and 4C, a linear model such as a perceptron may be used in both phases. In this example, in the first phase, the input of the second model $\Psi_{\psi^*}$ is the feature set $$\mathcal{F}_t^0$$

and the output of the model is the prototype set $$\prod_{old}^{t,n=0}.$$

In the first phase, the model weights for the second model $\Psi_{\psi^*}$ are updated using this input and output. In other words, the semantic drift is learnt. In the second phase, the model $\Psi_\psi$ is implemented. The input of the model is the feature set $$\mathcal{F}_t^n$$

and the output of the model is the prototype set $$\prod_{old}^{t,n>0}$$

which is inferred using the model. The model weights for the first model $\Gamma_\gamma$ are fixed during the second phase.

Thus, as shown in FIGS. 4B and 4D, a nonlinear model such as a variational auto-encoder (VAE) which includes an encoder and a decoder may be used in both phases. In this example, in the first phase, the inputs of the model are the feature set $$\mathcal{F}_t^{n=0}$$

and the prototype set $$\prod_{old}^{t,n=0}.$$

The output of the model is the set of reconstructed prototypes $$\prod_{old}^{t,n=0}.$$

In the first phase, the model weights for the second model $\Psi_\psi$ are updated using these inputs and output. In other words, the semantic drift is learnt. In the second phase, the second model $\Psi_{\psi^*}$ is implemented. The input of the model is the feature set $$\mathcal{F}_t^n$$

and noise $z \sim N(0, I)$ is drawn from the Normal distribution with zero mean and unit variance. The output of the model is the old class features $$\mathcal{F}_{old}^n$$

which are inferred by the second model. The model weights for the second model $\Psi_\psi$ are fixed during the second phase. For this semantic branch we use a conditional variational auto-encoder but it is noted that in FIGS. 3B and 3D, we may employ the infoVAE architecture, since we notice improvements in model stability.

Training Details

Figure 5A:
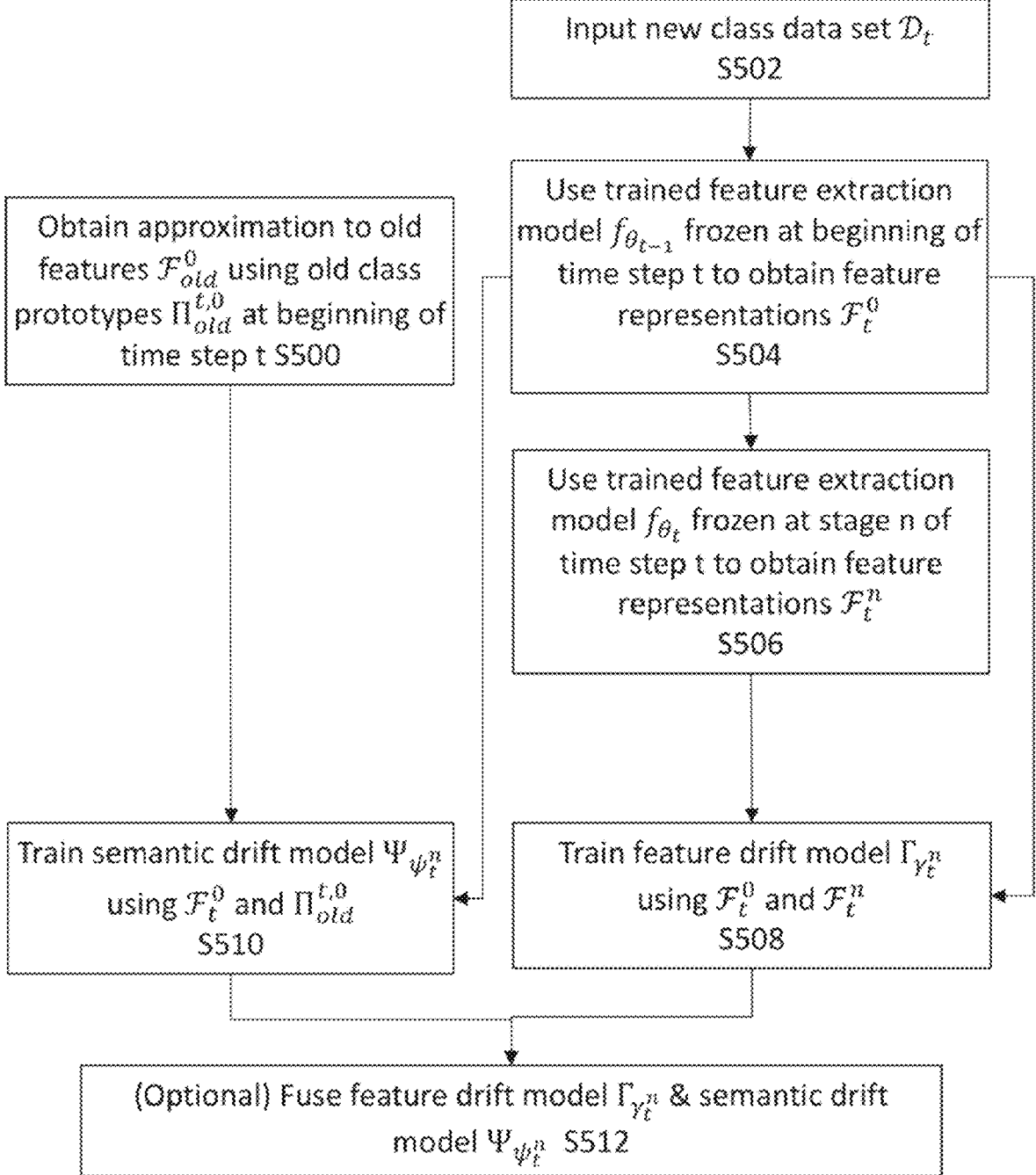
FIG. 5A is a flowchart showing more detail of the training of the semantic and feature drift models in the method.

FIG. 5A is a flowchart detailing the steps in each incremental step t of the learning phase in which the representation drift models are trained using the frozen classification models from the previous time step t. As explained previously, we do not have access to old samples, and so the old features $$\mathcal{F}_{old}^0$$

are not known but the old class prototypes at stage 0 are known and denoted by $$\prod_{old}^{t,0}.$$

FIG. 5A shows the method includes, at step S500, obtaining the old class prototypes $$\prod_{old}^{t,0}$$

and using them to approximate $$\mathcal{F}_{old}^{0}$$

at beginning of time step t. These are used to train the semantic drift model as described below.

A new class dataset $\mathcal{D}_t$ is obtained or input at step S502. In step S504, the trained feature extraction model $f_{\theta_{t-1}}$ which was updated at the previous incremental step t is used to extract the feature representations at the beginning of the time step, i.e.

$$\mathcal{F}_t^0.$$

Similarly, in step S506, the feature representations at the nth optimisation stage of the time step, i.e.

$$\mathcal{F}_t^n,$$

are extracted using the feature extraction model $f_{\theta_t}$ for that nth optimisation stage. Both the feature extraction models which are used to extract the feature representations are frozen.

As shown in step S508, the feature drift model $$\Gamma_{\gamma_t^n}$$

is learned using any suitable technique by using the extracted feature representations. For example, for the GM shown in FIG. 3A, the training may be done by minimising an error, e.g. the mean squared error between the actual set of features at optimisation stage n>0 and the set of features at the same optimisation stage as predicted by the feature drift model given the set of features at the beginning of the time step, i.e. the difference between $$\Gamma_{\gamma_t^n}(F_t^0) \text{ and } \mathcal{F}_t^n.$$

The loss function $$L_f^t$$

for feature drift may be expressed as:

$$L_f^t(F_t^0, F_t^n; \gamma_t^n) = L_{mse,f}^t \triangleq \|\Gamma_{\gamma_t^n}(F_t^0) - F_t^n\|_2^2$$

Similarly, the training of the VM in FIG. 3B can be done using any suitable technique, e.g. the objective proposed in [14]. The learning objective may thus be composed of a reconstruction constraint and a regularisation term measuring the KL divergence between the posterior distribution modelled by the encoder and the standard normal prior, plus an additional term to maximise the mutual information between input and latent variables. The loss function $$L_f^t$$

for feature drift may be expressed as:

$$L_f^t(F_t^0, F_t^n; \gamma_t^n) = \beta L_{rec,f}^t + (1-\alpha)L_{kl,f}^t + (\alpha - \lambda_{info} - 1)L_{info,f}^t$$

where $$L_{rec,f}^t$$

is the reconstruction loss, $$L_{kl,f}^t$$

is the KL divergence loss and $$L_{info,f}^t$$

is the loss of the InfoVAE, $\alpha$, $\beta$ and $\lambda_{info}$ are constants, with $\beta$ set to 1e1 in all experiments, $\lambda_{info}$ set to 1e1 and $\alpha$ set to −1e1 for the CIFAR100 dataset, $\lambda_{info}$ set to 1e2 and $\alpha$ set to −1e2 for the test set TinyImageNet and CUB200 datasets.

As shown in step S510, the semantic drift model $\Psi_{\psi_t^n}$ is learned using any suitable technique by using the extracted feature representations at the beginning of the incremental step and the old class prototypes. For example, for the GM as shown in FIG. 4A, the semantic drift model may be trained by minimising an error, e.g. the mean squared error between the actual set of prototypes at optimisation stage n>0 and the set of prototypes at the same optimisation stage as predicted by the model given the set of features at the beginning of the time step, i.e. the difference between $$\Psi_{\psi_t^n}(F_t^0) \text{ and } \prod_{old}^{t,o}.$$

The loss function $$L_s^t$$

for semantic drift may be expressed as:

$$L_s^t\left(F_t^0, \prod_{old}^{t,o}; \psi_t^n\right) = L_{mse,s}^t = \left\|\Psi_{\psi_t^n}(F_t^0) - \prod_{old}^{t,o}\right\|_2^2$$

In the non-linear implementation shown in FIG. 4B, the training may be done by optimizing the variational model (conditional VAE) by maximizing the Evidence Lower Bound (ELBO) as proposed in [5]. The learning objective may thus be composed of a reconstruction constraint and a regularisation term measuring the KL divergence between the posterior distribution modelled by the encoder and the standard normal prior. The loss function $$L_s^t$$

for semantic drift may be expressed as:

$$L_s\left(F_t^0, \prod_{old}^{t,0}; \psi_t^n\right) = = L_{recs} + \lambda_{kld}L_{kld,s}$$

where $$L_{rec,s}^t$$

is the reconstruction loss, $$L_{kld,s}^t$$

is the KL divergence loss and $\lambda_{kld,s}$ is a constant set to 1 in all experiments, i.e. for the CIFAR100, TinyImageNet and CUB200 datasets.

At step S512, there is an optional step of fusing the feature and semantic drift models. The fusion may be done by joint training or as explained in relation to the inference step by fusing the output of separately trained models. In the example of FIG. 5A, the fusion is done during training. For example, the loss functions $$L_f^t \triangleq L_f\left(F_t^0, F_t^n; \gamma_t^n\right)$$

and $$L_s^t \triangleq L_s\left(F_t^0, \prod_{old}^{t,0}; \psi_t^n\right)$$

may be used to denote the objectives used to individually train feature and semantic drift models $$\Gamma_{\gamma_t^n} \text{ and } \Psi_{\psi_t^n},$$

respectively. As described above, the exact form of the aforementioned objectives depends on the employed network architecture identifying $$\Gamma_{\gamma_t^n}$$

and $$\Psi_{\psi_t^n}.$$

The outputs of $$\Gamma_{\gamma_t^n} \text{ and } \Psi_{\psi_t^n}$$

may be fused by jointly training them to estimate $$p(F \in F_{old}^n)$$

using GM and VM. For this purpose, we optimise model parameters by minimising a measure of discrepancy between the estimated distributions $$p(F \in F_{old}^n; \gamma_t^n)$$

and $$p(F \in F_{old}^n; \psi_t^n)$$

employing a suitable training objective also termed a fusion loss may be expressed as $$L_{fus}^t = \left\|\prod_{old,s}^{t,n} - \prod_{old,f}^m\right\|_2^2$$
$$+ \lambda_{corr}\left\|\rho\left(\prod_{old,s}^{t,n}\right) - \rho\left(\prod_{old,f}^{t,n}\right)\right\|_2^2$$

where the subscript s and f denotes the updated prototypes of old classes estimated by the semantic and feature drift models, respectively, $$\|\cdot\|_2^2$$

is the squared $\ell_2$ norm, $\lambda_{corr} > 0$ is the regularisation parameter and $\rho(\Pi)$ is the normalised correlation matrix of $\Pi$ [3]. Finally, the renovated distributions $$p(F \in F_{old}^n; \gamma_t^n) \text{ and } p(F \in F_{old}^n; \psi_t^n)$$

are linearly combined with equal weights to obtain $$p(F \in F_{old}^n).$$

Then, the overall objective used to learn representation drift may be is defined by:

$$L_{drift}^t = L_s^t + L_f^t + \lambda_{fus}L_{fus}^t$$

where $\lambda_{fus}>0$ is the loss balancing parameter. The values of $\lambda_{fus}$ and $\lambda_{corr}$ may be experimentally finetuned for each drift model configuration, dataset and incremental set-up as explained in more detail below. In particular, we perform gridsearch such that $\lambda_{fus},\lambda_{corr}\in\{1e2, 1e1, 1e0, 1e-1, 1e-2, 1e-3, 1e-4, 1e-5\}$ and select the best value combination. We note that $L_{drift}^t$ measures the loss of current models on inferred representations of old classes. Thereby, we aim at reducing forgetting ($\epsilon_t$), i.e. the discrepancy between RERs as estimated by drift models and their evanescent (unavailable) counterparts by training models optimising $L_{drift}^t$.

In all the aforementioned setups, we may employ the Adam optimiser, for example as described in [4] with fixed learning rate $\eta$ and train until convergence by performing early stopping, that is the model is trained until the loss function does not change for a predefined constant number of steps $\tau=25$. We may also experimentally finetune the value of the learning rate $\eta\in\{1e-3, 1e-4, 1e-5\}$ for each drift model configuration, dataset and incremental setup. Finally, we may also apply weight normalisation, for example as described in [10], to $$\Psi_{\psi_t^n}$$

for both GM and VM implementations. We may also apply spectral normalisation, for example as described in [8], to weights of $$\Gamma_{\gamma_t^n}$$

for both GM and VM implementations. The normalisation may result in an improvement in robustness of training convergence.

FIG. 5B is a flowchart detailing the steps in training the classification models using the results inferred from the trained representation drift models. As explained previously, we do not have access to old samples, and so the old features $$\mathcal{F}_{old}^0$$

are not known but the old class prototypes at stage 0 are known and denoted by $$\prod_{old}^{t,0}.$$

Like FIG. 5A, FIG. 5B shows the method includes, at step S600, obtaining the old class prototypes $$\prod_{old}^{t,0}$$

and using them to approximate $$\mathcal{F}_{old}^0$$

at beginning of time step t. These are used to infer the new features using the feature drift model as described below.

The new class dataset $\mathcal{D}_t$ is obtained or input at step S602. In step S604, the trained feature extraction model $f_{\theta_{t-1}}$ which was updated at the previous incremental step t is frozen and is used to extract the feature representations at the beginning of the time step, i.e.

$$\mathcal{F}_t^0.$$

In step S606, the feature extraction model $f_{\theta_t}$ for the incremental step t is trained so that the new features can be obtained, i.e $$\mathcal{F}_t^n.$$

We can enhance the training objective by a distillation loss $$L_{fkd}^t \triangleq L_{fkd}(\mathcal{D}_t),$$

for example as described in [8], to reduce the entity of representation drift across incremental tasks. The distillation loss $$L_{fkd}^t$$

is defined by the $\ell_2$ distance between representations extracted from $\mathcal{D}_t$ using the current feature extraction model $f_{\theta_t}$ and the feature extraction model from the previous step $f_{\theta_{t-1}}$, the latter inherited from the previous step and kept fixed. Thereby, the distillation loss $$L_{fkd}^t$$

approximates the difference between the overall classification objective $$L_{cc}^t$$

and the loss $$L_{pc}^t$$

of the previous model $f_{\theta_{t-1}}$ on $\mathcal{D}_t$. The distillation loss may be expressed as:

$$L_{fkd}(D_t) = \sum_{x\in D_t} \left\| f_{\theta_t}(x) - f_{\theta_{t-1}}(x) \right\|_2^2$$

$$L_{pc}^t$$

is not explicitly mentioned in the equation above but provides information regarding shareability of representations among consecutive steps t−1 and t. Therefore, models optimising $$L_{fkd}^t$$

can make use of the feature shareability for learning drifts. The new class features $$\mathcal{F}_t^n$$

can be used in step S610 to infer the distribution of revived evanescent representations $$p(F \in \mathcal{F}_{old}^n)$$

using the trained model $$\Psi_{\psi_t^n}.$$

At step S608, the fixed feature drift model $$\Gamma_{\gamma_t^n}$$

is used to infer representations of old class prototypes $$\prod_{old}^{t,n}$$

at stage n>0 using representations of old class prototypes at the beginning of the time step $$\prod_{old}^{t,0}$$

as the input. At step S612, the outputs of the two drift models may be optionally fused, e.g. by a linear combination with equal weights. The revived evanescent representations may then be generated at step S614.

At step S616, the classification model $h_{\phi_t}$ is then trained using any suitable technique. For example, a cross entropy loss $$L_{ce}^t \triangleq L_{ce}(\mathcal{D}_t)$$

may be used. As an example, the cross entropy loss may be a standard function such as that defined in the book "Deep Learning" by Goodfellow et al. published by MIT. When t>0, to mitigate forgetting of previous tasks, we generate features of the representations of the old classes $\mathcal{C}_{old}$, by modeling the drift and estimating the distribution p(F∈ $\mathcal{F}_{old}$). The representation drift loss function $$L_{rd}^t$$

may be then calculated using $$L_{rd}^t \triangleq L_{rd}(\mathcal{F}_{old}^{n,t}) = \sum_{F \in \mathcal{F}_{old}^{n,t}} y_F \log h_{\phi t}(F)$$

where $y_F$ is the one-hot label vector of the class $c_F \in \mathcal{C}_{old}$ and $$\mathcal{F}_{old}^{n,t}$$

is the set of revived evanescent representations sampled from the estimated distribution using the updated prototypes of $\mathcal{C}_{old}$. In other words, $$F \in F_{old}^{n,t}$$

is estimated by modelling representation drift as described above. The loss $L_{rd}^t$ approximates $L_\mu(\mathcal{D}_{t'}; \theta_t, \phi_t) \leq \epsilon_{t'}$ of $g_t$ on the previous datasets $$\{\mathcal{D}_{t'}\}_{t'=0}^{t-1}$$

using their inferred representations.

In the flowchart, the feature extraction model and the classification model are shown as being trained at separate steps but it will be appreciated that the models may be trained together. Then, the overall classification objective $$L_{cc}^t$$

computed at each step t is:

$$L_{cc}^t(D_t, F_{old}^n; \theta_t, \phi_t) = L_{ce}^t + \lambda_{rd} L_{rd}^t + \lambda_{fkd} L_{fkd}^t,$$

where $$L_{rd}^t$$

and $$L_{fkd}^t$$

47 are used only for t>0 with loss balancing parameters $\lambda_{rd}>0$ and $\lambda_{fkd}>0$. An alternative expression is:

$$\operatorname*{argmin}_{\theta_t,\phi_t} L_{cc}(D_t, F^n_{old}; \theta_t, \phi_t)$$

where $\theta_t, \phi_t$ are the parameters of the current feature extraction model and classification model, respectively.

In summary, the first phase shown in FIG. 5A may be termed a learning phase and the models $$\Gamma_{\gamma^n_t} \text{ and } \Psi_{\psi^n_t}$$

at each stage n and each step t may be trained until convergence by solving $$\operatorname*{argmin}_{\gamma^n_t,\psi^n_t} L^t_{drift}\left(\prod^{t,0}_{old}, \prod^{t,n}_{old,\{f,s\}}, \mathcal{F}^0_t, \mathcal{F}^n_t; \gamma^n_t, \psi^n_t\right) \quad (5)$$

where $$L^t_{drift}$$

is the loss of the current model on inferred representations of old classes, $\mathcal{F}^0_t$ denotes the set of features extracted using a feature extractor $f_{\Theta_t}$ at the beginning of the incremental step t (i.e. at optimization step 0), $$\mathcal{F}^n_t$$

denotes the set of features extracted using $f_{\Theta_t}$ updated with n>0 optimisation stages from the dataset $\mathcal{D}_t$, $$\prod^{t,0}_{old}$$

is the set of prototypes of old classes $C_{old}$ at the optimization step 0, $\Pi_{old}^{t,n}$ is the set of prototypes updated at the $n^{th}$ epoch at the step t, $$\gamma^n_t$$

denotes the parameters of the feature drift model at time step t updated with n>0 optimisation stages and $$\psi^n_t$$

denotes the parameters of the semantic drift model at time step t updated with n>0 optimisation stages. It is noted that $$\mathcal{F}^0_t \text{ and } \mathcal{F}^n_t$$

48 contain only representations of new classes $C_t$ because only $\mathcal{D}_t$ is available to the step t. Gradient backpropagation may be used for training both models. It is noted that the convergence criterion for a model is early stopping the optimisation of model parameters if the training loss does not change for a fixed/set number of steps.

The second phase shown in FIG. 5B may be termed an inference phase and the models $$\Gamma_{\gamma^n_t} \text{ and } \Psi_{\psi^n_t}$$

which were learnt in the previous phase are fixed and used to estimate the features of the revived evanescent representations $$F^n_{old}.$$

Then, the set of old class prototypes $$\prod^{t,n}_{old}$$

may be computed by class-wise averaging features sampled from $$p(F \in \mathcal{F}^n_{old}).$$

Finally, $f_{\Theta_t}$ and $h_{\phi_t}$ are trained on the updated dataset for the time step $$\tilde{\mathcal{D}}_t = \mathcal{D}_t \cup F^n_{old}$$

for example by a loss function which may be represented as:

$$\operatorname*{argmin}_{\theta_t,\phi_t} L^t_{cc}(\tilde{\mathcal{D}}_t; \theta_t, \phi_t) \quad (6)$$

Figure 5C:
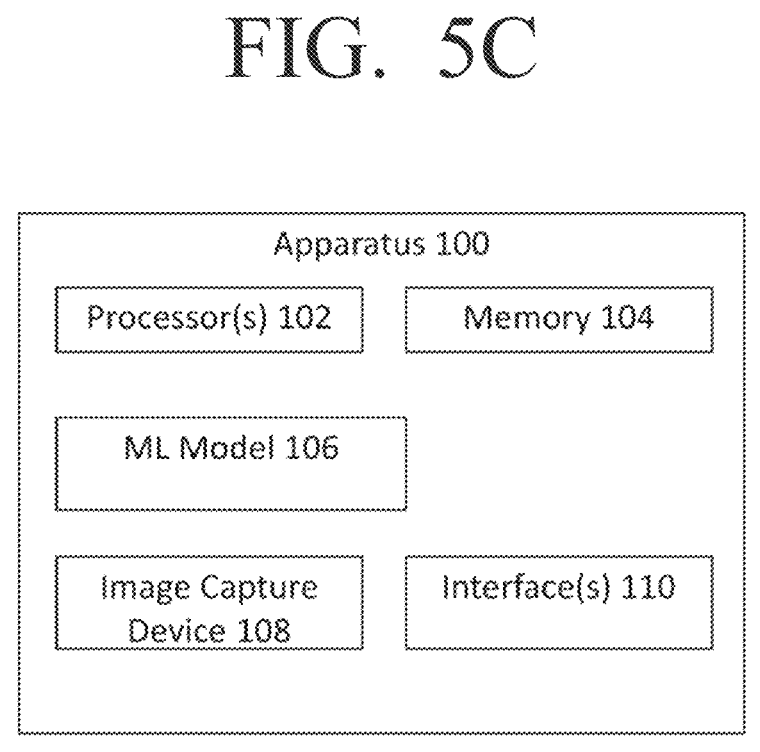

FIG. 5C shows a block diagram of an apparatus 100 for training the model as described above and/or implementing the trained model. The apparatus 100 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices.

The apparatus comprises at least one processor 102 coupled to memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus may further comprise at least one image capture device 108 for capturing images or videos to be processed by the ML model 106. The ML model may be an image classification model such as that shown in FIG. 1A which is trained as described in detail above.

The apparatus may further comprise at least one interface 110 for providing a result of the processing by the ML model to a user of the apparatus. For example, the apparatus 100 may comprise a display screen to receive user inputs and to display the results of implementing the ML model 106.

Experimental Results

We evaluate our approach on multiple standard CIL benchmarks, including CIFAR100 [17], TinyImageNet [24] and CUB200-2011 [33] datasets. FIGS. 6A to 8F show the experimental results.

We devise 3 class-incremental setups, where first the framework is trained on half of the available semantic classes (except for one setup on CIFAR 100, where only 40 classes are selected as the first task), and then the remaining class set is evenly divided into respectively 5, 10 or 20 incremental steps (or phases—the terms may be used interchangeably). Class order is selected randomly and then fixed for every class split.

Implementation Details.

ResNet-18 [10] is used as a backbone. The model is trained for 100 epochs (i.e. N=100 and each stage corresponds to one epoch over $\mathcal{D}_t$) at each incremental step with Adam optimizer. The learning rate is initially set to 0.001 on CIFAR 100 and TinyImageNet and 0.0001 for CUB datasets. It is decreased by a factor of 0.1 after 45 and 90 epochs, for example as suggested in [43]. Images are cropped to 32×32, 64×64 and 256×256 for CIFAR100, TinyImageNet and CUB200-2011, respectively, and randomly flipped. We apply input and label augmentation, for example as described in [43]. We set batch size to 64, and $\lambda_{fkd}$=10 and $\lambda_{rd}$=10 in all experiments.

We employed lightweight DNNs to identify networks of $\Gamma_\gamma$ and $\Psi_\psi$ for modeling feature and representation drifts. In particular, we investigate both the use of GMs with a multi-layer perceptron (MLP) which may have only two layers, and generative models in the form of a condition VAE [30, 42] to implement VMs, whereby hyperparameters are experimentally tuned. In the following sections we will denote a multi-layer perceptron by MLP and a generative model by VAE. The VAE may have encoder and decoder modules composed of a couple of FC layers and the MLP may have two layers.

The fusion loss $$L_{fus}^t$$

defined above may be implemented by two methods for an ablation:

i) we define ρ by a normalised feature kernel matrix, for example as described in [3] or ii) we define ρ by an identity map, i.e. A=ρ(A).

The results obtained by the second method (ii) are marked with a † in the tables shown in the Figures.

Comparisons.

We compare our approach with many methods storing exemplars of old classes (EEIL [4], iCarl [25], UCIR [12]) and other state-of-the-art approaches that instead avoid their use (EWC [16], LwF [19], LwM [8], PASS [43], SDC [40]). All the methods are evaluated with the ResNet18 image classification model and batch size of 64 as described in

[15]. We perform gridsearch over key hyperparameters of [2, 1, 9, 3, 6, 7]. As for the exemplar-based methods, we store 20 samples with herd selection, for example as described in [12,25]. In addition, we use the original code of PASS [43]. We evaluate the SDC [40] method by employing the prototype drift compensation proposed in [40] to update prototypes of past classes, and model old-class feature distribution by Gaussians as discussed above. In particular, we employ the original code of [40] to evaluate and compensate for the feature drift of old-class prototypes (i.e. in place of the proposed semantic and feature representation drift models), and we use the estimated up-to-date representations $$\prod_{old}^{t,n}$$

by SDC [40] to approximate feature distribution of old classes with a parametrized Gaussian model, i.e.

$$p\left(F \in \mathcal{F}_{ola}^n : \pi_c \in \prod_{old}^{t,n}\right) \sim N(\pi_c, \sigma_c),$$

where N is the normal distribution and $\sigma_c$ is the standard deviation estimated at step t'. In the following sections we will show how our CIL method outperforms SOTA non-exemplar frameworks, while surpassing also some approaches using exemplars.

Evaluation Metrics.

To evaluate and compare different approaches we resort to the accuracy metric [25], defined as the average top-1 classification accuracy over all classes up to the current incremental step.

TinyImageNet

Figure 6A:
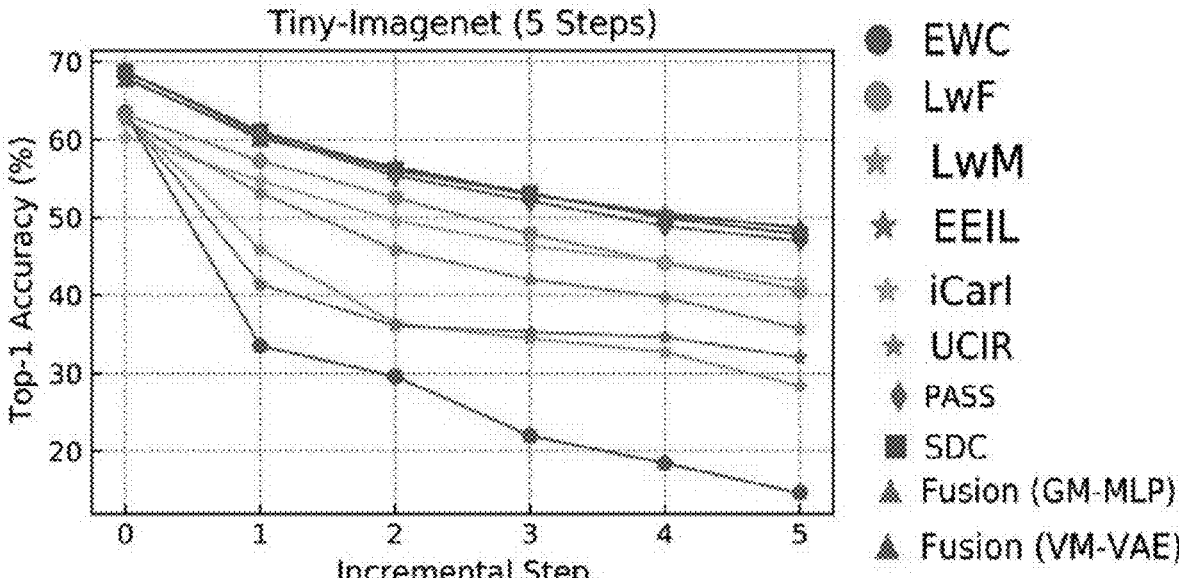
FIGS. 6A to 6C plot the accuracy (Top-1%) against number of steps for experimental results using the Tiny-Imagenet benchmark dataset with 5, 10 and 20 phases being used respectively.
Figure 6B:
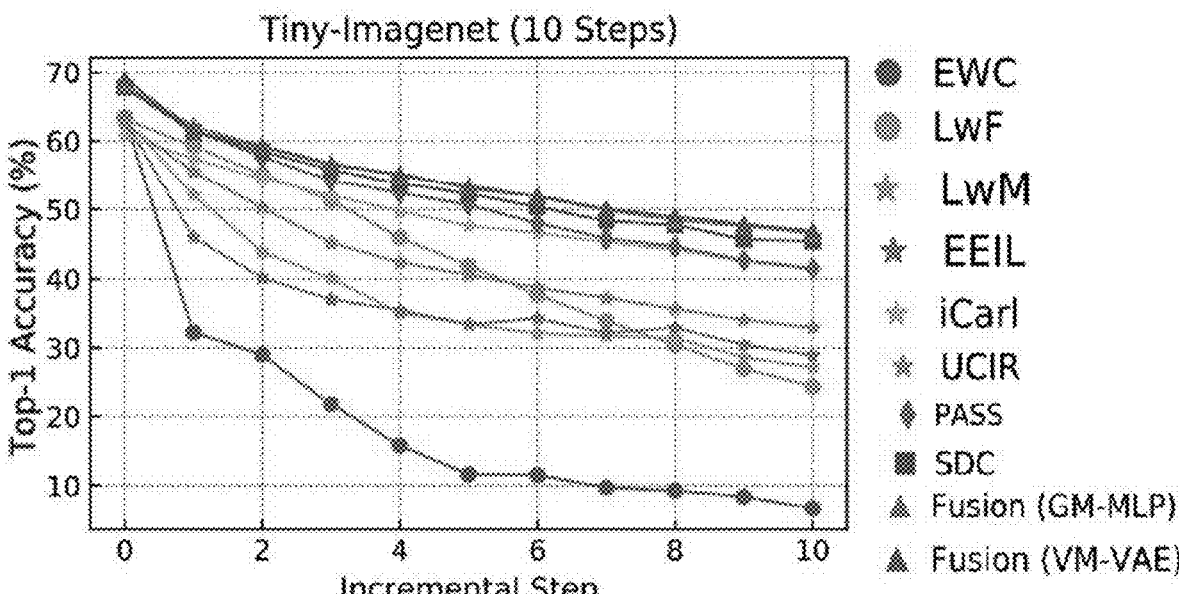
Figure 6C:
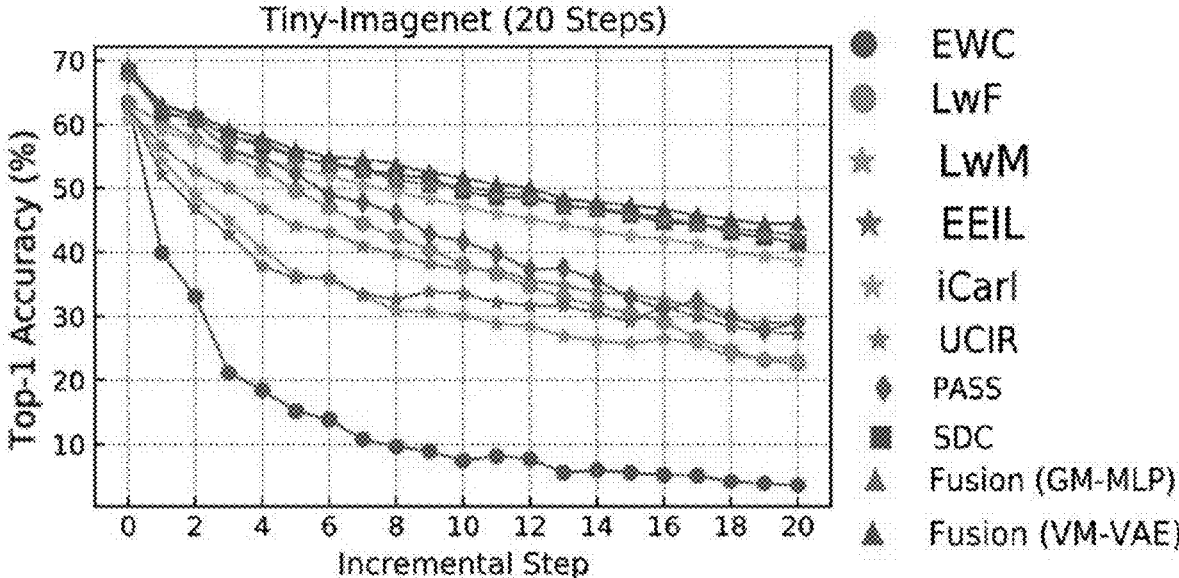

In FIGS. 6A to 6C, we report per-step incremental accuracy results in graphical form when evaluation is performed on TinyImageNet benchmark. These graphs show the improved performance achieved by our approach with respect to the prior art approaches noted above. These results are also shown in Table 2 in FIG. 6G. For our method, the results are shown for linear and non-linear models as represented by MLP and VAE respectively. For our method, the results are also shown separately for modelling feature drift alone (represented by Feat Drift), modelling semantic drift alone (represented by Sem Drift) and for the fusion model in which feature drift and semantic drift is used (represented by fusion).

We observe that our framework outperforms exemplar-based competitors, while also providing an accuracy boost over state-of-the-art methods not using exemplars [43, 40]. In particular, it is possible to notice that our representation drift modeling yields superior performance with respect to that proposed in [40]. This is especially true when semantic and feature representation shifts are jointly taken into account, showing that they both individually model crucial and complementary information, not fully captured by the framework proposed by [40]. Finally, we remark that employing a probabilistic generative modeling can further boost the final accuracy, especially when multiple incremental steps are performed. Nonetheless, a simple MLP architecture already provides satisfactory results.

CIFAR100

Figure 6D:
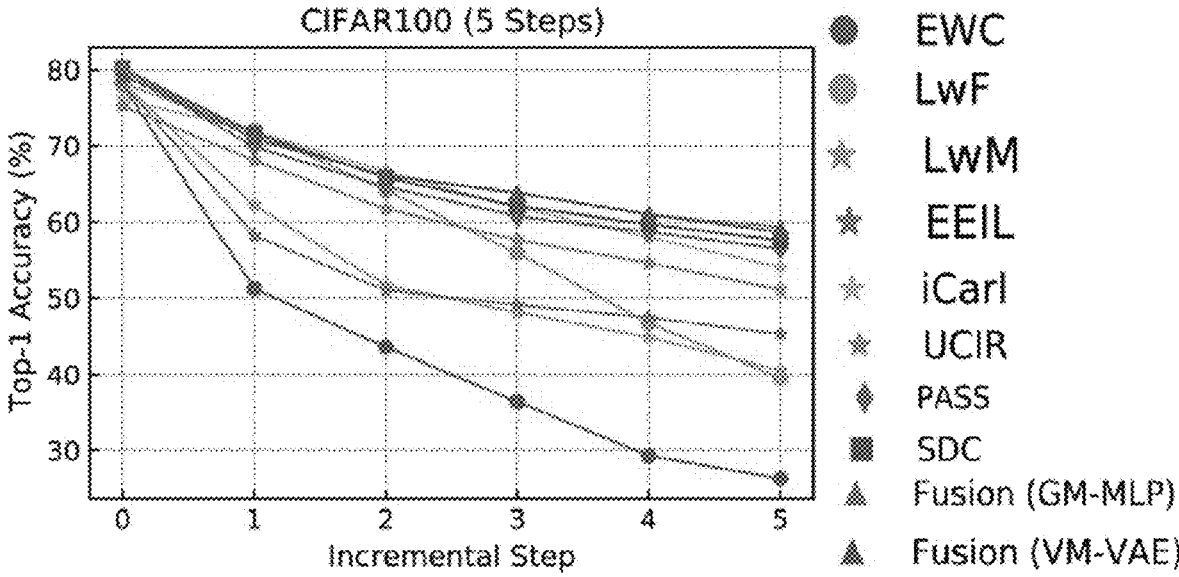
FIGS. 6D to 6F plot the accuracy (Top-1%) against number of steps for experimental results using the CIFAR100 benchmark dataset with 5, 10 and 20 phases being used respectively.
Figure 6E:
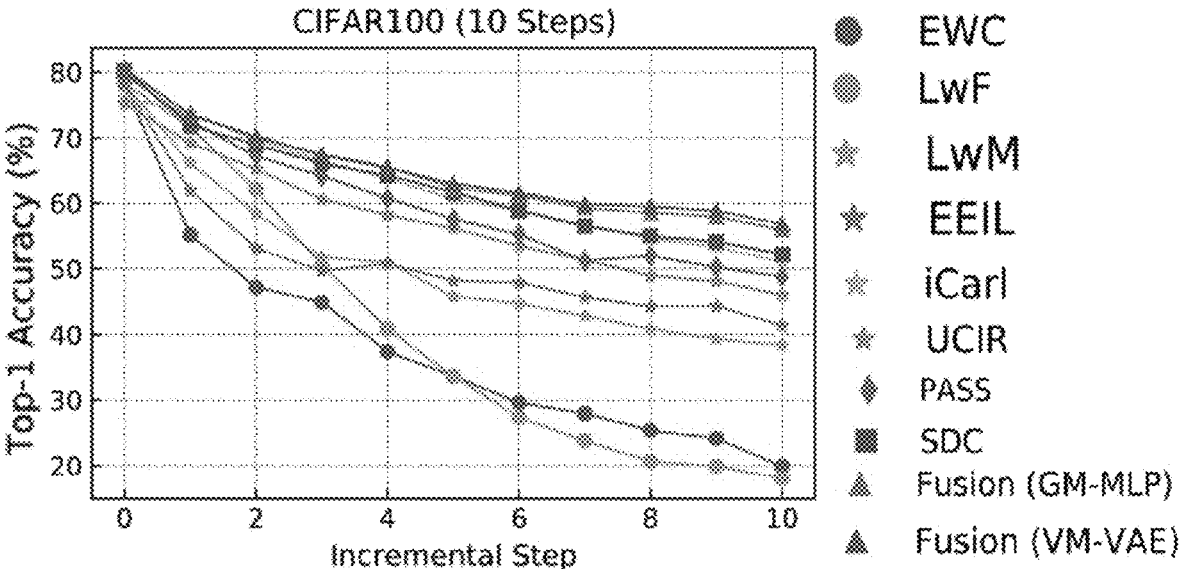
Figure 6F:
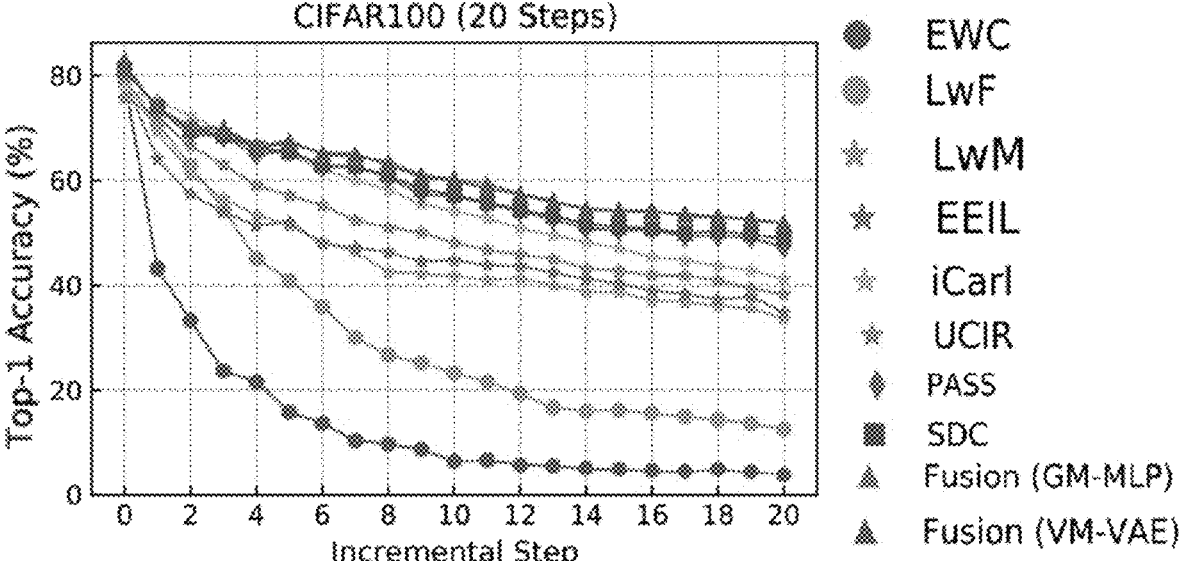

In FIGS. 6D to 6F, we report per-step incremental accuracy results in graphical form when evaluation is performed on the CIFAR100 benchmark. These graphs show the improved performance achieved by our approach with respect to the prior art approaches noted above. These results are also shown in Table 2 in FIG. 6G. Our models (with the best achieved accuracy) outperform the closest SotA (SDC) by 1.75%, 4.6% and 3.07% for 5, 10 and 20 steps. In FIGS. 6D to 6F, for the sake of clearance of presentation of results, we only provide per-step incremental accuracy of Fusion (GM-MLP and VM-VAE). The results show the improved accuracy achieved by our models with respect to the prior art throughout the incremental steps.

CUB200-2011

Figure 7A:
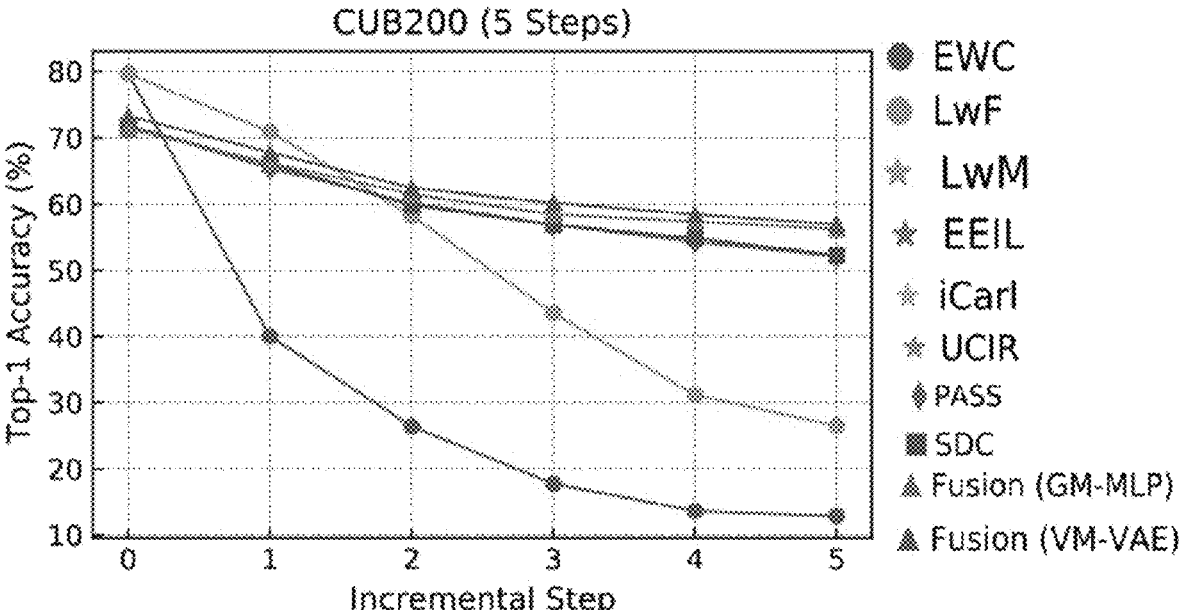
FIGS. 7A to 7C plot the accuracy (Top-1%) against number of steps for experimental results using the CUB 200-2011 benchmark dataset with 5, 10 and 20 phases being used respectively.
Figure 7B:
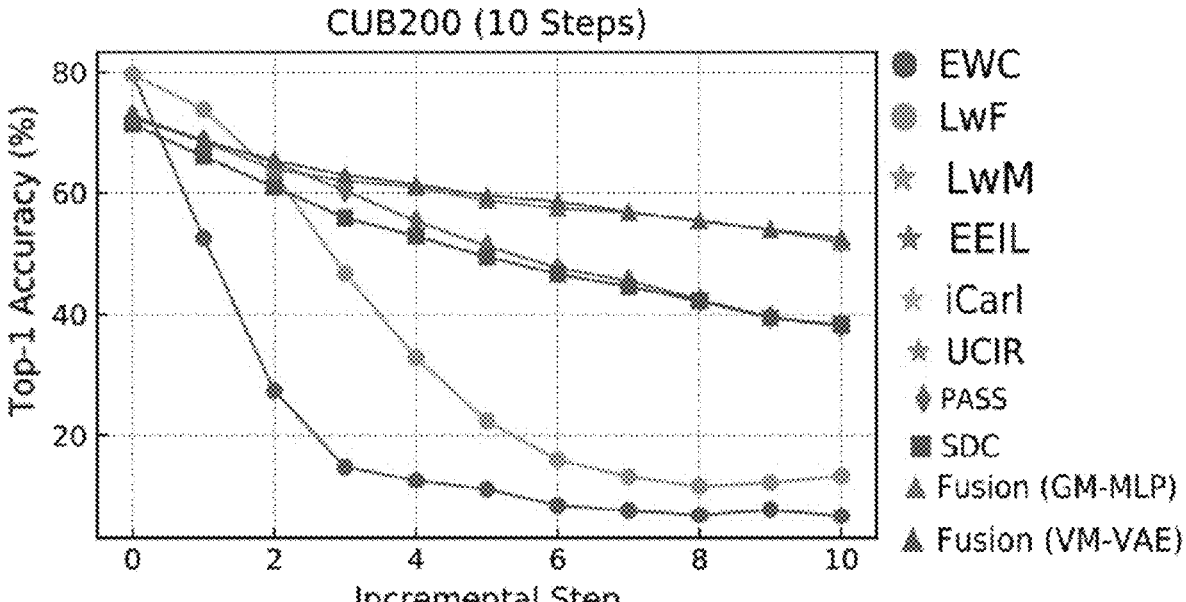
Figure 7C:
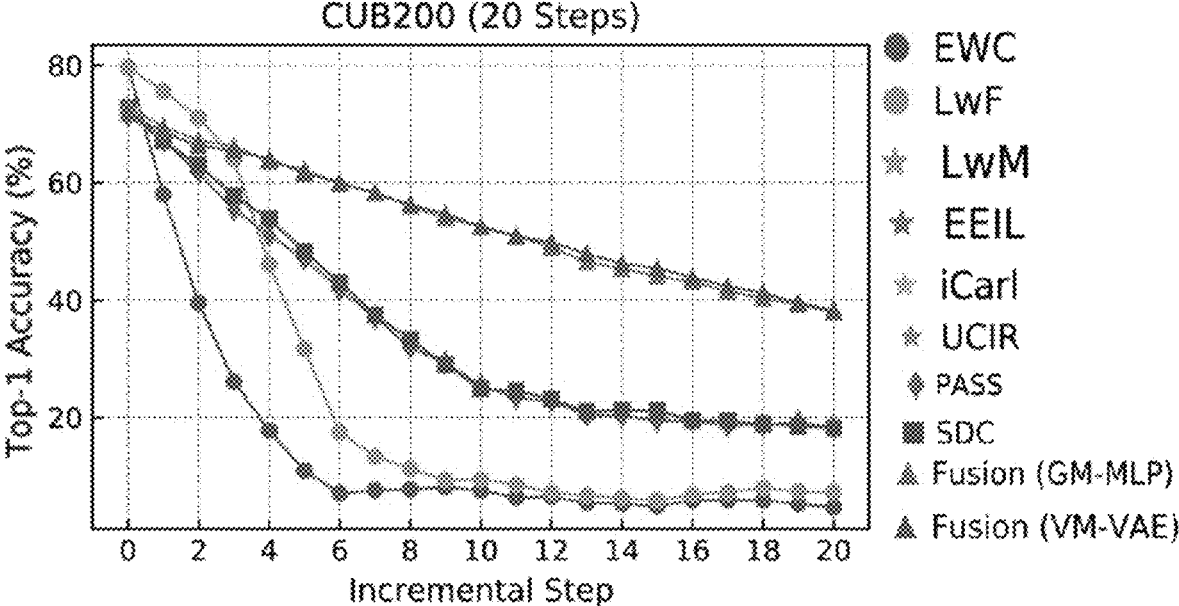

In FIGS. 7A to 7C, we report final accuracy results in graphical form when evaluation is performed on the CUB200-2011 benchmark. These graphs show the improved performance achieved by our approach with respect to the prior art approaches noted above. These results are also shown in Table 3 in FIG. 7D which uses the same referencing as Table 2 in FIG. 6G.

Here non-exemplar methods provide quite low results, especially when the number of incremental steps is increased. Adopting the method proposed in [40] to compensate for modeling shift of prototypes using a softmax classifier seems to have no beneficial effect, showing that it fails to adequately model semantic drift in a fine-grained classification set-up with high semantic similarity among classes. On the other end, our framework demonstrates to successfully capture model representation drift; by injecting up-to-date knowledge of old classes, in fact, we manage to much more effectively mitigate catastrophic forgetting.

FIGS. 8A to 8F show two different measures of forgetting plotted against number of steps. A base measure of forgetting $f_t^c$ may be computed for each past class c at step t>0 by $$f_t^c = \max_{k<t}(a_k^c - a_t^c), \forall c \in \bigcup_{k<t} C_k$$

where $$a_k^c$$

denotes the top-1 accuracy for class c attained at the step k<t. We then compute the class-wise average of forgetting measures over all past classes at each step. This class-average measure of forgetting (%) is plotted in FIGS. 8A to 8C. The task-wise average at the end of incremental training may also be calculated by computing the averages of forgetting measures at the final step over classes belonging to the same tasks. This per task average forgetting (%) is plotted in FIGS. 8d to 8f.

Figure 8A:
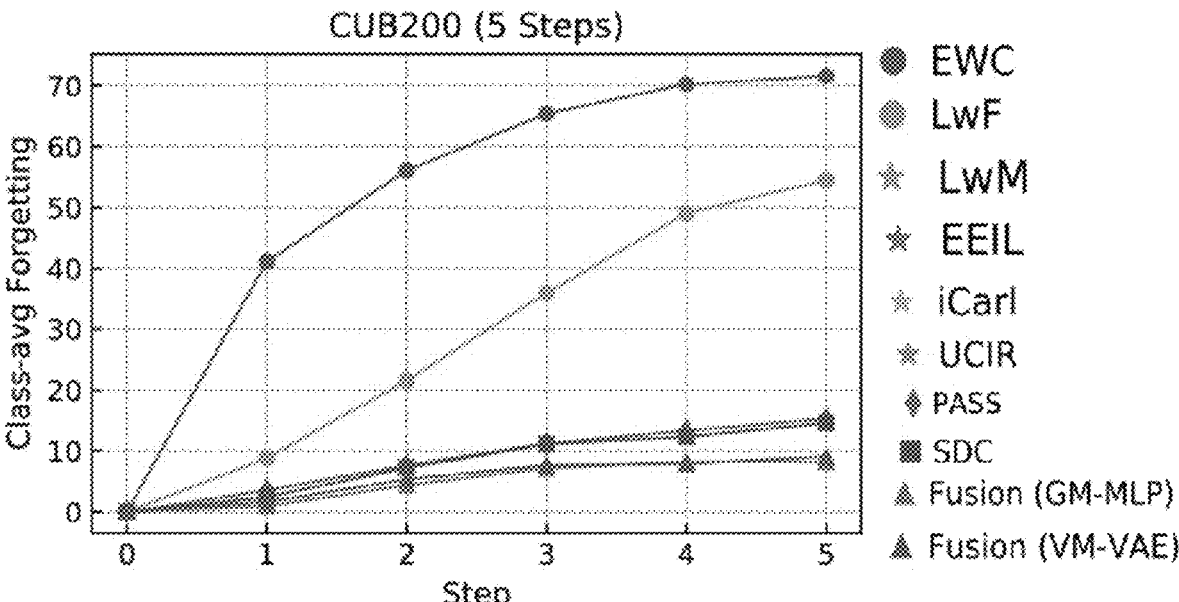
FIGS. 8A to 8C plot the class-average forgetting measure against number of steps for experimental results using the CUB 200-2011 benchmark dataset with 5, 10 and 20 phases being used respectively.
Figure 8B:
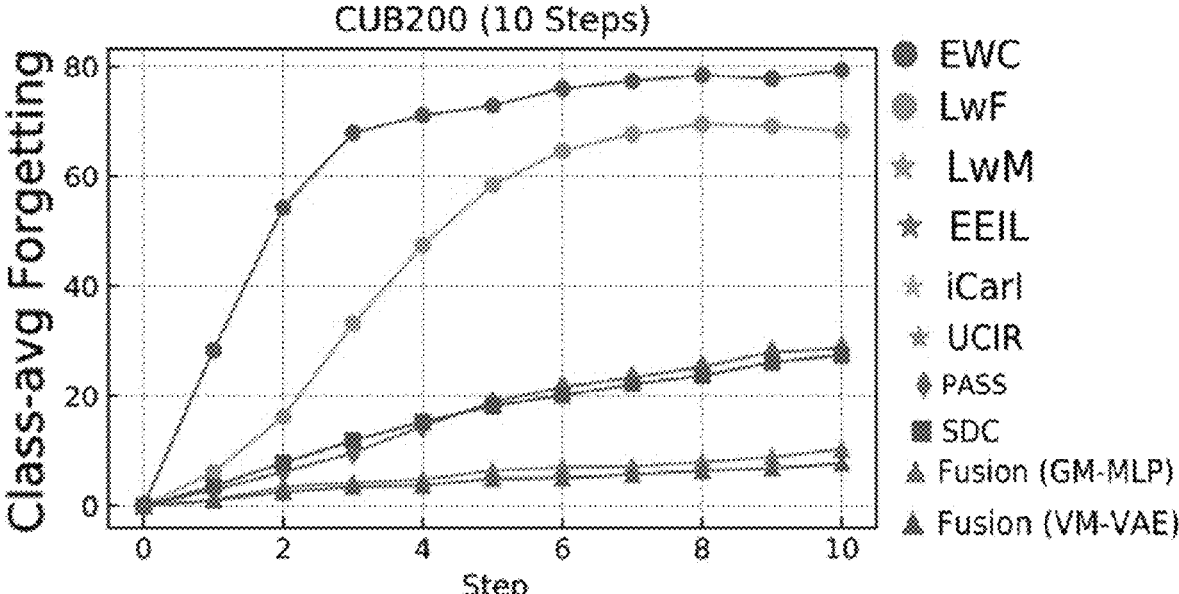
Figure 8C:
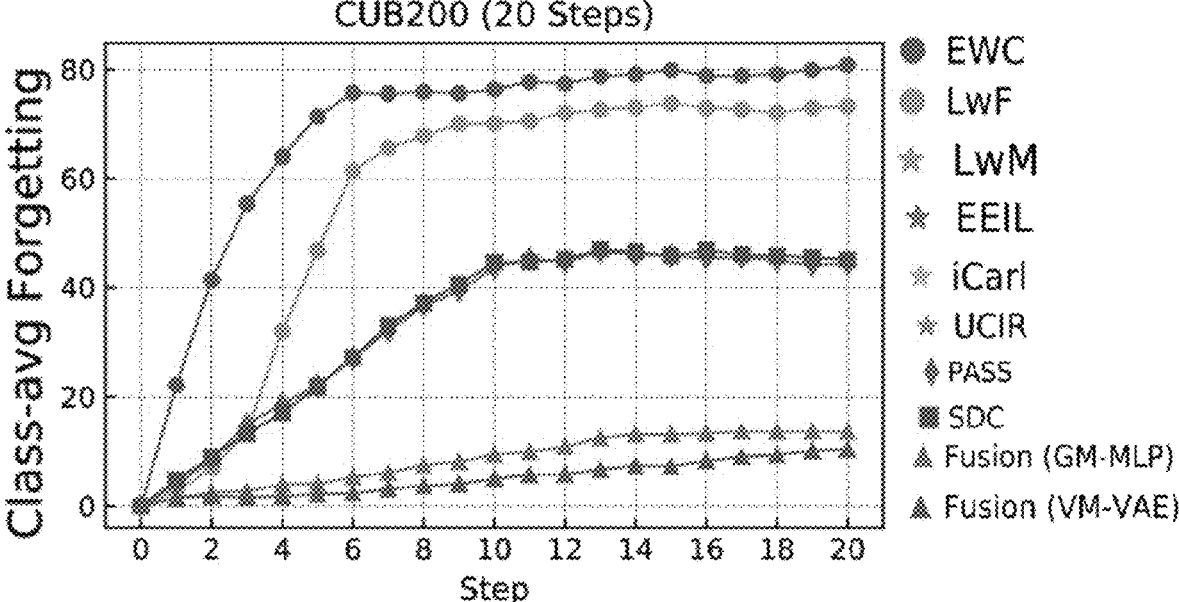
Figure 8D:
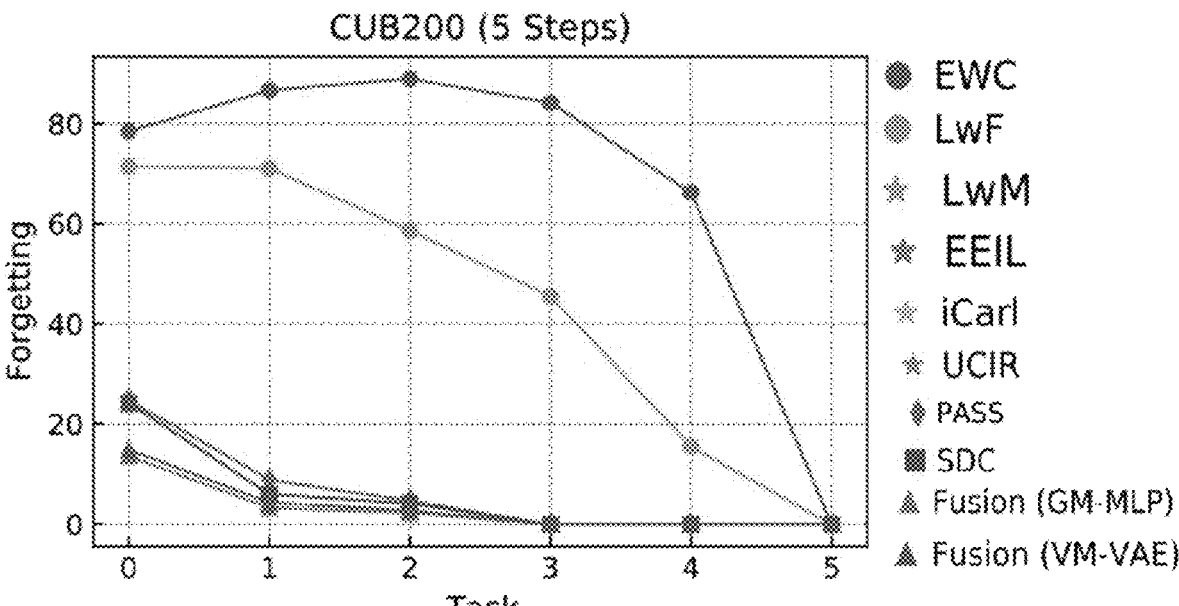
FIGS. 8D to 8F plot a forgetting measure against number of steps for experimental results using the CUB 200-2011 benchmark dataset with 5, 10 and 20 phases being used respectively.
Figure 8E:
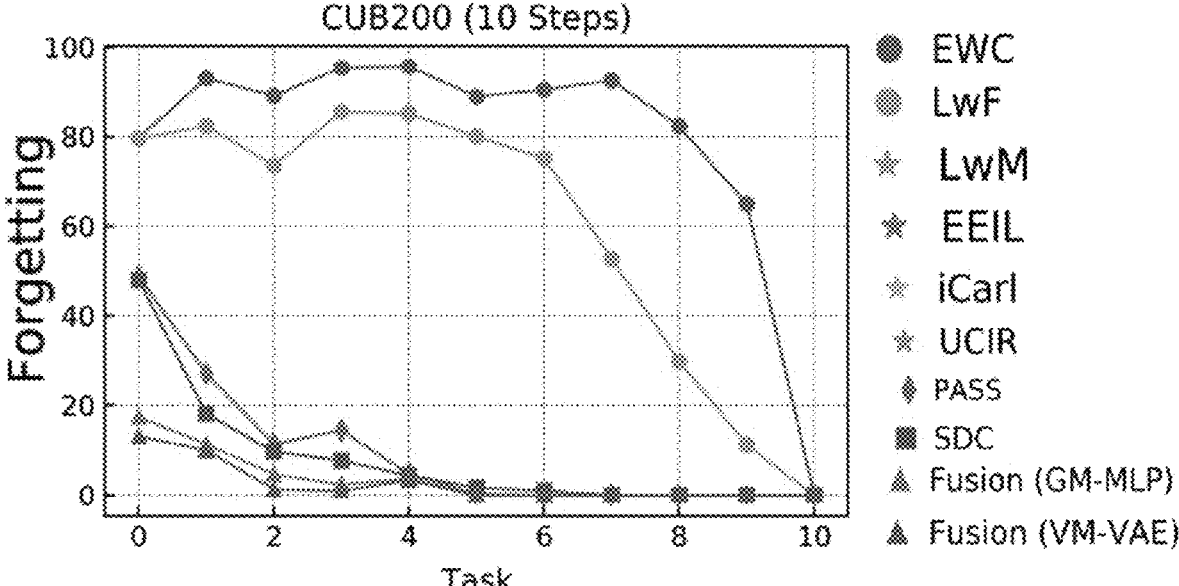
Figure 8F:
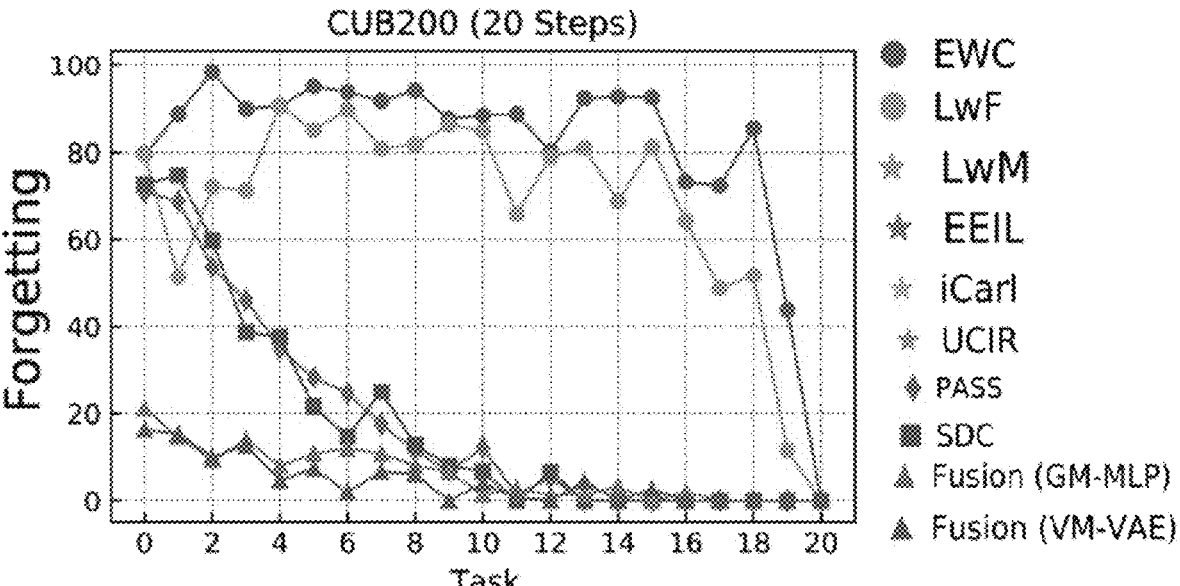

FIGS. 8A to 8C show how the class-wise average forgetting evolves throughout incremental training when different methods are employed. We observe that the proposed CIL approach based on representation drift modelling mitigates forgetting more efficiently than the other competitors. FIGS. 8D to 8F show how our CIL method causes less overall forgetting that the competing approaches and provides an improved performance equally shared among all tasks. This is especially noticeable when compared with the PASS and SDC methods which induce almost total forgetting of the oldest tasks.

It will be appreciated that the measures of forgetting may also be calculated for the other datasets but for efficiency just the CUB100 results are shown here. Similar improvements are seen with the proposed approach. Only the known method iCARL [9] shows some improvement over the proposed approach for the CIFAR100 and TinyImageNet datasets. However, we note that iCARL [9] yields a lower or comparable classification accuracy when compared to the proposed approach. This suggests that a focus of iCARL [9] on preserving past knowledge (i.e. stability) is accompanied by a less efficient learning of novel classes (i.e. plasticity).

Ablation Study

As explained above, our framework enables implementation of drift models using different GMs and VMs. We studied the accuracy of a GM (MLP) and VM (VAE) for modeling different drifts and their fusion in the results section above. The results suggest that the accuracy of GMs and VMs depends on statistical sufficiency of data which affects capacity of $f_\theta$ and learned representations as follows:

On the Cifar100 dataset, the GM (MLP) outperforms the VM (VAE) for smaller (e.g. 5) steps, where more classes are observed at each step, compared to the larger (e.g. 20) steps. We conjecture that this result can be attributed to training models using statistically insufficient data representing all classes at each step.

On TinyImageNet, containing larger images than Cifar100, the VM (VAE) performs on par with and slightly outperforms the GM (MLP) for smaller steps.

On CUB200 containing the largest images, the VM (VAE) outperforms the GM (MLP) for all steps.

The methods described above are elucidated further with an ablation study and related analyses detailed below.

The first ablation study comprises analysing how well semantic drift is modeled and employed to update prototypical class representations. We explore how well representation drifts are modeled and prototypes are updated considering the drifts during incremental learning. For this purpose, we compute low-dimensional embedding of high dimensional representation vectors using the Isomap [31] so that the 2D embeddings of the feature vectors can be visualised. The results are shown in FIGS. 9A to 12B. In the results, we observe that our proposed methods estimate prototypes closer to the target (ground-truth) prototypes compared to the state of the art method PASS [43].

Figure 9:
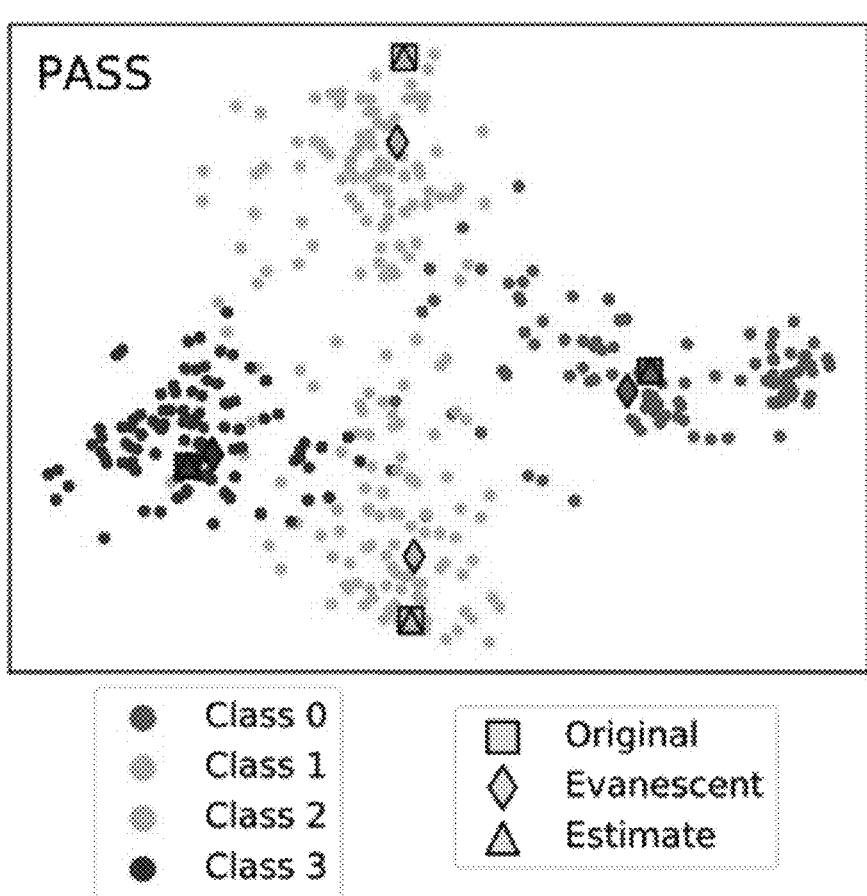
FIGS. 9 and 10 plot the feature representation of samples of the first four learned classes for the PASS method and the proposed method respectively.
Figure 10:
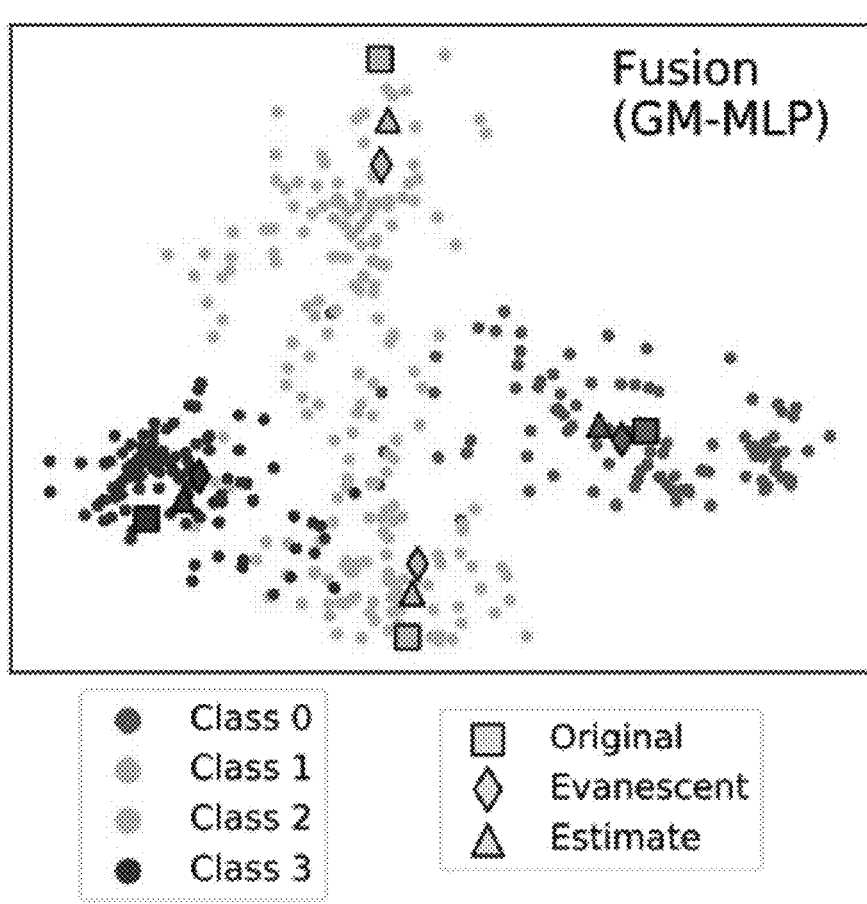

FIGS. 9 and 10 depict the feature representations of samples of the first four learned classes (which for example may be apple, aquarium fish, baby, bear) from the test set (circles) which is CIFAR100. The prototypes which have been computed over the training data are shown as squares and the prototypes which are estimated during training are shown as triangles. Finally, the prototypes computed over the test data are shown as diamonds. FIG. 9 shows the results for the PASS method and FIG. 10 shows the improved results with the method proposed above. In other words, our proposed methods estimate prototypes which are closer to their evanescent versions compared to PASS, following the trajectory of evanescent representations of old classes, without having access to training data of such classes.

Figure 11:
FIG. 11 is a feature representation of samples of the first four learned classes for the proposed method applied to the CIFAR 100 benchmark dataset using 20 incremental steps.

FIG. 11 is a feature representation of samples of the first four learned classes from the CIFAR100 test set with the samples shown as circles. The decrease in transparency and increase in brightness indicates that the representations are extracted at progressively increasing incremental steps (i.e. at steps 0, 10 and 20). The prototypes which have been computed over the training data are shown as squares and the prototypes which are estimated during training are shown ad triangles. Finally, the prototypes computed over the test data are shown as diamonds. The prototypes which have been computed over the training data are fixed for the rest of the incremental tasks.

Figure 12A:
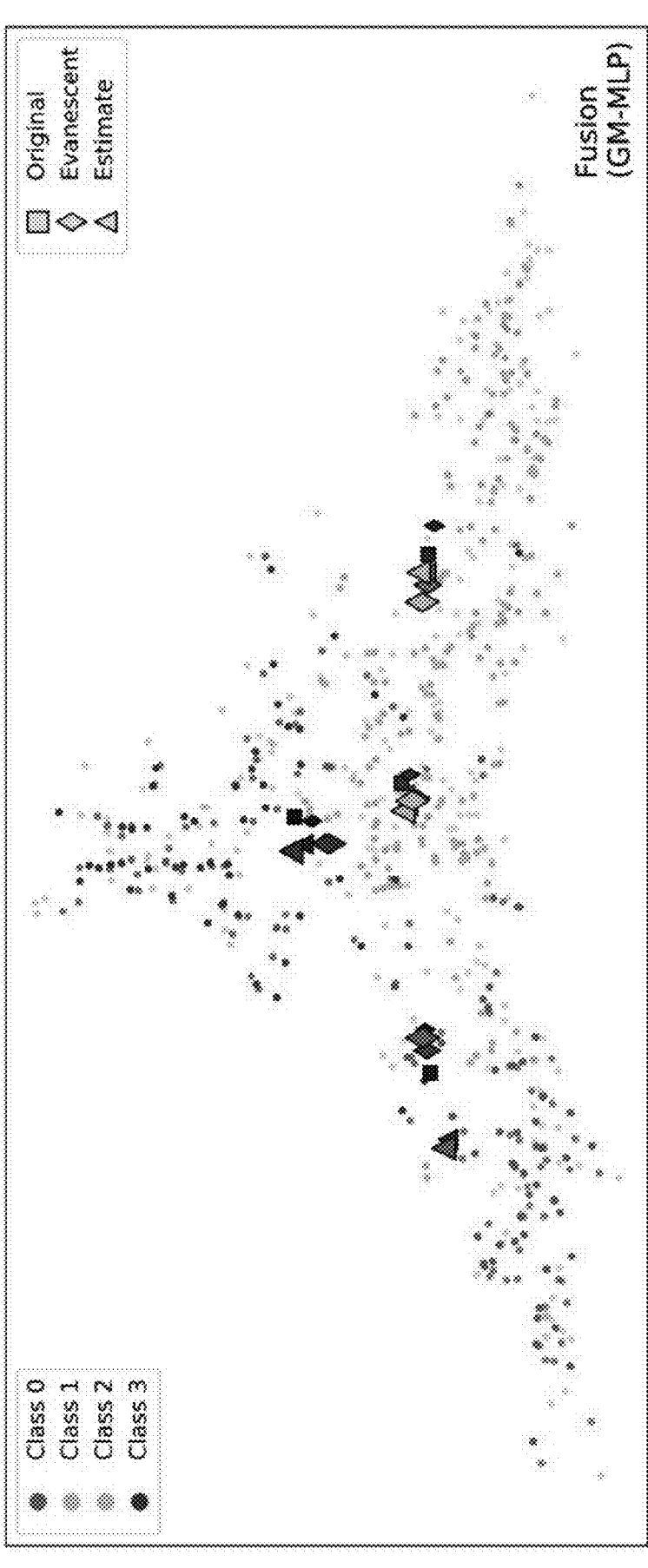
FIGS. 12A and 12B are feature representations of samples of the first four learned classes for the proposed method applied to the TinyImageNet and CUB 200-2011 benchmark datasets using 20 incremental steps, respectively.
Figure 12B:
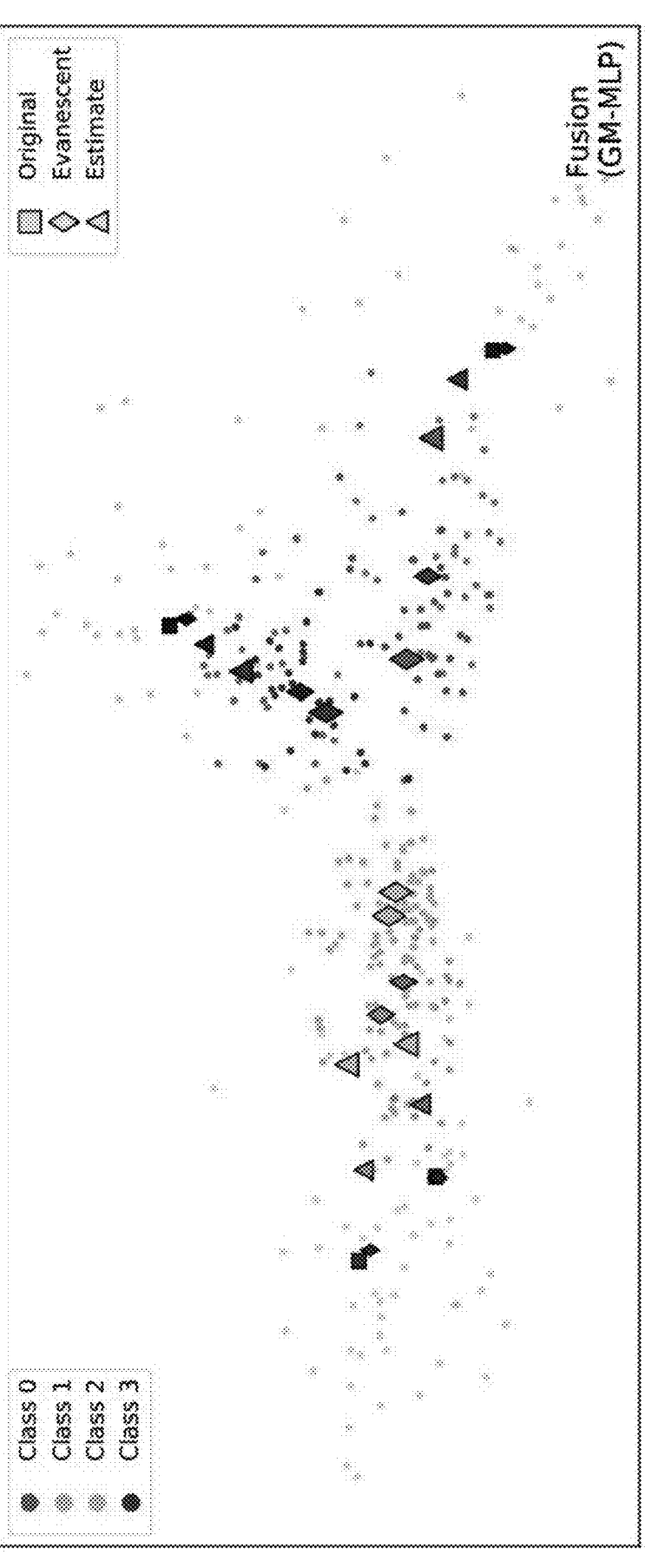

FIGS. 12A and 12B show the same information as FIG. 11 for the test sets TinyImageNet and CUB200 respectively.

The prototypes which have been computed over the training data are shown as squares and the prototypes which are estimated during training are shown ad triangles. Finally, the prototypes computed over the test data are shown as diamonds.

FIGS. 9A to 12B show that our proposed method allows the estimation of revived prototypes which are closer to their evanescent versions than when using PASS, especially for the CIFAR100 and CUB200 benchmarks shown in FIGS. 11 and 12B. This shows that we can approximate the trajectory of evanescent representations of old classes, without having access to training data of such categories, by modeling representation drift.

In the next set of analyses, we investigate how our method proposed to model representation drifts, captures and preserves semantic relationships between feature representations of old and new classes. For this purpose, we compute prototypical representations (or prototypes) of novel classes on the training data available at an incremental step t and estimate the revived prototypes of old categories by modeling semantic and feature drifts (employed individually or fused). Then, we express inter-class relationships in the form of Euclidean distances between prototypes of past and new classes, and observe the evolution of such distance throughout an incremental step t. In particular, we compute distance values between pairs of class prototypes at the beginning and at the end of the same incremental step t, and measure their change across the optimisation interval (i.e. in the form of absolute value of the difference between the estimates performed at the beginning and the end of step t.

We compute the Euclidean and cosine distances between estimated (revived) prototypes of old classes (i.e. computed over training data and fixed [43], or updated by [40] or by drift models) and their reference (i.e. evanescent) representations (computed over the test set) at each incremental step. In other words, we measure and analyze representation drift with geometric distance functions. We provide per-step class-wise average distance values (main curves), as well as the maximum and minimum class values that identify, respectively, the upper and lower bound of the shaded regions for each setup. Feature prototypes of old classes are estimated by computing class wise averages of feature representations over training data when they are available at an incremental step, which can then be simply fixed for the rest of the training (as done in PASS [43]), or can be updated by SDC [40] or by the proposed drift models. Evanescent prototypes of the same old classes are instead computed over the test set (unavailable during training).

Figure 13A:
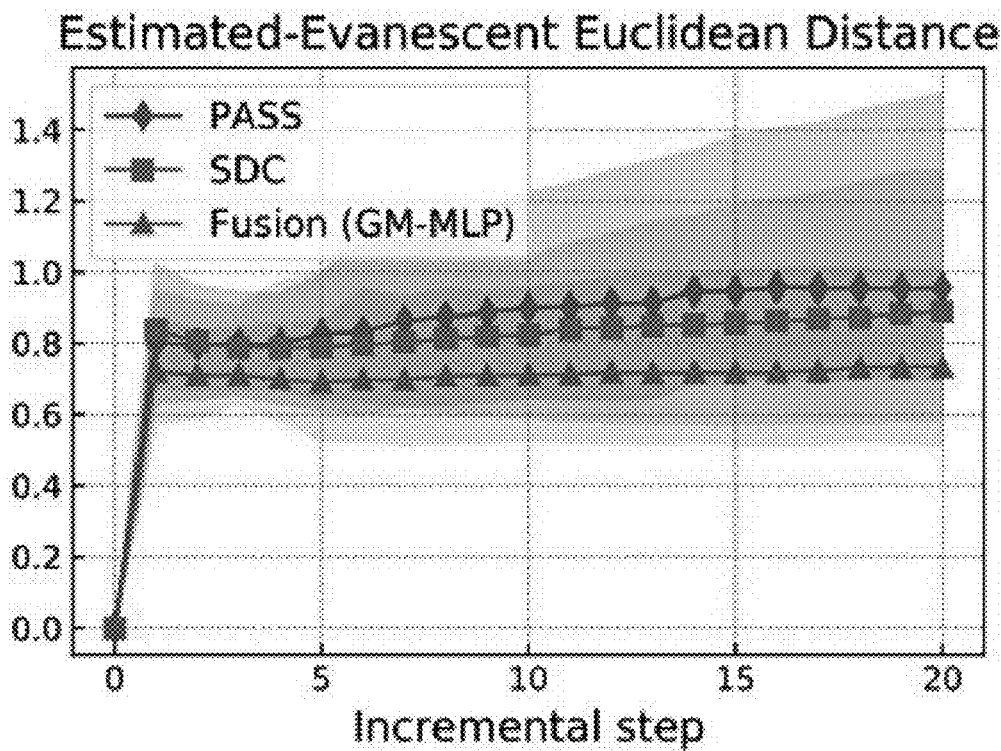
FIGS. 13A and 13B plot the average Euclidean distance between estimated prototypes of old classes and their true representations and the average cosine similarity between estimated prototypes of old classes and their true representations against incremental step respectively for each of PASS, SDC and the method proposed above applied to the CIFAR 100 benchmark dataset.
Figure 13B:
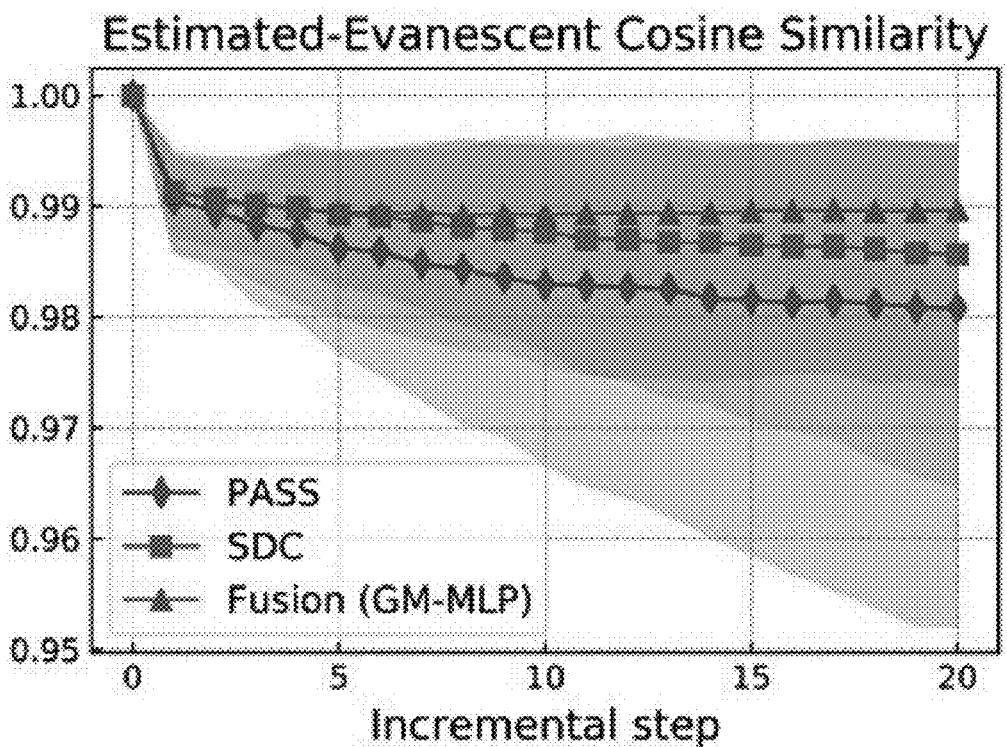
Figure 13C:
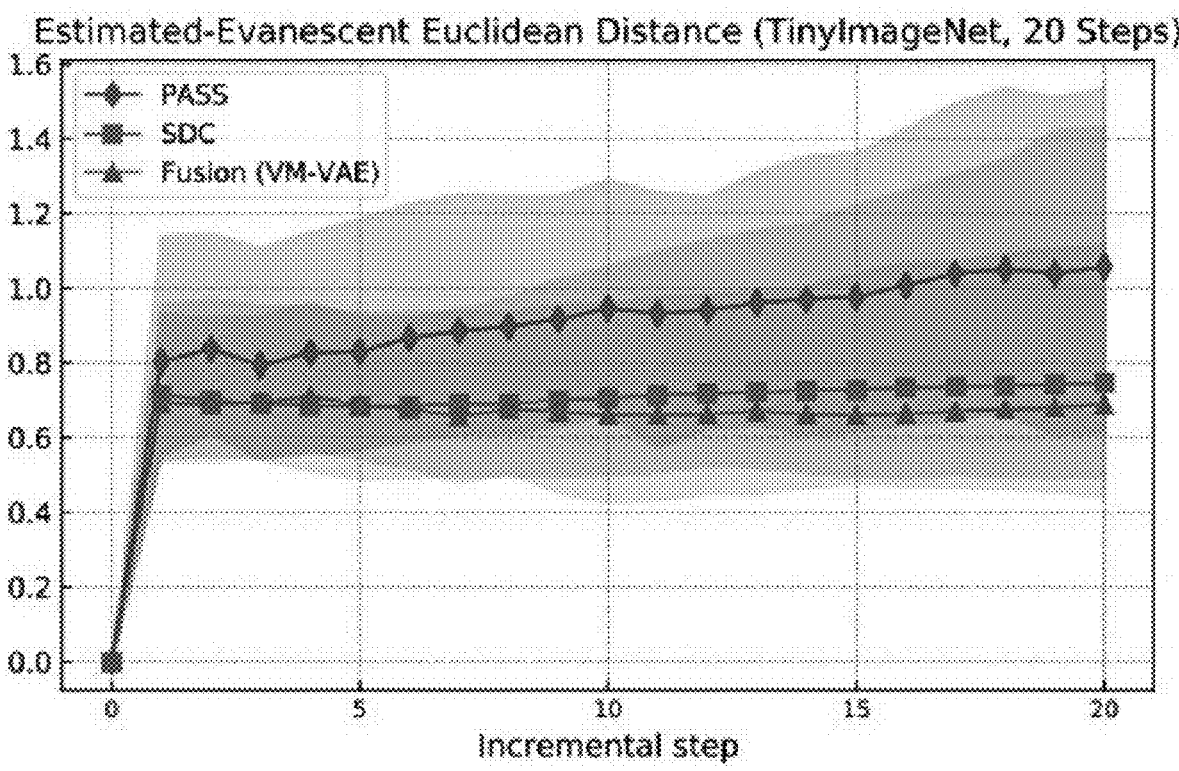
FIGS. 13C and 13D plot the average Euclidean distance between estimated prototypes of old classes and their true representations and the average cosine similarity between estimated prototypes of old classes and their true representations against incremental step respectively for each of PASS, SDC and the method proposed above applied to the TinyImageNet benchmark dataset.
Figure 13D:
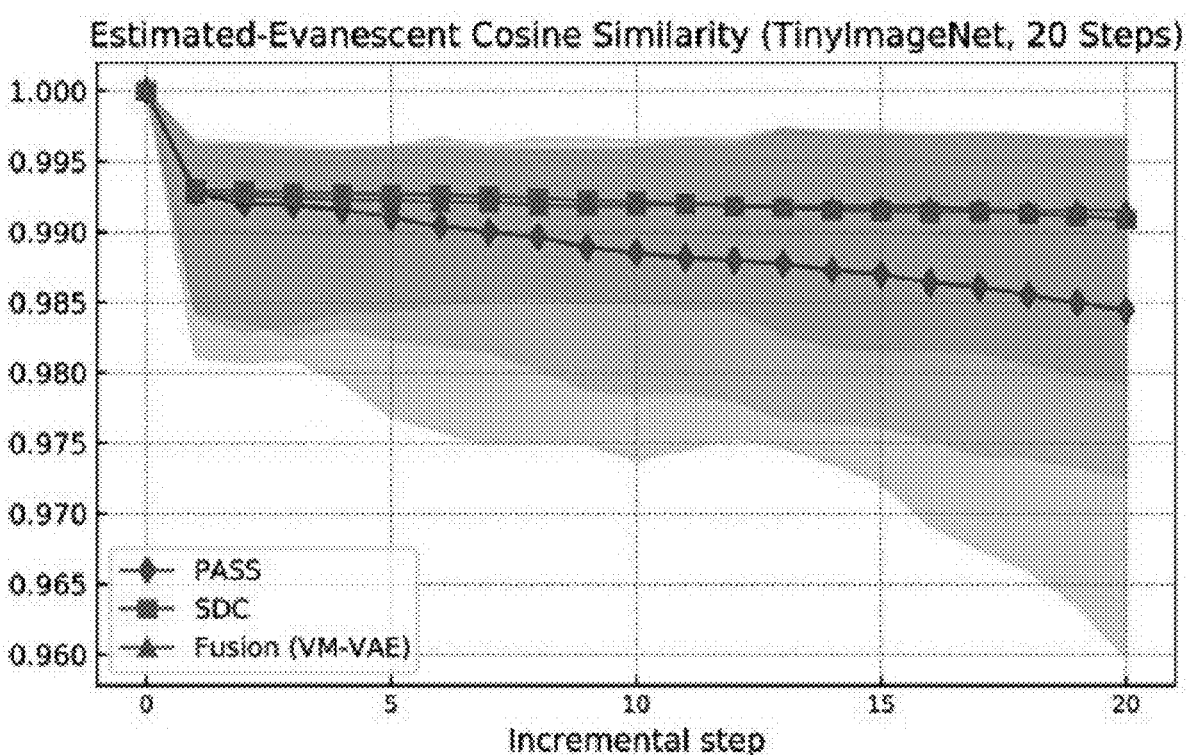
Figure 13E:
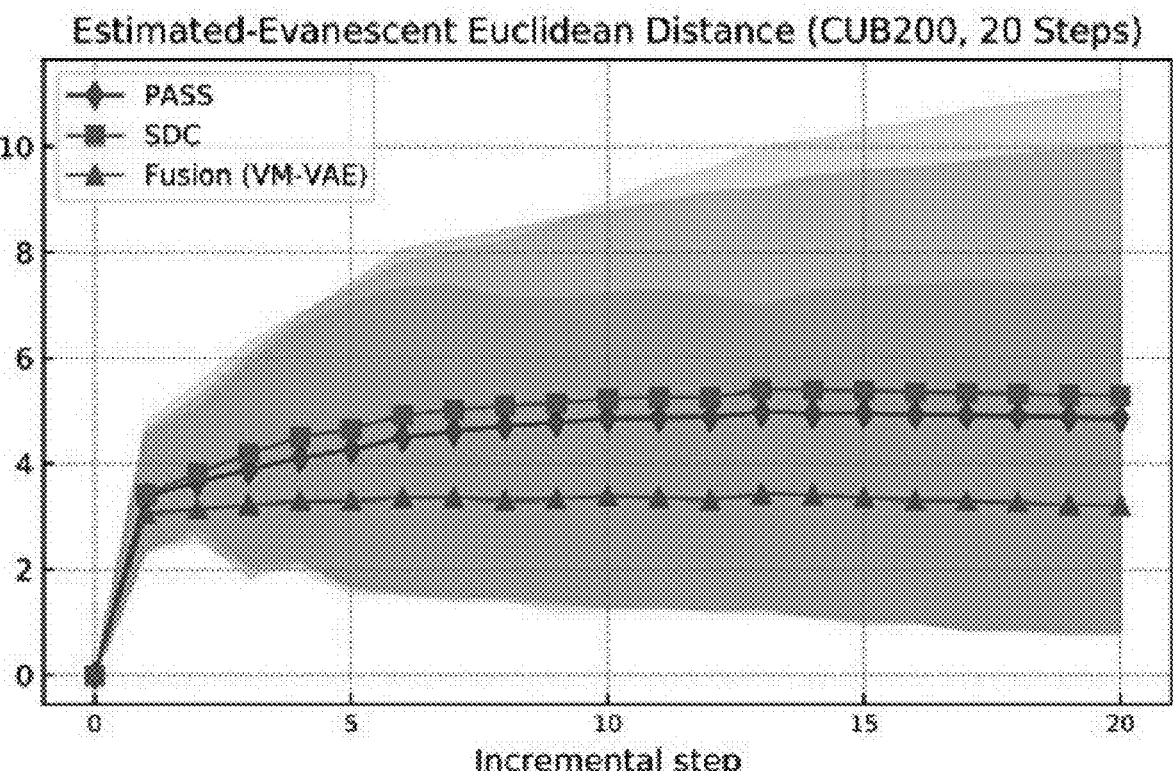
FIGS. 13E and 13F plot the average Euclidean distance between estimated prototypes of old classes and their true representations and the average cosine similarity between estimated prototypes of old classes and their true representations against incremental step respectively for each of PASS, SDC and the method proposed above applied to the CUB 200-2011 benchmark dataset.
Figure 13F:
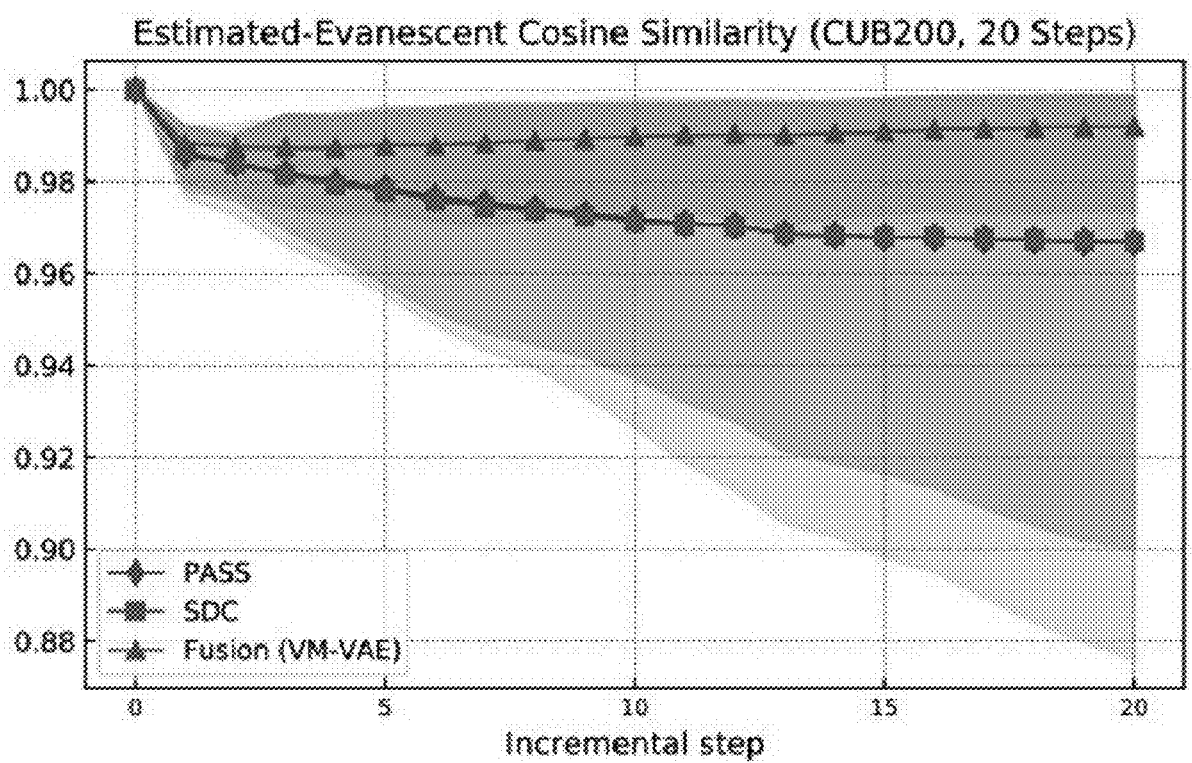

We replicate the analysis on the CIFAR100 shown in FIGS. 13A and 13B, on the TinyImageNet shown in FIGS. 13C and 13D and on the CUB200 dataset shown in FIGS. 13E and 13F. FIGS. 13A, 13C and 13F plot the average Euclidean distance between estimated prototypes of old classes and their true for each of PASS [43], SDC [40] and the method proposed above. FIGS. 13B, 13D and 13F plot the average cosine similarity between estimated prototypes of old classes and their true representations for each of PASS [43], SDC [40] and the method proposed above. Distances are reported for each incremental step while training modes' on the CIFAR100 dataset with 20 incremental steps.

The results show that our proposed methods can update the prototypes to be closer and better aligned with the reference prototypes compared to the state of the art PASS and SDC methods. Furthermore, we observe that the improved accuracy with respect to the known methods is shared among the three datasets chosen for evaluation. In particular, we notice the remarkable improvement experienced on the CUB200 dataset. Our method, in fact, provides much lower Euclidean distance between revived and evanescent representations, whose average value is kept almost constant as incremental training progresses and new classes are introduced. The same trend can be observed for the cosine similarity of the estimated and evanescent representations, whose value tends to be steady through the incremental training and much closer to the upper bound when our method is adopted. Thereby, our proposed methods reduce the drift between semantic representations in terms of geometric distances (i.e. Euclidean and cosine distances).

Figure 13G:
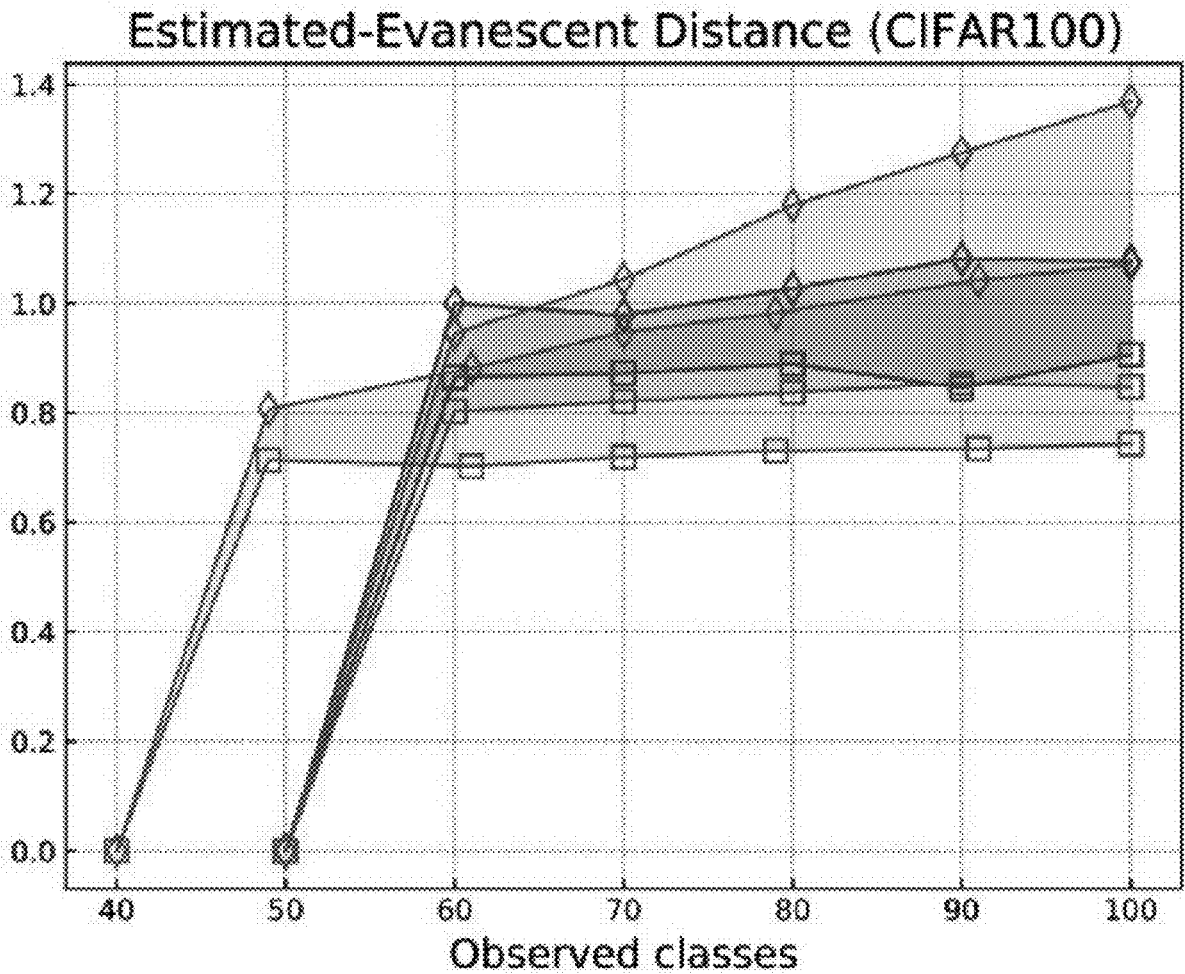
FIGS. 13G, 13I and 13K plot the average Euclidean distance between estimated prototypes of old classes and the evanescent prototypes of old classes against number of classes for each of PASS [43], SDC [40] and the method proposed above applied to the CIFAR100, TinyImageNet and CUB 200-2011 benchmark datasets respectively using a MLP.
Figure 13H:
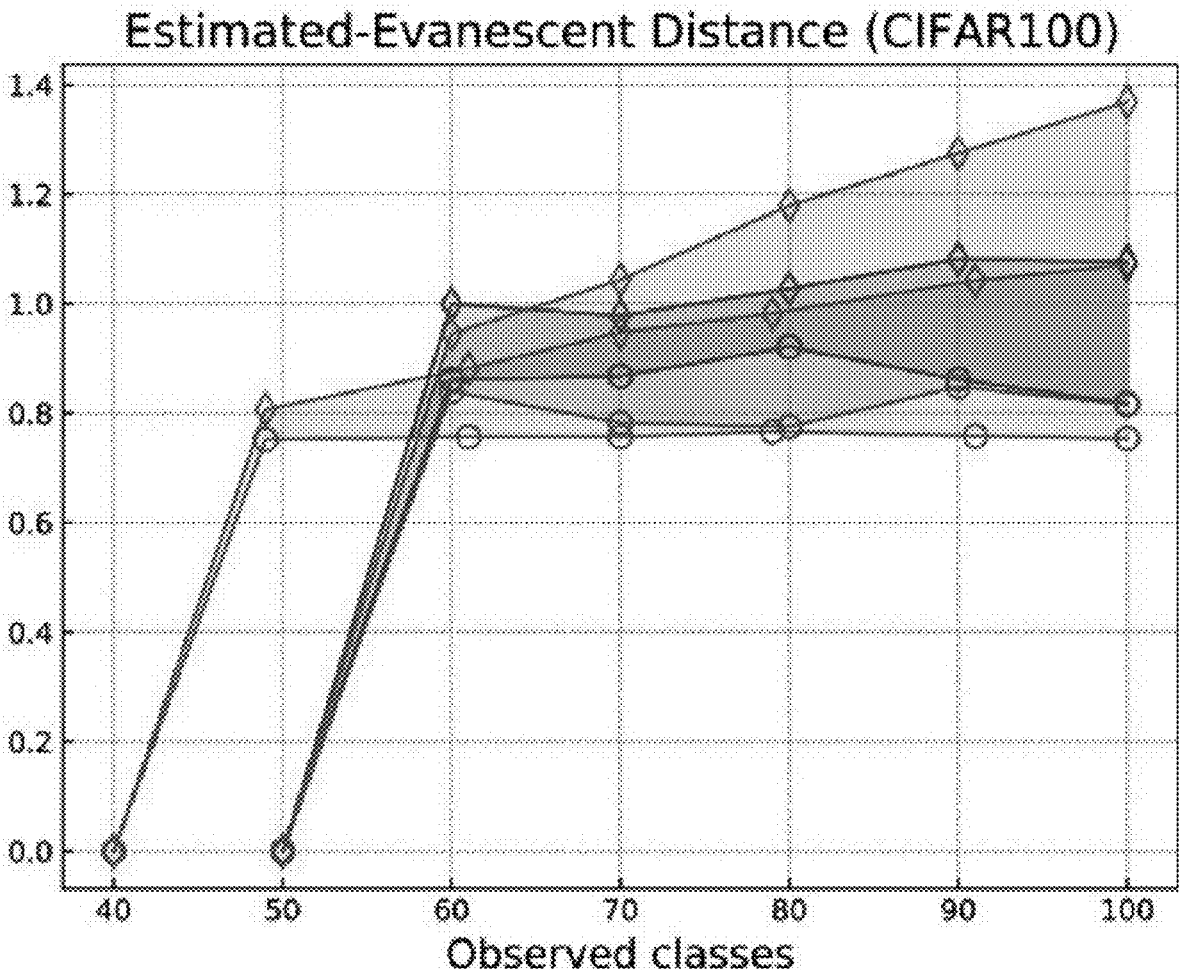
FIGS. 13H, 13J and 13L plot the average Euclidean distance between estimated prototypes of old classes and the evanescent prototypes of old classes against number of classes for each of PASS [43], SDC [40] and the method proposed above applied to the CIFAR100, TinyImageNet and CUB 200-2011 benchmark datasets respectively using a VAE.
Figure 13I:
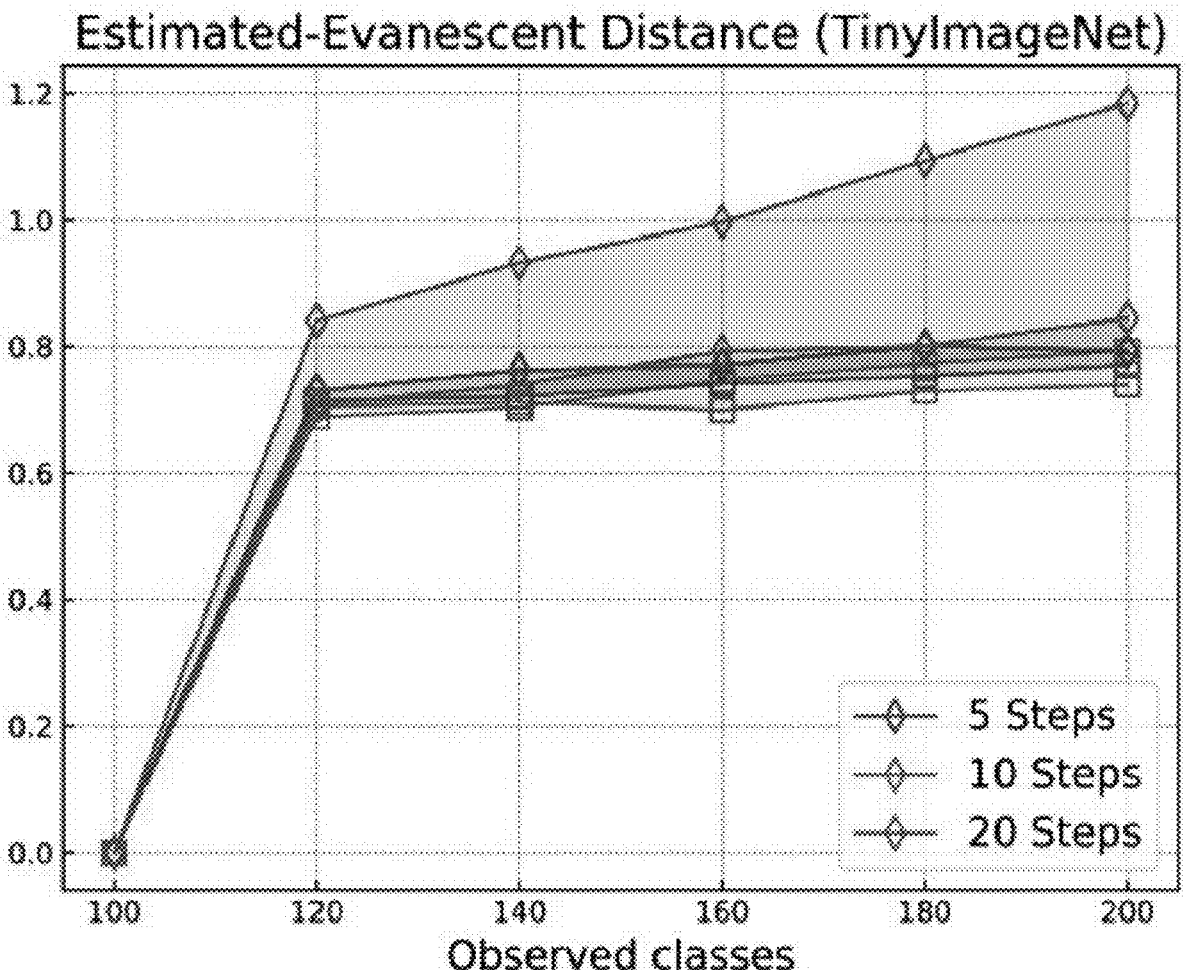
Figure 13J:
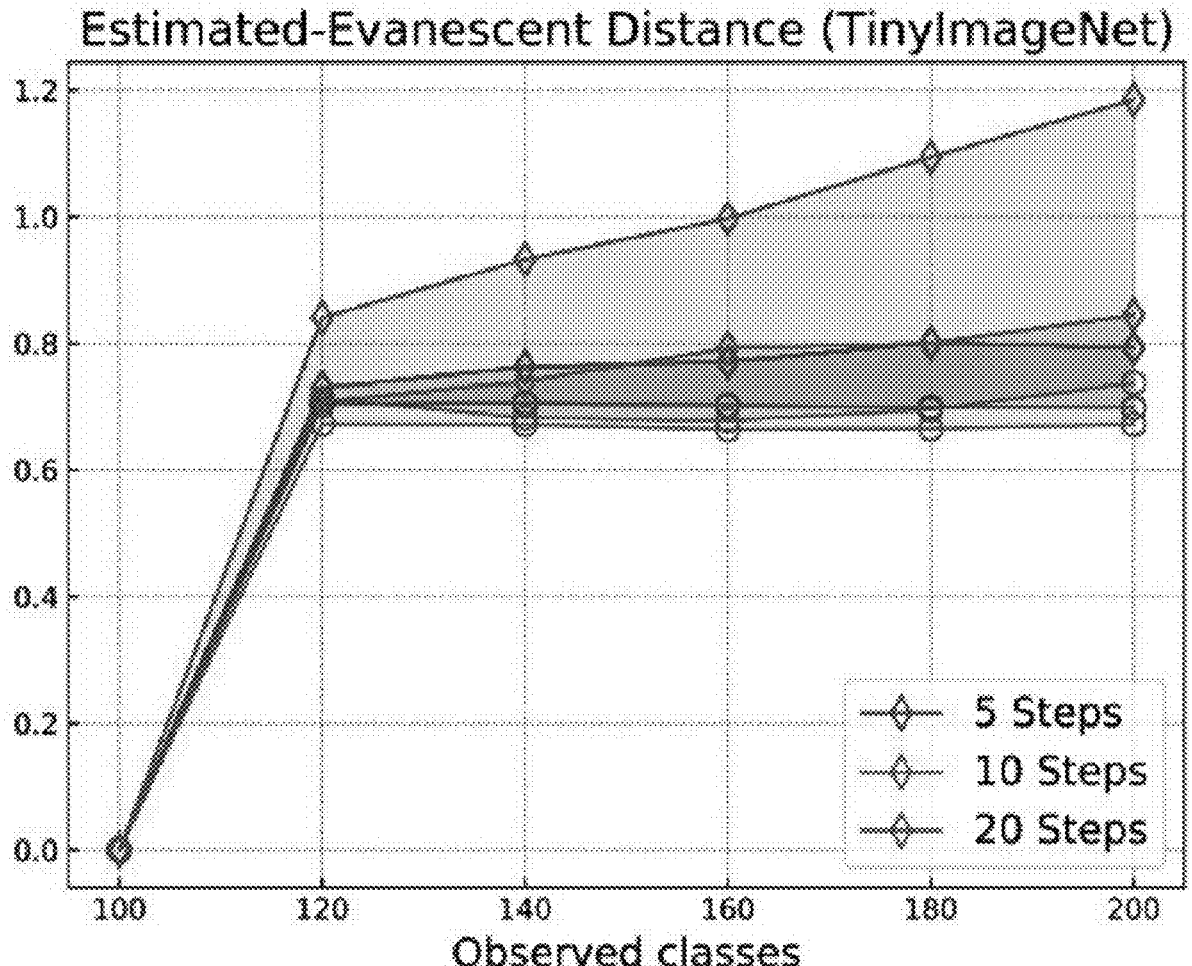
Figure 13K:
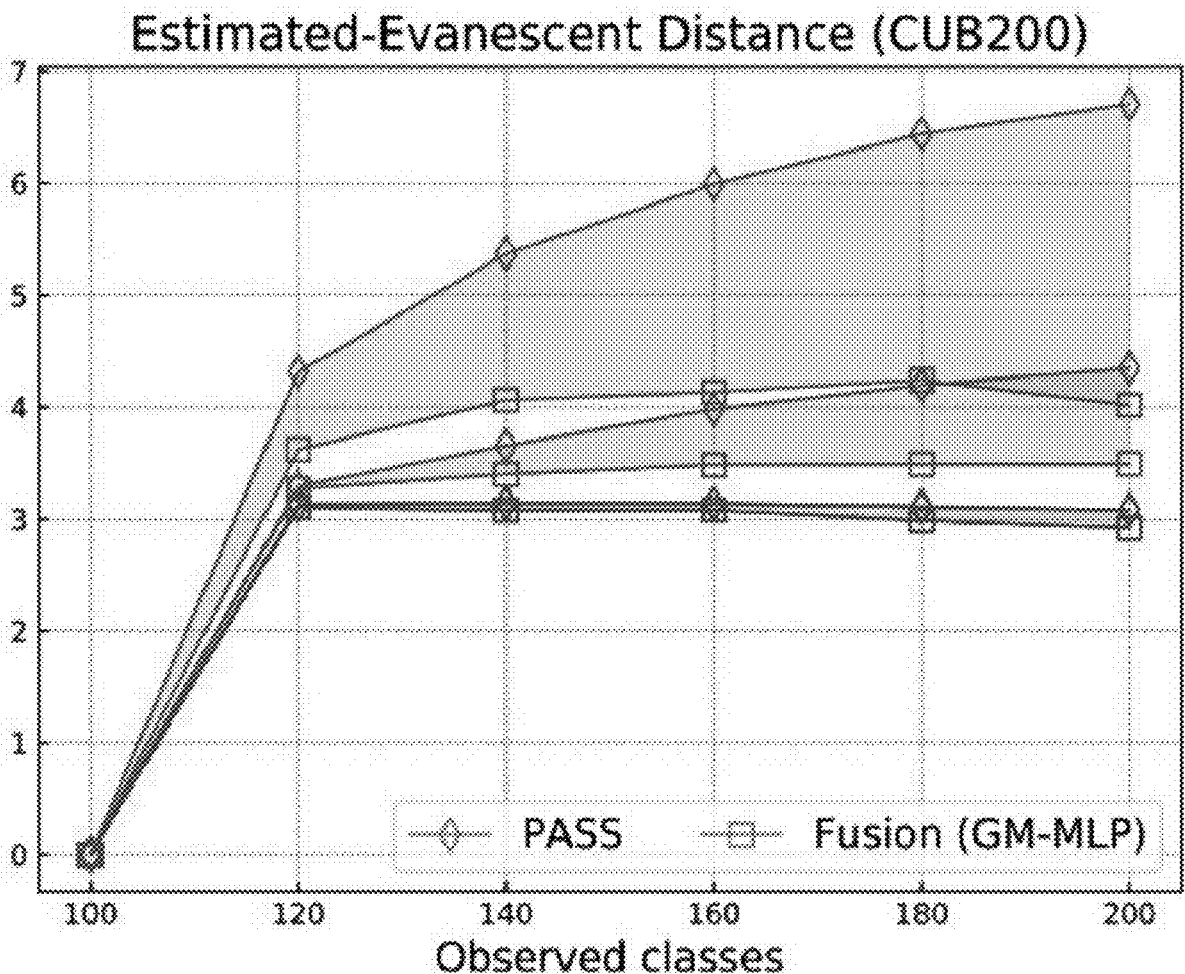
Figure 13L:
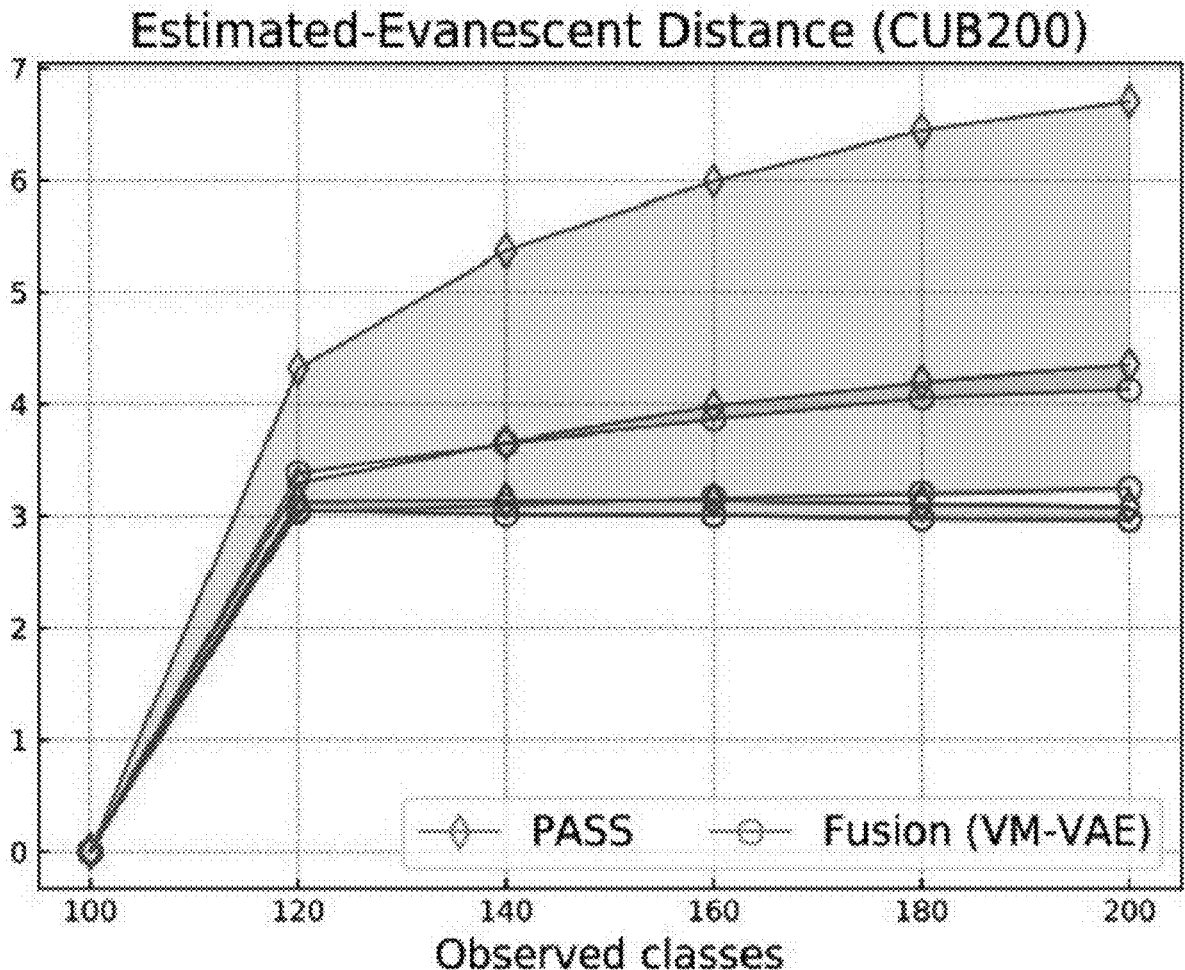

In FIGS. 13G to 13L, we compare the normalised Euclidean distance between the estimated and evanescent prototypes for different numbers of total incremental steps. The results using the CIFAR100 dataset are shown in FIGS. 13G and 13H, on the TinyImageNet shown in FIGS. 13I and 13J and on the CUB200 dataset shown in FIGS. 13K and 13L. FIGS. 13G, 13I and 13FK plot the average Euclidean distance between estimated prototypes of old classes and the evanescent prototypes of old classes for each of PASS [43], SDC [40] and the method proposed above using a MLP. FIGS. 13H, 13J and 13L plot the average Euclidean distance between estimated prototypes of old classes and the evanescent prototypes of old classes for each of PASS [43], SDC [40] and the method proposed above using a VAE. As shown, the proposed method always outperforms the known methods. This is particularly noticeable for the 20-step setup on CU200, where our approach jointly shows the largest improvement over the state of the art methods by approximately 20%. In addition, we notice that by employing VM to identify representation drifts, we reach the largest improvement over PASS, which translates into the revived evanescent representations closer to their unknown reference version.

Figure 14A:
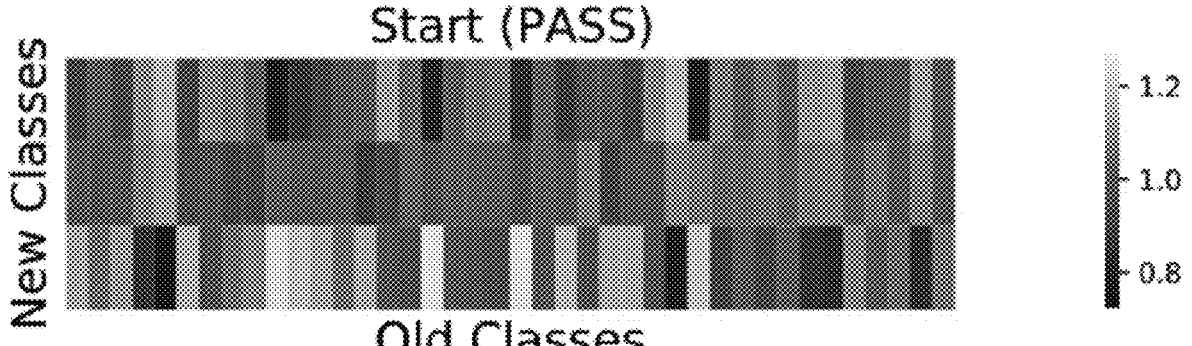
FIGS. 14A and 14D plot the pairwise normalised Euclidean distance between prototypical feature representations of classes introduced in the first incremental phase for the PASS method and our method respectively.
Figure 14B:
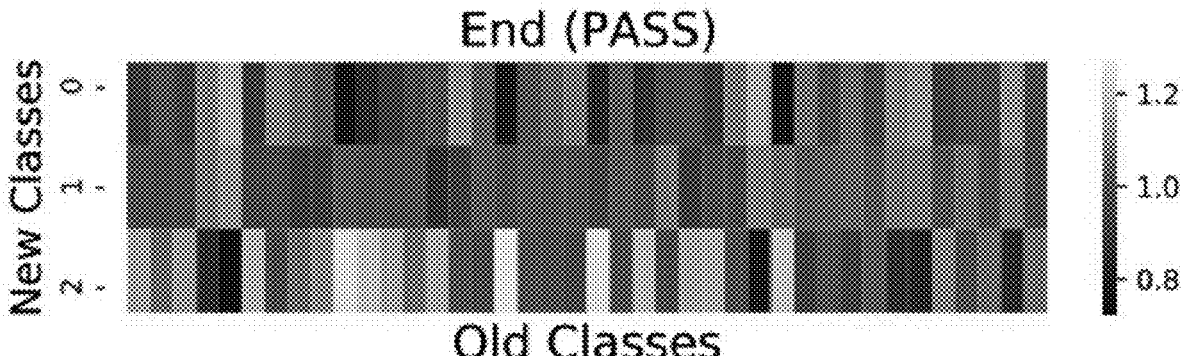
FIGS. 14B and 14E plot the pairwise normalised Euclidean distance between prototypical feature representations of classes introduced in the second incremental phase for the PASS method and our method respectively.
Figure 14C:
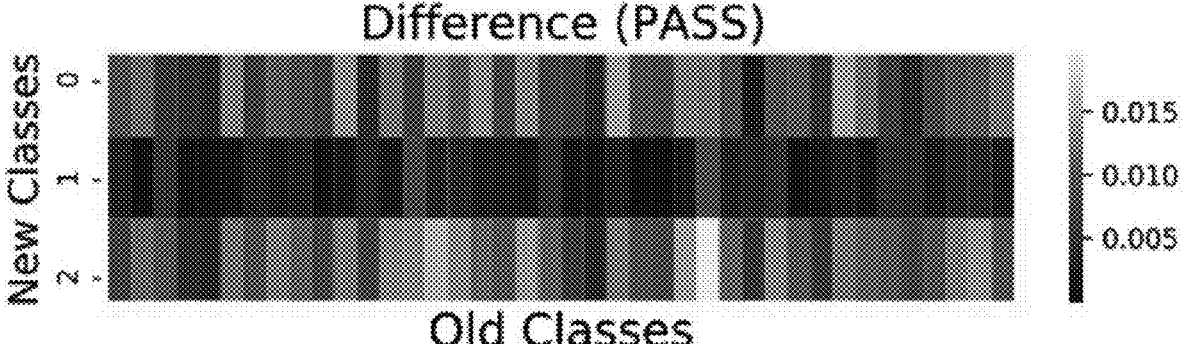
FIGS. 14C and 14F plot the absolute values of the difference for the PASS method and our method respectively.
Figure 14D:
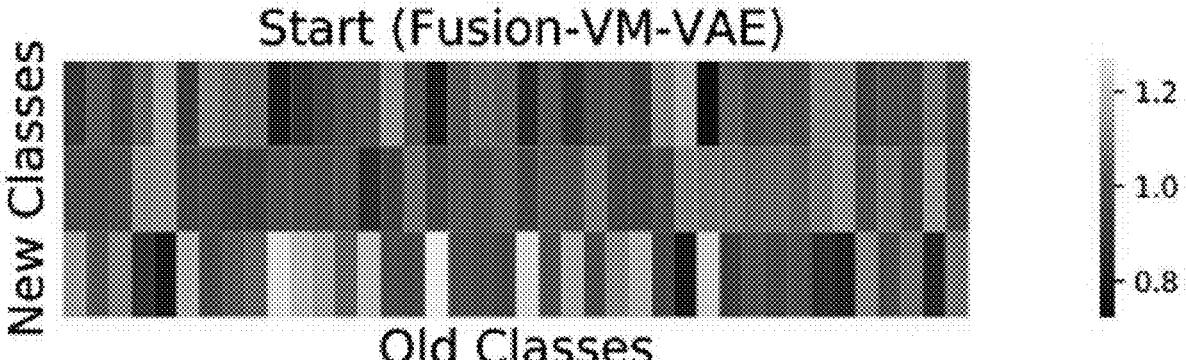
Figure 14E:
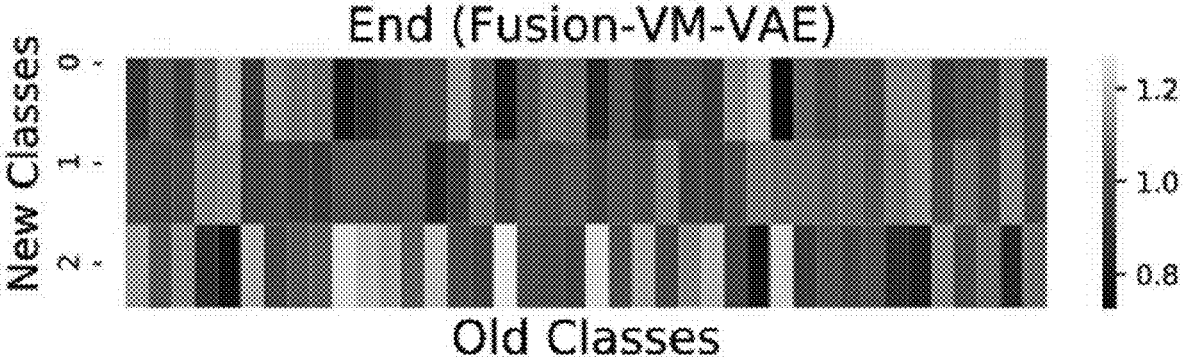
Figure 14F:
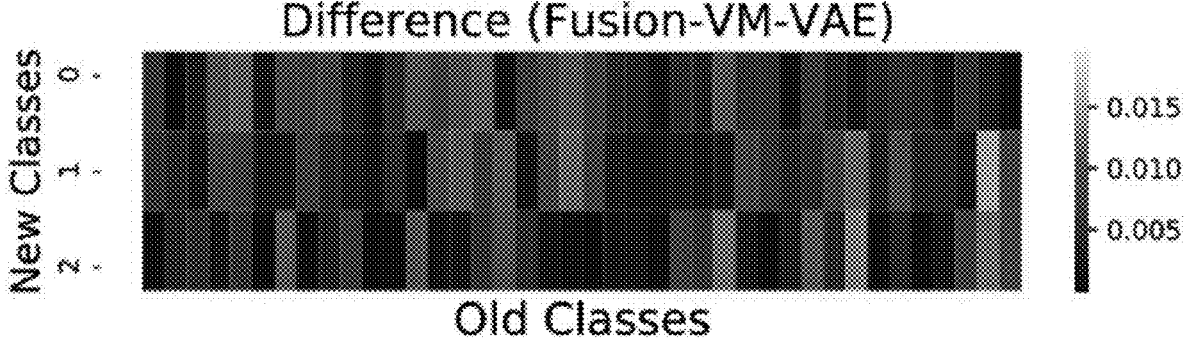

FIGS. 14A to 14F show the change of normalized distance between prototypes in consecutive incremental steps. The results show that our methods enable control of the drift of representations by limiting its change better than the state of the art method PASS. FIGS. 14A and 14D plot the pairwise normalised Euclidean distance between prototypical feature representations of classes introduced in the first incremental phase for the PASS method and our method respectively. FIGS. 14B and 14E plot the pairwise normalised Euclidean distance between prototypical feature representations of classes introduced in the second incremental phase for the PASS method and our method respectively. For each of FIGS. 14A, 14B, 14D and 14E, the Euclidean distance is captured at the beginning (left) and end (mid) of the second phase (CIFAR100, 20 phases). FIGS. 14C and 14F plot the absolute values of the difference for the PASS method and our method respectively.

We focus on analyzing the change of semantic relationship during the first incremental step (i.e. t=1). We notice how prototypes estimated by leveraging the modeled semantic representation drift tend to more effectively preserve inter-class relationships with respect to novel classes. By utilising feature drift alone, in fact, we notice that class representations tend to modify their interconnections. Nonetheless, the proposed model fusion allows to better identify and retain inter-class relationships, whereas keeping prototypes fixed (as in PASS) causes a greater impairment of inter-class relationships as new representations are learned.

In the next set of analyses, we analyse the relationship between semantic drift and model accuracy. Specifically, we analyse the relationship tying the accuracy of the classification model and the normalised distance between the revived and evanescent prototypes of old classes. Normalisation is performed by dividing individual distances computed for single past classes by the average distance among all the past classes. We then provide the average of normalised distance values at each incremental step. We evaluate the accuracy of the proposed method when fusing semantic and feature drift models and adopting GM to identify representation drift, alongside with that of the SDC and PASS.

Figure 15A:
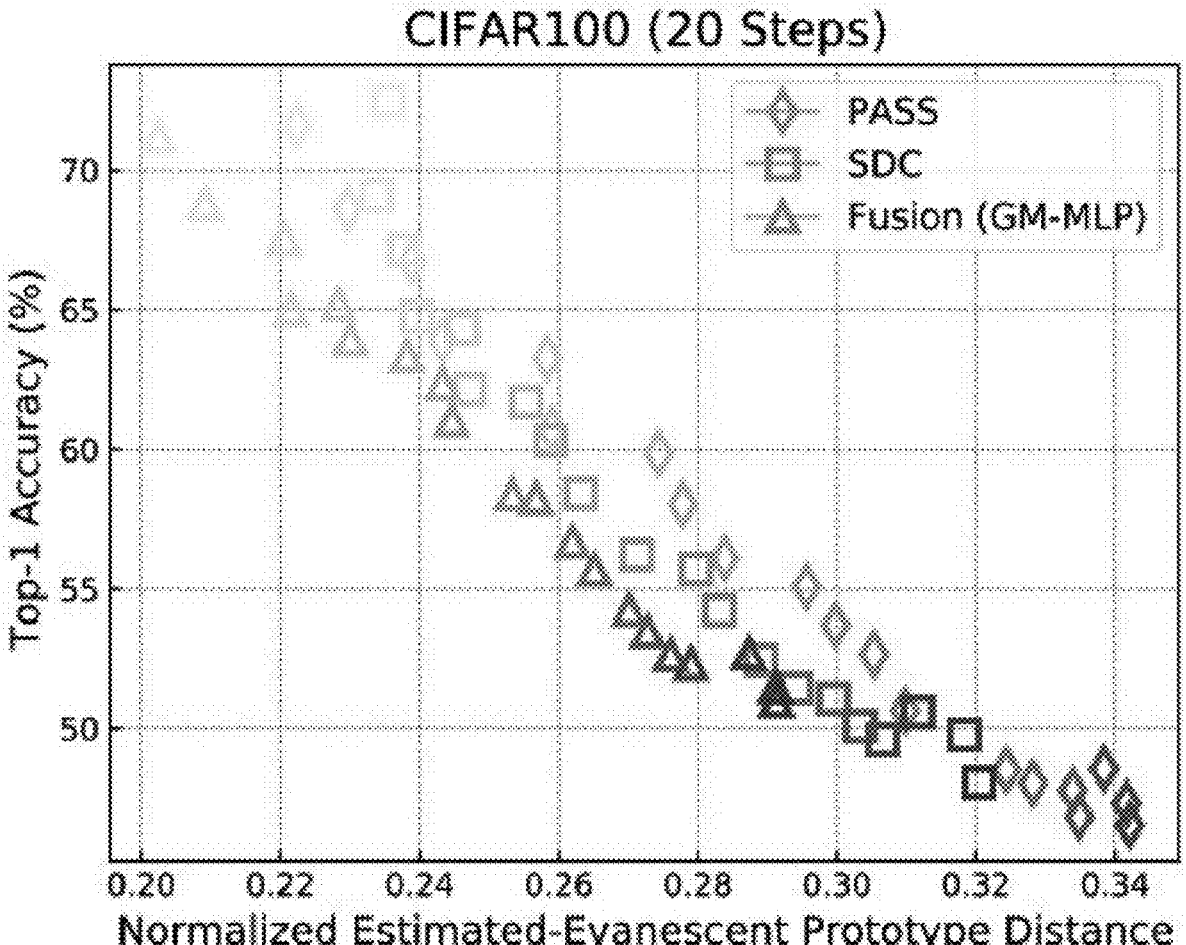
FIGS. 15A to 15C plots the top-1 accuracy (%) in relation to normalised prototype Euclidean distance to reference (ground-truth) representations for each of our method, PASS
Figure 15B:
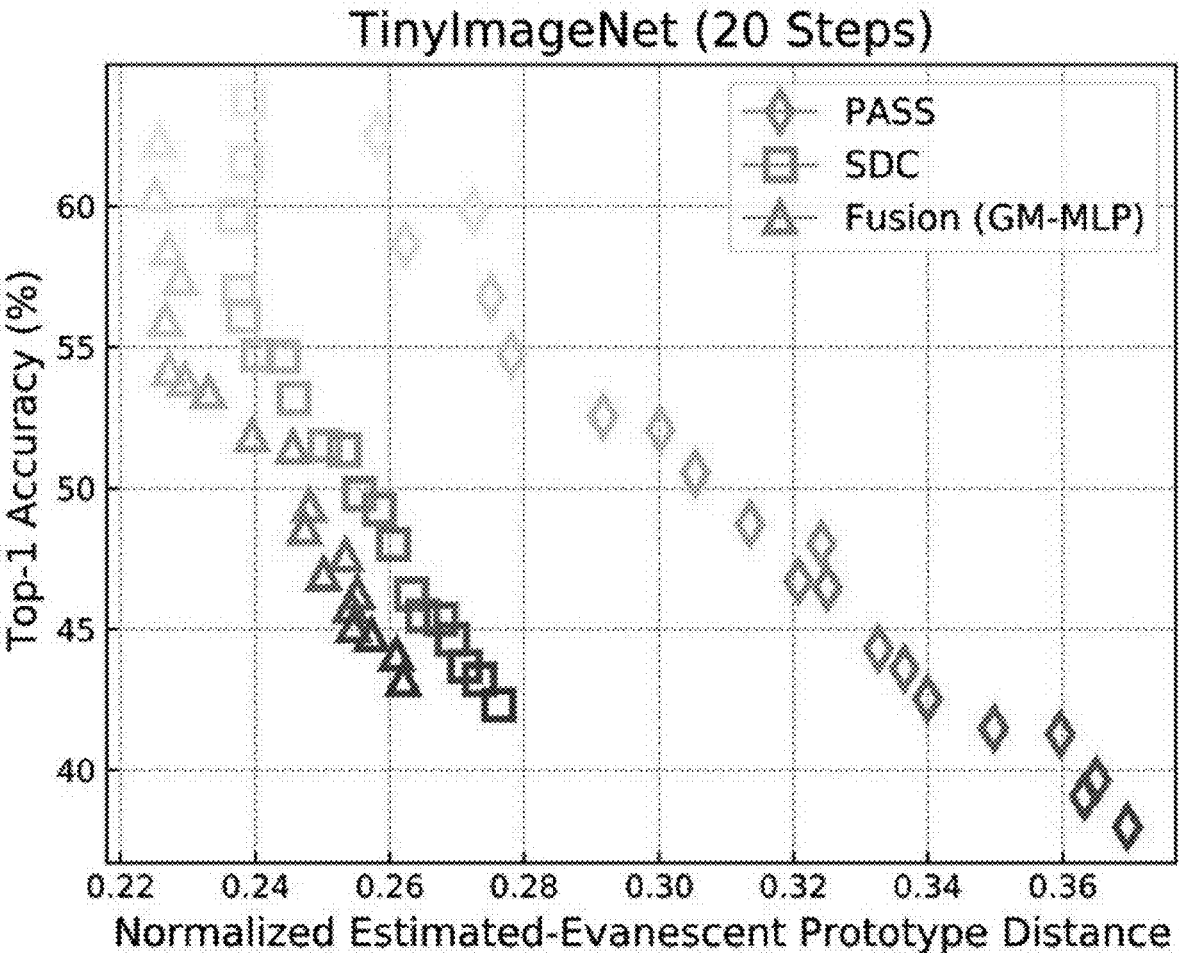
Figure 15C:
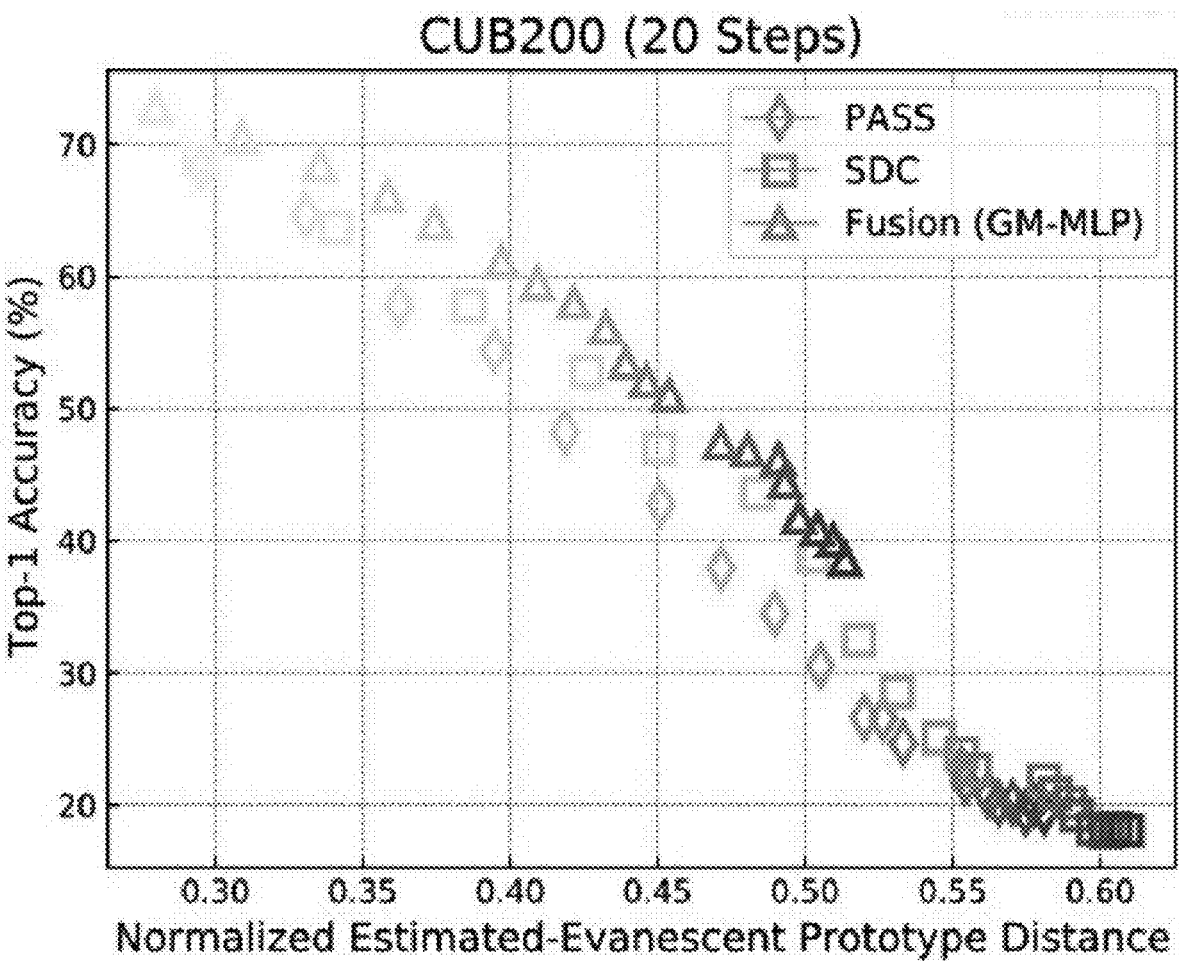

FIGS. 15A to 15C plot the top-1 accuracy (%) in relation to normalised prototype Euclidean distance to reference (evanescent) representations for each of our method, PASS and SDC methods using the CIFAR100, TinyImageNet and CUB200 datasets respectively. Each point corresponds to a single training phase and the decrease in transparency indicates progressively increasing time steps. For each time step, the reported measures have been averaged over all past classes.

We observe that classification accuracy measured at each incremental step and distance between the estimated and evanescent (also known as ground-truth) prototypes are negatively correlated, with similar trends shared by the different methods being analysed across the CIFAR100, TinyImageNet and CUB200 datasets. It is worth noting that our method and SDC display very similar correlation patterns, whilst the latter reaches lower accuracy and higher distance values at the final incremental step.

The results show that state of the art PASS and SDC models overfit to training data as the models are trained incrementally. For instance, accuracy of PASS and SDC continues to decrease below 50% and their produced prototypical representations diverge from the reference prototype as the incremental steps increase. However, the proposed methods limit the distance between prototypical representations by 0.3 and the accuracy by 50%. Therefore, we argue that our proposed method yields superior performance compared to the state of the art methods of PASS and SDC by more accurately tracking and modeling evanescent old class prototypes.

In the final set of analyses we use statistical analyses of representations. We explore how well the estimated revived prototypes of old classes exemplify feature representations of samples of such categories (which are unavailable during training at incremental steps). To this end, we first compute probability distributions over the set of old classes based on the Euclidean distance between feature representation and class prototypes by:

$$p_F(c) = \exp(-\|F - \pi_c\|_2/\zeta)/\sum\nolimits_j \exp(-\|F - \pi_j\|_2/\zeta)$$

where $F \in F_{old}$ is the representation of a test sample of $\mathcal{C}_{old}$ as extracted by the current feature extractor, $\{\pi_j\}_j$ are estimated prototypes of $\mathcal{C}_{old}$ and $\zeta$ is set to 0.1. It is noted that the expression above is equivalent to the Softmax function and in this experiment we have used $\zeta$ set to 0.1 although 0.01 may also be used in different experiments.

We analyse the change of entropy (H) and cross-entropy (CE) of $p_F$ across incremental steps in FIGS. 16A and 16B. The cross-entropy is computed with respect to the one-hotted ground-truth distribution of the labeled input sample corresponding to $F \in F_{old}$. In addition, for each old class $c \in \mathcal{C}_{old}$, we compute the mean H and CE of $p_F$, and then, we average over all F corresponding to the same c. FIG. 16A plots the average entropy of the distribution against incremental step for each of PASS, SDC and our method. FIG. 16B plots the cross-entropy of the distribution against incremental step for each of PASS, SDC and our method. Measures are reported for each incremental step when using the CIFAR100 dataset and 20 incremental steps.

We observe that our method provides higher H and smaller CE compared to PASS, and this trend is shared across CIFAR100, TinyImageNet and CUB200. This result suggests that information capacity of representations learned by our methods increases along with classification accuracy more rapidly compared to the SotA as models are incrementally trained.

To further validate this claim, for each old class c, we compute the probability distribution over feature representations of input samples of all past categories, defined by $$p_c(F_i) = \exp(-\|F_i - \pi_c\|_2/\tau)/\sum\nolimits_j \exp(-\|F_j - \pi_c\|_2/\tau),$$

where $F \in F_{old}$ are feature representations of test samples and $\{\pi_j\}_j$ are revived old-class prototypes. In addition, $\tau$ is set to 0.1. In FIGS. 17A to 17H, we report entropy values of $p_c$ across different incremental steps. FIGS. 17A and 17E plot the class-wise entropy of the feature distribution against incremental step for our method and PASS, respectively. FIGS. 17B and 17F plot the class-wise entropy of the class distribution against incremental step for our method and PASS, respectively. FIGS. 17C and 17G plot the cross-entropy of the class distribution against incremental step for our method and PASS, respectively. FIGS. 17D and 17H plot the class-wise top-1 accuracy against incremental step for our method and PASS, respectively. The measures are reported for each incremental step when using the CIFAR100 dataset and 20 incremental steps.

Once more, we observe that our method causes entropy of $p_c$ to reach higher values compared to PASS, indicating that prototypical representations revived by our method are more informative than their fixed counterparts, while still being representative of the corresponding class, as suggested by the lower CE of $p_F$.

We also analyse the learning curves of semantic and feature drift models. FIGS. 18A to 18H show the convergence values achieved by the total loss function used to train drift models at different epochs across multiple incremental steps. The Figures are plotted for the CUB100 dataset and a setup employing 5 incremental steps. FIGS. 18A and 18B plot the semantic drift loss for the first task and the fifth task when using the MLP adaptation described above. FIGS. 18C and 18D plot the semantic drift loss for the first task and the fifth task when using the VAE adaptation described above. FIGS. 18E and 18F plot the feature drift loss for the first task and the fifth task when using the MLP adaptation described above. FIGS. 18G and 18H plot the feature drift for the first task and the fifth task when using the VAE adaptation described above.

For semantic drift models, we show the results for the total loss (denoted by Fusion (VAE/MLP)) comprising $L_s$ and $L_{fus}$. As for feature drift models, we present the individual behaviour of the loss $L_f$ denoted by Only Feat Drift (VAE/MLP) (without aggregating the loss $L_{fus}$), along with combination of the loss functions $L_f$ and $L_{fus}$ denoted by Fusion (VAE/MLP).

In the results, we observe that the convergence point stabilises in all the analysed setups as learning progresses during each incremental step. This suggests that, as the classification model learns representations of new classes throughout an incremental step, drift models converge to a stable configuration, in which they can provide a robust estimate of representation drift. Moreover, we observe that the VMs (VAE) converge faster than GMs (MLP). In the analyses, we first observe that our methods provide distributions with higher entropy and smaller cross-entropy compared to the state of the art PASS and SDC methods. This result suggests that information capacity of representations learned by our methods increases more as the models are incrementally learned. In addition, our methods provide better semantic representations which represent categories with higher confidence (measured by class-wise cross-entropy) compared to PASS and SDC.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

Contributions of the approach proposed above to overcome all the aforementioned limitations and address the CIL problem can be summarized as follows:

We provide a probabilistic approach for CIL as described above, rigorously highlighting the source of catastrophic forgetting as the unavailability of an up-to-date estimate of distribution $p(F_{old})$ of feature representations $gF_{old}$ learned using old classes $C_{old}$.

We model the change of representations of classes as semantic drift (i.e., due to the change of semantic categories learned at different incremental steps) and propose an effective implementation to estimate it.

We model the change of feature representations as feature drift (i.e, due to constantly evolving feature representations of different patterns learned from data by the model while training models) and propose an effective implementation to estimate it.

We devise a joint framework where semantic and feature drifts are fused. The resulting combined representation drift is used to obtain an up-to-date estimate of feature distributions for $C_{old}$ to be exploited to preserve $C_{old}$ knowledge when learning new representations for $C_t$, $\forall t$.

In summary, the proposed method addresses catastrophic forgetting, through continually learning using only incrementally available datasets. The method also avoids data storing issues, by re-estimating old-class data distributions. As demonstrated by the results, the proposed method achieves high performance, by leveraging updated representations of past data. There is also enhanced semantic understanding, by modeling inter-class relationships and evolution of latent representations.

A full list of the references mentioned in the description is provided in the list below. The teaching of these references is incorporated herein by reference:

[1] Hongjoon Ahn, Jihwan Kwak, Su Fang Lim, Hyeonsu Bang, Hyojun Kim, and Taesup Moon. Ss-il: Separated softmax for incremental learning. In ICCV, 2021.

[2] Rahaf Aljundi, Francesca Babiloni, Mohamed Elhoseiny, Marcus Rohrbach, and Tinne Tuytelaars. Memory aware synapses: Learning what (not) to forget. In ECCV, 2018.

[3] Anonymous. Feature kernel distillation. In Submitted to The Tenth International Conference on Learning Representations, 2022. under review

[4] Francisco M. Castro, Manuel J. Marin-Jimenez, Nicolas Guil, Cordelia Schmid, and Karteek Alahari. End-to-end incremental learning. In *Proceedings of the European Conference on Computer Vision (ECCV)*, 2018.

[5] Hyuntak Cha, Jaeho Lee, and Jinwoo Shin. Co2l:Contrastive continual learning. In ICCV, 2021.

[6] Arslan Chaudhry, Puneet Kumar Dokania, Thalaiyasingam Ajanthan, and Philip H. S. Torr. Riemannian walk for incremental learning: Understanding forgetting and intransigence. In ECCV, 2018.

[7] Matthias Delange, Rahaf Aljundi, Marc Masana, Sarah Parisot, Xu Jia, Ales Leonardis, Greg Slabaugh, and Tinne Tuytelaars. A continual learning survey: Defying forgetting in classification tasks. TPAMI, 2021.

[8] Prithviraj Dhar, Raj at Vikram Singh, Kuan-Chuan Peng, Ziyan Wu, and Rama Chellappa. Learning without memorizing. In *Proceedings of the IEEE Conference on Computer Vision and Pattern Recognition (CVPR)*, 2019.

[9] Arthur Douillard, Matthieu Cord, Charles Ollion, Thomas Robert, and Eduardo Valle. Podnet: Pooled outputs distillation for small-tasks incremental learning. In *Proceedings of the European Conference on Computer Vision (ECCV)*, 2020.

[10] Kaiming He, Xiangyu Zhang, Shaoqing Ren, and Jian Sun. Deep residual learning for image recognition. In *Proceedings of the IEEE Conference on Computer Vision and Pattern Recognition (CVPR)*, 2016.

[11] Geoffrey E. Hinton, Oriol Vinyals, and Jeffrey Dean. Distilling the knowledge in a neural network. CoRR, abs/1503.02531, 2015.

[12] Saihui Hou, Xinyu Pan, Chen Change Loy, Zilei Wang, and Dahua Lin. Learning a unified classifier incrementally via rebalancing. In *Proceedings of the IEEE Conference on Computer Vision and Pattern Recognition (CVPR)*, 2019.

[13] Xinting Hu, Kaihua Tang, Chunyan Miao, Xian-Sheng Hua, and Hanwang Zhang. Distilling causal effect of data in class-incremental learning. In CVPR, 2021.

[14] Metod Jazbec, Matt Ashman, Vincent Fortuin, Michael Pearce, Stephan Mandt, and Gunnar Ra'tsch. Scalable gaussian process variational autoencoders. In AISTATS, 2021.

[15] Ronald Kemker and Christopher Kanan. Fearnet: Brain-inspired model for incremental learning. In ICLR, 2018.

[16] James Kirkpatrick, Razvan Pascanu, Neil C. Rabinowitz, Joel Veness,v Guillaume Desjardins, Andrei A. Rusu, Kieran Milan, John Quan, Tiago Ramalho, Agnieszka Grabska-Barwinska, Demis Hassabis, Claudia Clopath, Dharshan Kumaran, and Raia Hadsell. Overcoming catastrophic forgetting in neural networks. *CoRR*, abs/1612.00796, 2016.

[17] Alex Krizhevsky. Learning multiple layers of features from tiny images. Technical report, 2009.

[18] Matthias De Lange and Tinne Tuytelaars. Continual prototype evolution: Learning online from non-stationary data streams. In ICCV, 2021.

[19] Zhizhong Li and Derek Hoiem. Learning without forgetting. In *Proceedings of the European Conference on Computer Vision (ECCV)*, 2016.

[20] Yaoyao Liu, Bernt Schiele, and Qianru Sun. Adaptive aggregation networks for class-incremental learning. In CVPR, 2021.

[21] James Lucas, George Tucker, Roger B Grosse, and Mohammad Norouzi. Don't blame the elbo! a linear vae perspective on posterior collapse. In NeurIPS, 2019.

[22] Zheda Mai, Ruiwen Li, Jihwan Jeong, David Quispe, Hyunwoo Kim, and Scott Sanner. Online continual learning in image classification: An empirical survey. Neurocomputing, 469:28-51, 2022.

[23] German I. Parisi, Ronald Kemker, Jose L. Part, Christopher Kanan, and Stefan Wermter. Continual lifelong learning with neural networks: A review. Neural Networks, 113:54-71, 2019.

[24] Hadi Pouransari and Saman Ghili. Tiny imagenet visual recognition challenge. In *CS231N course*, Stanford Univ., Stanford, CA, USA, 2014.

[25] Sylvestre-Alvise Rebuffi, Alexander Kolesnikov, Georg Sperl, and Christoph H. Lampert. icarl: Incremental classifier and representation learning. In *Proceedings of the IEEE Conference on Computer Vision and Pattern Recognition (CVPR)*, 2017.

[26] Hanul Shin, Jung Kwon Lee, Jaehong Kim, and Jiwon Kim. Continual learning with deep generative replay. In NeurIPS, 2017.

[27] Christian Simon, Piotr Koniusz, and Mehrtash Harandi. On learning the geodesic path for incremental learning. In CVPR, 2021.

[28] James Smith, Yen-Chang Hsu, Jonathan Balloch, Yilin Shen, Hongxia Jin, and Zsolt Kira. Always be dreaming: A new approach for data-free class-incremental learning. In ICCV, 2021.

[29] Jake Snell, Kevin Swersky, and Richard S. Zemel. Prototypical networks for few-shot learning. In Isabelle Guyon, Ulrike von Luxburg, Samy Bengio Hanna M. Wallach, Rob Fergus, S. V. N. Vishwanathan, and Roman Garnett, editors, NeurIPS,2017

[30] Kihyuk Sohn, Honglak Lee, and Xinchen Yan. Learning structured output representation using deep conditional generative models. In *Advances in Neural Information Processing Systems (NeurIPS)*, 2015.

[31] Joshua B. Tenenbaum, Vin de Silva, and John C. Langford. A global geometric framework for nonlinear dimensionality reduction. Science, 290(5500):2319-2323, 2000.

[32] Eli Verwimp, Matthias De Lange, and Tinne Tuytelaars. Rehearsal revealed: The limits and merits of re-visiting samples in continual learning. In ICCV, 2021

[33] Catherine Wah, Peter Welinder Steve Branso and, Pietro Perona, and Serge Belongie. The CaltechUCSD Birds-200-2011 Dataset. Technical Report CNS-TR-2011-001, California Institute of Technology, 2011.

[34] Chenshen Wu, Luis Herranz, Xialei Liu, Yaxing Wang, Joost van de Weijer, and Bogdan Raducanu. Memory replay gans: Learning to generate new cat-egories without forgetting. In NeurIPS, 2018

[35] Guile Wu, Shaogang Gong, and Pan Lid. Striking a balance between stability and plasticity for class-incremental learning. In *Proceedings of the International Conference on Computer Vision (ICCV)*, 2021.

[36] Yue Wu, Yinpeng Chen, Lijuan Wang, Yuancheng Ye, Zicheng Liu, Yandong Guo, and Yun Fu. Large scale incremental learning. In CVPR, 2019.

[37] Ye Xiang, Ying Fu, Pan Ji, and Hua Huang. Incremental learning using conditional adversarial networks. In ICCV, 2019.

[38] Yaniv Yacoby, Weiwei Pan, and Finale Doshi-Velez. Failure modes of variational autoencoders and their effects on downstream tasks, 2021

[39] Shipeng Yan, Jiangwei Xie, and Xuming He. DER: dynamically expandable representation for class incremental learning. In *Proceedings of the IEEE Conference on Computer Vision and Pattern Recognition (CVPR)*, 2021.

[40] Lu Yu, Bartlomiej Twardowski, Xialei Liu, Luis Herranz, Kai Wang, Yongmei Cheng, Shangling Jui, and Joost van de Weijer. Semantic drift compensation for class-incremental learning. In *Proceedings of the IEEE Conference on Computer Vision and Pattern Recognition (CVPR)*, 2020.

[41] Friedemann Zenke, Ben Poole, and Surya Ganguli. Continual learning through synaptic intelligence. In Doina Precup and Yee Whye Teh, editors, ICML, 2017

[42] Shengjia Zhao, Jiaming Song, and Stefano Ermon. Infovae: Information maximizing variational autoencoders. *CoRR*, abs/1706.02262, 2017.

[43] Fei Zhu, Xu-Yao Zhang, Chuang Wang, Fei Yin, and Cheng-Lin Liu. Prototype augmentation and self-supervision for incremental learning. In *Proceedings of the IEEE Conference on Computer Vision and Pattern Recognition (CVPR)*, 2021.

What is claimed is:

1. A computer-implemented method for training a classifier using class incremental learning (CIL) wherein the classification model is a machine learning (ML) model comprising a feature extraction model and a classification model and wherein at each incremental time step in the CIL a new training dataset having a set of samples with class labels is obtained and an optimization over a plurality of stages is applied, the method comprising for each incremental step:

extracting, using the feature extraction model, a first set of features representing the samples within the new training dataset at the beginning of the incremental step and a second set of features representing the samples within the new training dataset at a subsequent stage within the optimization;

obtaining a first set of old class prototypes for the beginning of the incremental step, wherein each class prototype is a semantic representation of the sets of features of the samples which have the same class label and wherein each old class prototype represents old samples which are samples that are not present in the new training dataset;

training a feature drift model using the extracted first and second sets of features, wherein the feature drift model estimates a drift between features representing each sample as the classification model is updated, the feature drift model comprising a multilayer perceptron that includes at least two fully connected layers with a rectified linear unit (reLU) activation layer therebetween;

training a semantic drift model using the first set of old class prototypes and the first set of features, wherein the semantic drift model estimates a drift between the class prototypes for each class as the classification model is updated, the semantic drift model comprising a multilayer perceptron that includes at least two fully connected layers with a reLU activation layer therebetween;

inferring at least one of a second set of old class prototypes and a set of old features using the trained feature drift model and the trained semantic drift model, wherein the second set of old class prototypes are semantic representations of revived old samples at a subsequent stage within the optimization and the set of old features are feature representations of revived old samples at the subsequent stage within the optimization; and using at least one of the inferred second set of old class prototypes and the inferred set of old features to update the ML model; and when a final incremental step is completed, outputting the trained classification model.

2. The method of claim 1, wherein the classifier is an image classifier and the new training dataset comprises a plurality of samples in a form of images.

3. The method of claim 1, wherein the feature drift model uses a linear deep neural network and training the feature drift model comprises minimising an error between the extracted second set of features and a third set of features which are an estimate of these features using the feature drift model.

4. The method of claim 1, wherein the feature drift model uses a variational model and training the feature drift model comprises updating weights $\gamma_t^n$ of the model to maximize a probability that a set of features representing a sample is in the second set of features when it the set of features is in the first set of features, according to the following equation:

maximise $$p\left(F \in \mathcal{F}_t^n \,\middle|\, F \in \mathcal{F}_t^0; \gamma_t^n\right)$$

where $$\mathcal{F}_c^0$$

denotes the extracted first set of features, $$\mathcal{F}_t^n$$

denotes the extracted second set of features and F is an up-to-date feature representation from both a set of features of new classes and old classes.

5. The method of claim 1, wherein the semantic drift model uses a linear deep neural network and training the semantic drift model comprises minimising an error between the first set of old class prototypes and a third set of old class prototypes which are an estimate of these old class prototypes using the semantic drift model.

6. The method of claim 1, wherein the semantic drift model uses a variational model and training the semantic drift model comprises updating weights $\psi$ of the model to maximize a probability that a class prototype representing a sample is in the first set of old class prototypes when features of the sample are in the first set of features according to the following equation:

maximise $$p\left(\pi \in \prod_{old}^{t,n=0} \,\middle|\, F \in \mathcal{F}_t^0; \psi_t^n\right)$$

where $$\mathcal{F}_t^0$$

denotes the first set of features $$\prod_{old}^{t,0}$$

is the first set of old class prototypes, F is an up-to-date feature representation and It is an up-to-date class prototype.

7. The method of claim 3, wherein the inferring step comprises inferring the second set of old class prototypes using the feature drift model to map the first set of old class prototypes to the second set of old class prototypes.

8. The method of claim 4, wherein the inferring step comprises inferring the set of old features using the trained feature drift model to provide an approximation for a probability distribution of $$p\left(F \in \mathcal{F}_{old}^n \,\middle|\, F \in \mathcal{F}_{old}^0\right) \text{ where } \mathcal{F}_{old}^0$$

is the first set of features for the old samples at the beginning of the incremental step and $$\mathcal{F}_{old}^n$$

is the second set of features for the old samples at a subsequent stage of optimisation.

9. The method of claim 5, wherein the inferring step comprises inferring the second set of old class prototypes using the semantic drift model to map the extracted second set of features to the second set of old class prototypes.

10. The method of claim 6, wherein the inferring step comprises inferring the set of old features using the trained-semantic drift model to compute a posterior probability $$p\left(\pi \in \prod_{old}^{t,n>0} \,\middle|\, F \in \mathcal{F}_t^n; \psi\right), \text{ where } \prod_{old}^{t,n}$$

is the second set of old class prototypes, $$\mathcal{F}_t^n$$

denotes the extracted second set of features and $\psi$ are weights of the semantic drift model.

11. The method of claim 1, wherein using the inferred second set of old class prototypes to update the ML model comprises training the feature extraction model and the classification model based on at least one of the inferred second set of old class prototypes and an inferred set of old features.

12. The method of claim 11, wherein training the feature extraction model comprises minimizing a distillation loss which is a distance between a first set of representations extracted from a current dataset using a current feature extraction model and a second set of representations extracted from the current dataset using the feature extraction model from a previous incremental time step.

13. The method of claim 11, wherein training the classification model comprises using at least one of a cross-entropy loss and a representation drift loss function $$L_{rd}^t = \sum_{F \in F_{old}^{n,t}} y_F \log h_{\phi_t}(F)$$

where $y_F$ one-hot label vector of the class $$c_F \in C_{old}, \mathcal{F}_{old}^{n,t}$$

is the set of revived evanescent representations sampled from an estimated distribution using updated prototypes of old classes $\mathcal{C}_{old}$.

14. The method of claim 1, wherein the extracting, training, obtaining and using steps are repeated for each optimsation stage.

15. A method of classifying a sample, the method comprising inputting a sample;

extracting a plurality of features from the sample using a feature extraction model of a classifier which has been trained according to the method of any one of the preceding claims;

classifying the sample based on the extracted plurality of features using a classification model of a classifier which has been trained according to the method of any one of the preceding claims; and outputting the classification of the sample.

16. A non-transitory data carrier carrying processor control code to implement the method according to claim 1.

17. The method of claim 1, wherein an output of the feature drift model is fused with the semantic drift model to generate a combined representation drift to train the classification model when training new class representations.

* * * * *